(12) United States Patent
Yamamura

(10) Patent No.: US 7,898,738 B2
(45) Date of Patent: Mar. 1, 2011

(54) LENS ARRAY, MANUFACTURING METHOD THEREOF, LED HEAD HAVING LENS ARRAY, EXPOSURE DEVICE HAVING LED HEAD, IMAGE FORMING APPARATUS HAVING EXPOSURE DEVICE, AND READING APPARATUS

(75) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 149 days.

(21) Appl. No.: 12/230,908

(22) Filed: Sep. 8, 2008

(65) Prior Publication Data

US 2009/0067055 A1 Mar. 12, 2009

(30) Foreign Application Priority Data

Sep. 10, 2007 (JP) ............................. 2007-234442
Aug. 19, 2008 (JP) ............................. 2008-211094

(51) Int. Cl.
*G02B 27/10* (2006.01)
(52) U.S. Cl. ...................... 359/622; 359/619; 359/621; 359/626; 359/455; 399/47; 399/51; 399/218; 347/238; 347/241; 347/244; 362/248; 362/268; 250/208.1
(58) Field of Classification Search ................. 359/619, 359/621–623, 625, 626, 628, 642, 796, 455, 359/457; 362/231, 235, 248, 268, 326; 347/236, 347/238, 241, 244, 246, 258; 399/47, 51, 399/218; 250/216, 208.1; 257/797; 264/1.1
See application file for complete search history.

(56) References Cited

U.S. PATENT DOCUMENTS

| | | | | | |
|---|---|---|---|---|---|
| 4,560,342 | A | * | 12/1985 | Ishida et al. ................. | 425/562 |
| 5,151,790 | A | * | 9/1992 | Takatori et al. ............. | 348/335 |
| 5,629,796 | A | * | 5/1997 | Shanks ....................... | 359/463 |
| 6,618,200 | B2 | * | 9/2003 | Shimizu et al. ............. | 359/619 |
| 6,646,807 | B2 | * | 11/2003 | Yoshikawa et al. .......... | 359/619 |
| 6,693,748 | B1 | * | 2/2004 | Fujimoto et al. ............ | 359/621 |
| 7,088,508 | B2 | * | 8/2006 | Ebina et al. ................. | 359/455 |
| 7,113,333 | B2 | * | 9/2006 | Kamijima ................... | 359/456 |
| 7,417,659 | B2 | * | 8/2008 | Yamamura ................... | 347/241 |
| 7,446,942 | B2 | * | 11/2008 | Jacobowitz et al. ......... | 359/619 |
| 2009/0060544 | A1 | * | 3/2009 | Kawada et al. ................. | 399/51 |

FOREIGN PATENT DOCUMENTS

| | | |
|---|---|---|
| JP | 60-48310 | 3/1985 |
| JP | 11-245266 | 9/1999 |
| JP | 2001-27713 | 1/2001 |
| JP | 2003-202411 | 7/2003 |

\* cited by examiner

*Primary Examiner*—Loha Ben
(74) *Attorney, Agent, or Firm*—Rabin & Berdo, PC

(57) ABSTRACT

An exposure device is provided that has a light emitting unit having a plurality of light emitting elements and a lens array having a pair of lenses having a first lens and a second lens, the lens array having a shielding unit for shielding a light from any one of the pair of lenses, wherein a formula $EC<EP/2$ is satisfied, where EP denotes an interval between two adjacent light emitting elements of the plurality of light emitting elements and where EC denotes an off-set between a central axis of the first lens and a central axis of the second lens.

23 Claims, 39 Drawing Sheets

LENS ARRAY, MANUFACTURING METHOD THEREOF, LED HEAD HAVING LENS ARRAY, EXPOSURE DEVICE HAVING LED HEAD, IMAGE FORMING APPARATUS HAVING EXPOSURE DEVICE, AND READING APPARATUS

BACKGROUND OF THE INVENTION

1. Field of the Invention

The present invention relates to a lens array, a manufacturing method thereof, an LED head having the lens array, an exposure device having the LED head, an image forming apparatus having the exposure device, and a reading apparatus.

2. Description of Related Art

In an image forming apparatus such as an electrophotographic printer, a rod lens array consisting of multiple rod lenses is used in an exposure device having an LED array consisting of multiple LEDs (light emitting diodes) arranged in array. In a reading apparatus such as an image scanner, a facsimile machine, and the like, the rod lenses array is used in an optical system for forming an optical image of a read document at a light receiving unit having multiple light receiving elements arranged in array. The rod lens is formed by impregnating a glass fiber with ions so that the refraction index becomes lower from the center portion toward the peripheral portion, and is an optical element for forming a same-size erect image of an object. A lens array having multiple rod lenses arranged in array is an optical system for forming an optical image of an object on a line. As disclosed in Japanese Patent Application Publication No. 2003-202411, multiple micro lenses may be integrally formed through resin molding method to constitute an optical system for forming an optical image of an object on a line.

There exists a lens array having multiple micro lenses arranged in array to constitute an optical system for forming a same-size erect image of a document on a line on a light receiving unit consisting of multiple light receiving elements arranged in array. As described above, a high resolution can be obtained with the integrally-formed lens array including high-precision micro lenses efficiently manufactured though plastic injection molding.

In the optical system in which the micro lenses are arranged in array and the optical image of an object is formed on a line as disclosed in Japanese Patent Application Publication No. 2003-202411, the resolution relies on the shape of the micro lenses constituting the optical system. For example, the resolution of the optical image will not deteriorate in a case where high-precision micro lenses are used in which the central axes on the light emitting side are in line with the central axes on the object plane side in the micro lenses forming the optical system and lens pairs. However, the resolution of the optical image will decrease if low-precision micro lenses are used in which the central axes on the light emitting side are not in line with the central axes on the object plane side in the micro lenses forming the optical system.

In a case where the conventional lens array is elongated in an arrangement direction of the micro lenses to extend a printing area, the high-precision micro lenses cannot be manufactured, and the precision of each lens varies depending on a position in the longitudinal direction of the lens array. That is, there exists a problem that each micro lens has different values in the residual aberration, the transmission, the focal length, and the like due to errors of the lens shape and the refraction rate among multiple micro lenses arranged in a row.

SUMMARY OF THE INVENTION

As a result of intensive research, the inventor of this invention has found out that the deterioration of the resolution of the optical image can be prevented by adjusting an axial off-center distance between the central axis of the micro lens on the light emitting surface side and the central axis of the micro lens on the optical plane side. Furthermore, the inventor has invented a manufacturing method for forming the lens array having the integrally-formed high-precision micro lenses. The object of this invention is to provide a lens array capable of preventing deterioration of the resolution in the optical image, a manufacturing method thereof, an LED head having the lens array, an exposure device having the LED head, an image forming apparatus having the exposure device, and a reading apparatus.

The exposure device according to this invention has a light emitting unit having a plurality of light emitting elements and a lens array having a pair of lenses having a first lens and a second lens, the lens array having a shielding unit for shielding a light from any one of the pair of lenses, wherein a formula $EC<EP/2$ is satisfied, where EP denotes an interval between two adjacent light emitting elements of the plurality of light emitting elements and where EC denotes an off-set between a central axis of the first lens and a central axis of the second lens.

The exposure device of this invention satisfies the relationship $EC<EP/2$, where EP denotes an interval between two adjacent light emitting elements of the plurality of light emitting elements and where EC denotes an off-set between a central axis of the first lens and a central axis of the second lens, thus being able to prevent deterioration of the resolution that would occur in the use of a conventional lens having an axial offset.

The image forming apparatus of this invention has the above-described exposure device, thus being able to form an image on a medium faithfully corresponding to image data and being able to prevent deterioration of the quality of the image on the medium such as streaks and uneven density.

The reading apparatus of this invention has a light receiving unit having a plurality of light receiving elements and a lens array having a pair of lenses including a first lens and a second lens, the lens array having a shielding unit for shielding a light from any one of the pair of lenses, wherein a formula $EC<RP/2$ is satisfied, where RP denotes an interval between two adjacent light receiving elements of the plurality of light receiving elements and where EC denotes an off-set between a central axis of the first lens and a central axis of the second lens.

The reading apparatus of this invention satisfies the relationship $EC<RP/2$, where RP denotes an interval between two adjacent light receiving elements of the plurality of light receiving elements and where EC denotes an off-set between a central axis of the first lens and a central axis of the second lens, thus being able to prevent deterioration of the resolution that would occur in the use of a conventional lens having an axial offset and being able to provide image data faithfully reproducing an image on a document.

This invention can prevent deterioration of the resolution by using the lens array that satisfies a relationship $EC<EP/2$, where EC denotes an axial off-center distance between the central axis of the first lens and the central axis of the second lens and where EP denotes an arrangement interval between each of the light emitting elements in the exposure device. That is, the exposure device including the lens array and the image forming apparatus including the exposure device can prevent deterioration of the quality of an image. The reading apparatus including the lens array can provide image data faithfully representing a document.

DETAILED DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein.

PREFERRED EMBODIMENTS

An exposure device, an image forming apparatus, and a reading apparatus of this invention will be hereinafter described. This invention is not limited to the embodiments as described below, and the embodiments can be arbitrarily changed without deviating from the gist of this invention.

First Embodiment

Figure 1:
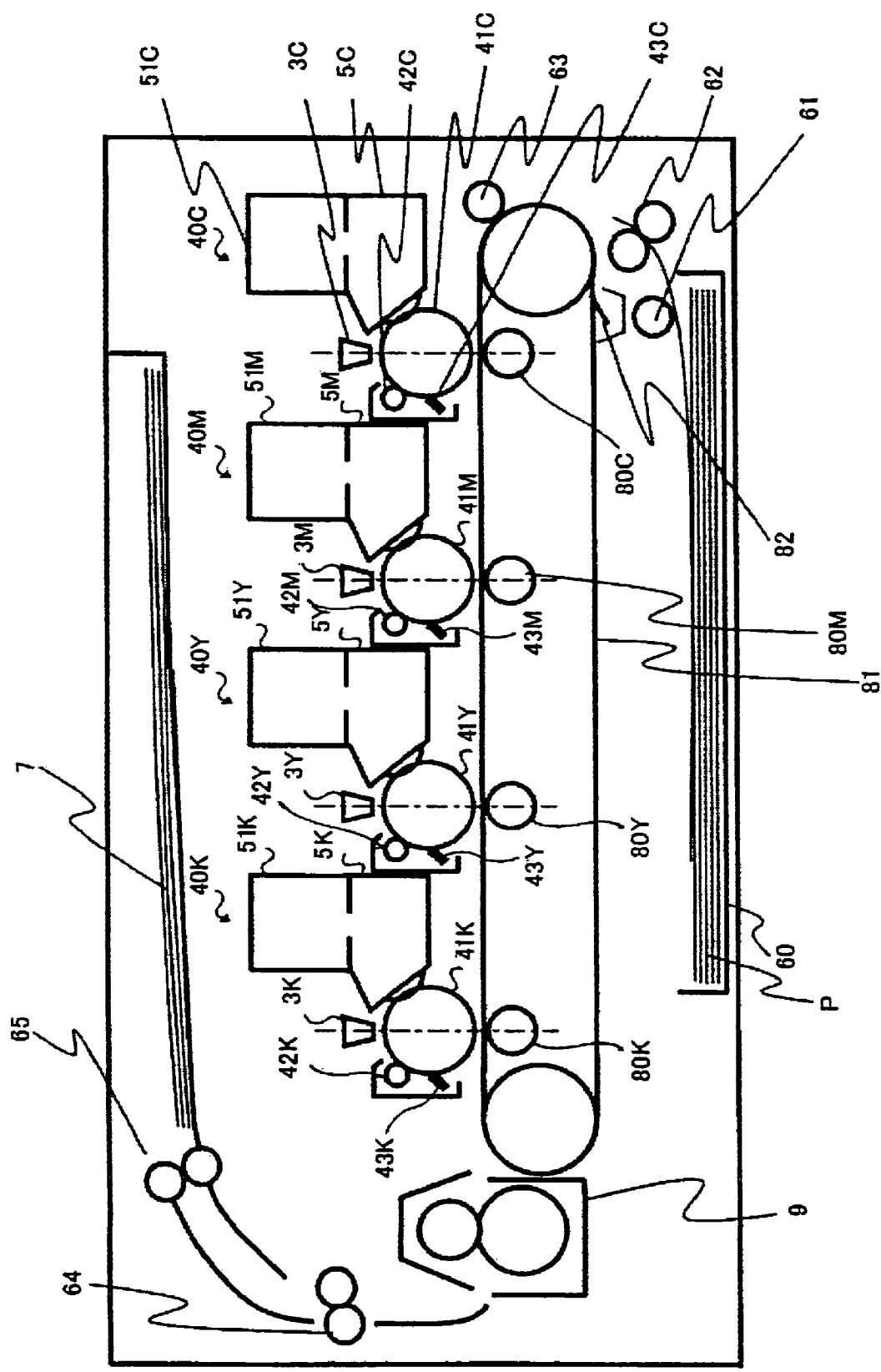
FIG. 1 is a figure showing an image forming apparatus of this invention.

FIG. 1 is a figure describing the structure of the image forming apparatus having the exposure device according to this invention. The image forming apparatus 100 uses toner made of resin including pigments as a color material to form an image on a print medium P based on image data. The image forming apparatus 100 is, for example, an electrophotographic printer, a facsimile, a multi-function apparatus, or the like. In the below description, it is assumed that the image forming apparatus 100 provides a color image, but the image forming apparatus 100 may provide a black and white image.

As shown in FIG. 1, the image forming apparatus 100 has a paper cassette 60 containing the print medium P on which an image has not yet been formed. A feeding roller 61 rotates to feed the print medium P contained in the paper cassette 60. Conveyance rollers 62, 63 downstream of the feeding roller 61 further convey the print medium P to a transfer belt 81 at a predetermined time interval, and the print medium P is placed on the transfer belt 81. The transfer belt 81 is rotated by a motor, not shown, at a rotation speed according to a printing speed.

The image forming apparatus 100 uses an electrophotographic printing method, and has four image forming units 40C, 40M, 40Y, 40K respectively corresponding to four colors Cyan (C), Magenta (M), Yellow (Y), Black (K). The four image forming units 40C, 40M, 40Y, 40K are arranged along a transfer belt 81 from a feeding side to a discharge side of the print medium P. Each of the image forming units 40C, 40M, 40Y, 40K forms an image using a toner of each color on the print medium P placed on the transfer belt 81 rotated by a gear and the like transmitting a driving force of a motor, not shown. Specifically, the image forming units 40C, 40M, 40Y, 40K respectively have photosensitive drums 41C, 41M, 41Y, 41K as electrostatic latent image holders, charging rollers 42C, 42M, 42Y, 42K respectively charging peripheries of the photosensitive drums 41C, 41M, 41Y, 41K, exposure devices 3C, 3M, 3Y, 3K respectively forming electrostatic latent images upon selectively emitting light to peripheries of the photosensitive drums 41C, 41M, 41Y, 41K based on image data received from an external apparatus via an interface, not shown, developing devices 5C, 5M, 5Y, 5K respectively developing the electrostatic latent images formed on the peripheries of the photosensitive drums 41C, 41M, 41Y, 41K using toner to form tone images, toner cartridges 51C, 51M, 51Y, 51K containing toners to respectively supply the toners to the developing devices 5C, 5M, 5Y, 5K, transfer rollers 80C, 80M, 80Y, 80K transferring the toner images to the print medium P, and cleaning blades 43C, 43M, 43Y, 43K cleaning and collecting residual toners that are not transferred to the print medium P and are remaining on the peripheries of the photosensitive drums 41C, 41M, 41Y, 41K. The photosensitive drums 41C, 41M, 41Y, 41K, the charging rollers 42C, 42M, 42Y, 42K, and the transfer rollers 80C, 80M, 80Y, 80K are driven and rotated by gears and the like transmitting a driving force of the motor. The exposure devices 3C, 3M, 3Y, 3K, the developing devices 5C, 5M, 5Y, 5K, and the motor are connected to a power supply and a control unit, not shown.

In the image forming units 40C, 40M, 40Y, 40K as described above, a power supply, not shown, applies a predetermined voltage to the charging rollers 42C, 42M, 42Y, 42K, which uniformly charge the peripheries of the photosensitive drums 41C, 41M, 41Y, 41K to a voltage according to the control of the control unit. When charged portions of the peripheries of the photosensitive drums 41C, 41M, 41Y, 41K reach the exposure devices 3C, 3M, 3Y, 3K as the photosensitive drums 41C, 41M, 41Y, 41K rotate, the exposure devices 3C, 3M, 3Y, 3K respectively emit lights modulated according to the image to the photosensitive drums 41C, 41M, 41Y, 41K to form the electrostatic latent images. The image forming units 40C, 40M, 40Y, 40K attach the toners of each color respectively supplied from the developing devices 5C, 5M, 5Y, 5K to the formed electrostatic latent images, thus forming the toner images of each color.

As the photosensitive drums 41C, 41M, 41Y, 41K rotate, the portions of the peripheries having the toner images come in contact with the print medium P conveyed on the transfer belt 81 sandwiched between the photosensitive drums 41C, 41M, 41Y, 41K and the transfer rollers 80C, 80M, 80Y, 80K arranged opposite to the photosensitive drums 41C, 41M, 41Y, 41K. When the toner images come in contact with the print medium P, the toner images of each color developed by the image forming units 40C, 40M, 40Y, 40K are successively transferred to the print medium P according to the control of the control unit so that the toner images are overlapped with each other. At this moment, a power supply, not shown, applies a predetermined voltage to the transfer rollers 80C, 80M, 80Y, 80K.

When the transfer is completed, the image forming units 40C, 40M, 40Y, 40K use the cleaning blades 43C, 43M, 43Y, 43K to clean the residual toners remaining on the peripheries of the photosensitive drums 41C, 41M, 41Y, 41K according to the control of the control unit. The cleaning blade 82 is used to clean the residual toner remaining on the surface of the transfer belt 81 according to the control of the control unit. The image forming apparatus 100 causes the image forming units 40C, 40M, 40Y, 40K as described above to successively form the images of each color on the print medium P to form a color image. In the image forming apparatus 100, the print medium P is conveyed to a fixing device 9 while the print medium 9 is held on the transfer belt 81 with electrostatic attraction.

The image forming apparatus 100 has the fixing device 9 downstream of the image forming units 40C, 40M, 40Y, 40K. The fixing device 9 has a fixing roller made by, for example, adhering an elastic member on the outer periphery of a metal hollow roller, and also has a pressurizing roller for pressurizing the print medium P with the fixing roller. The pressurizing roller is arranged opposite to and in contact with the fixing roller, and has a nip portion at which the print medium P is sandwiched. A heater or a halogen lamp, not shown, generating heat or light with the supply of electricity from a power source, not shown, is arranged in the inside of the fixing roller. In the fixing device 9, the control unit controls the heater to generate heat or the halogen lamp to emit light, so that the fixing roller is heated. The fixing device 9 rotates the fixing roller and the pressurizing roller to pass the print medium P through the nip portion, so that the print medium P is heated and pressurized and the toner thereon is melted. Thus, the toner image is fixed on the print medium with heat. Once the fixing device 9 in the image forming apparatus 100 fixes the image on the print medium P, the print medium P is conveyed and discharged to the outside of the image forming apparatus 100 as a conveyance roller 64 and a discharge roller 65 rotate, and is placed on a paper discharge unit 7.

The image forming apparatus 100 has an external interface, not shown, for receiving print data from an external apparatus connected to and capable of communicating with the image forming apparatus 100. The image forming apparatus 100 also has a control unit for receiving the print data via the external interface and for controlling the entire image forming apparatus 100.

In the image forming apparatus 100, the exposure devices 3C, 3M, 3Y, 3K are configured as described later. In the image forming apparatus 100, all of the four image forming units 40C, 40M, 40Y, 40K corresponding to the four colors Cyan (C), Magenta (M), Yellow (Y), and Black (K) are substantially the same with each other. Thus, in the below description, reference numerals are used without the alphabetical portion C, M, Y, and K. For example, "the image forming unit 40" is recited instead of "the image forming units 40C, 40M, 40Y, 40K".

Figure 2:
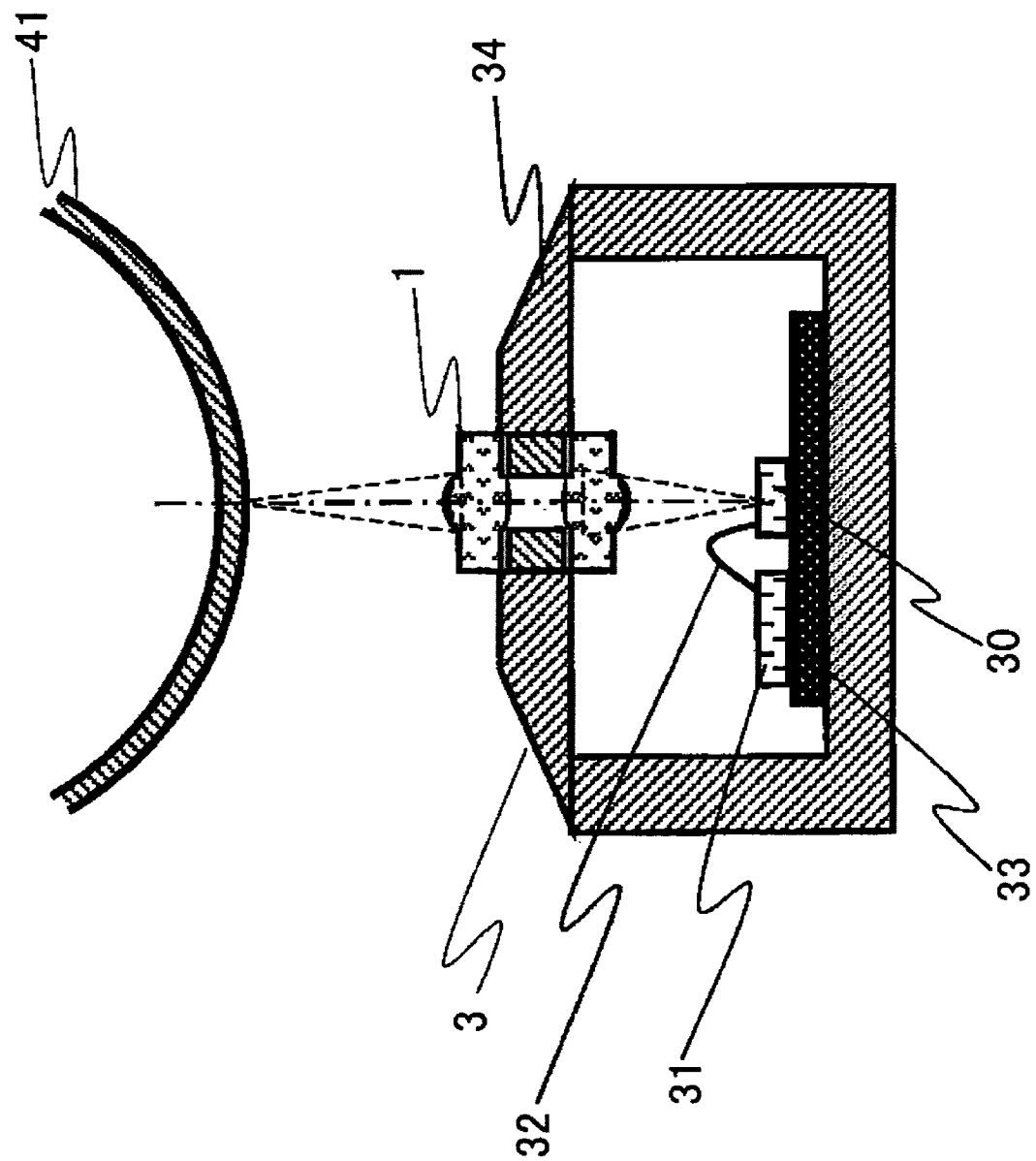
FIG. 2 is a figure showing an exposure device mounted on the image forming apparatus of this invention.

FIG. 2 is a cross section of the exposure device 3 of this invention. As shown in FIG. 2, the exposure device 3 faces the photosensitive drum 41, and is arranged at a predetermined distance from the photosensitive drum 41. The exposure device 3 has a lens array 1 held by a holding member 34, and also has an LED (Light Emitting Diode) array 30 as a light-emitting unit having multiple light emitting elements 35 formed on a circuit board 33 in the holding member 34. The circuit board 33 has a driver IC 31 controlling light emission of the light emitting elements 35 of the LED array 30. The LED array 30 and the driver IC 31 are connected via a wire 32.

In the first embodiment, the LED array having the light emitting elements 35 is described as an example. But this invention is not limited to the LED array. For example, an organic EL (Electroluminescence) element may be used as a light source. A semiconductor laser generally used as an exposure device of an image forming apparatus may be used. The exposure device may use a light source such as a fluorescent light, a halogen lamp, and the like in combination with a shutter having a liquid crystal element.

Figure 3:
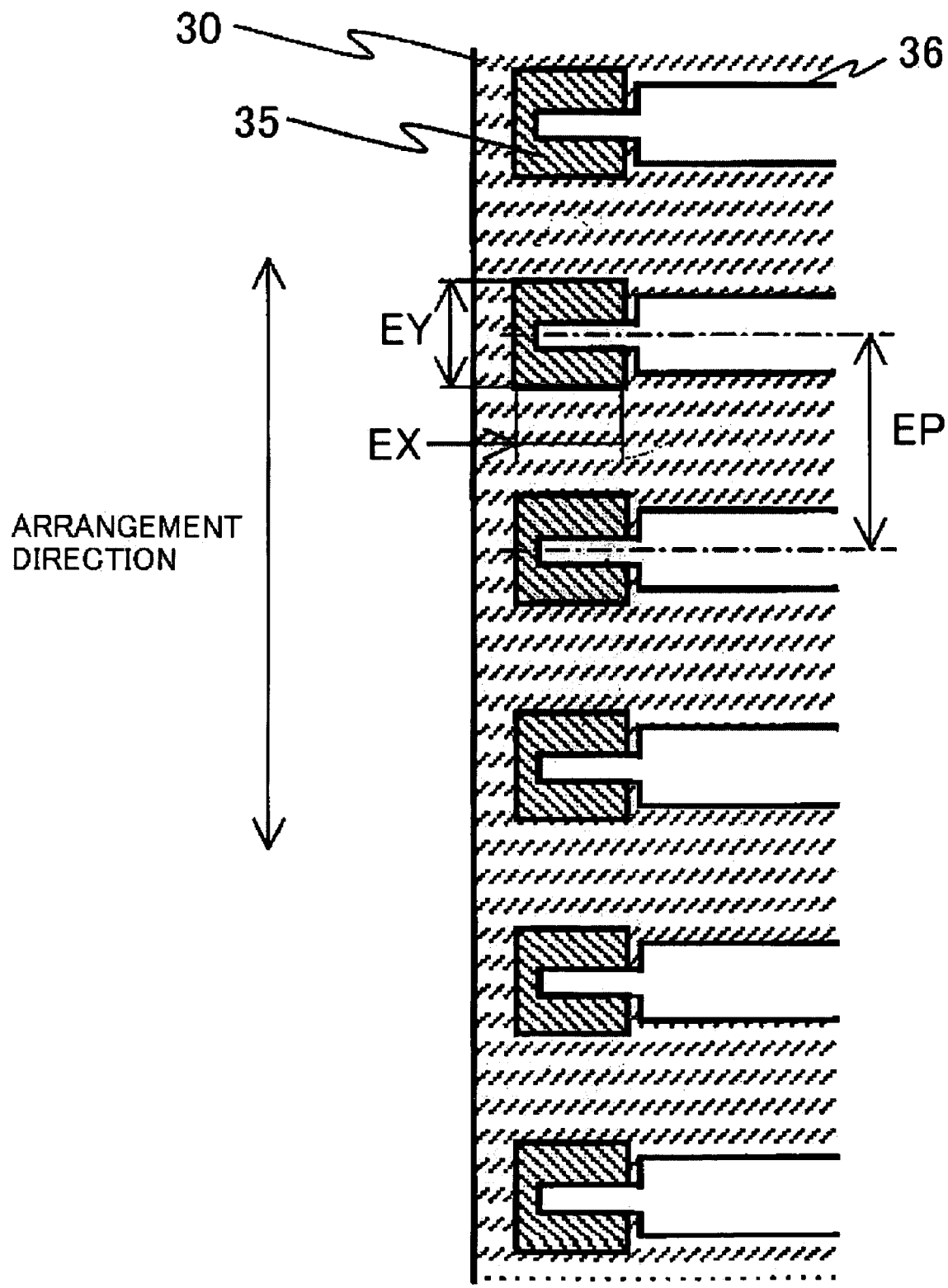
FIG. 3 is a figure showing an LED array used in the exposure device of this invention.

FIG. 3 is a figure describing the structure and arrangement of the light emitting elements in the LED array. The multiple light emitting elements 35 are arranged on the LED array 30 in a predetermined direction, and are evenly spaced at a predetermined arrangement interval EP, and are connected to electrodes 36. The light emitting elements 35 are in a rectangular shape, and have a predetermined length EY in a direction parallel to the arrangement direction of the light emitting elements 35 and a predetermined length EX in a direction perpendicular to the arrangement direction of the light emitting elements 35. The size and the arrangement interval EP of the light emitting elements 35 are changed as necessary according to a resolution of the exposure device. For example, in a case of the exposure device of 600 dpi, the length EY is 21 µm, the length EX is 21 µm, and the arrangement interval EP is 42 µm. In a case of the exposure device of 1200 dpi, the length EY is 10 µm, the length EX is 10 µm, and the arrangement interval EP is 21 µm. In a case of the exposure device of 2400 dpi, the length EY is 5 µm, the length EX is 5 µm, and the arrangement interval EP is 10.6 µm.

When the control unit of the image forming apparatus transmits a control signal for the exposure device 3 based on image data, the exposure device 3 as described above causes the light emitting elements 35 to emit light at a light quantity according to the control signal of the driver IC 31. The light beam from the light emitting element 35 enters into the lens array 1 as described later in detail, and forms an optical image on the photosensitive drum 41.

Figure 4:
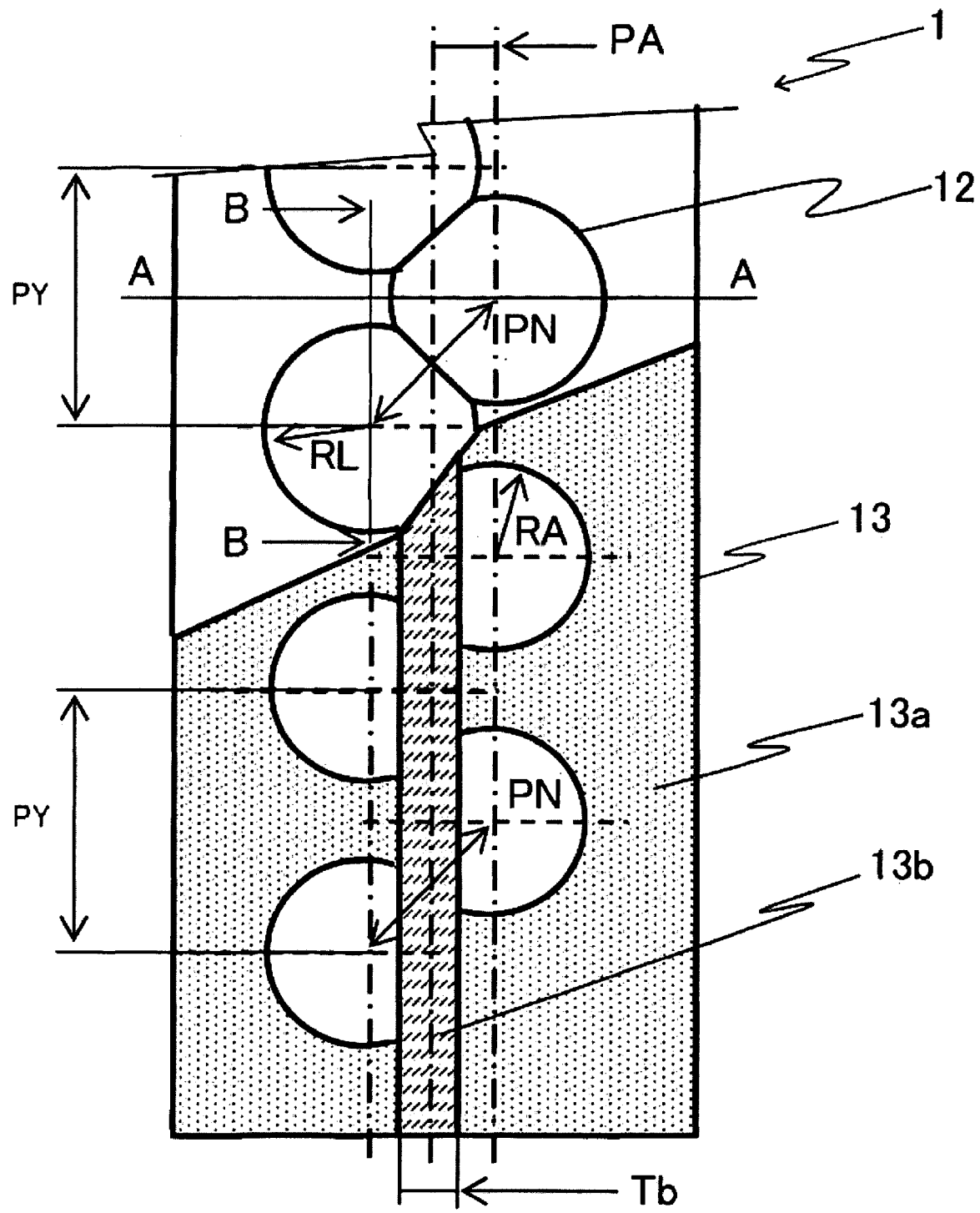
FIG. 4 is a figure showing the lens array used in the exposure device of this invention.
Figure 5:
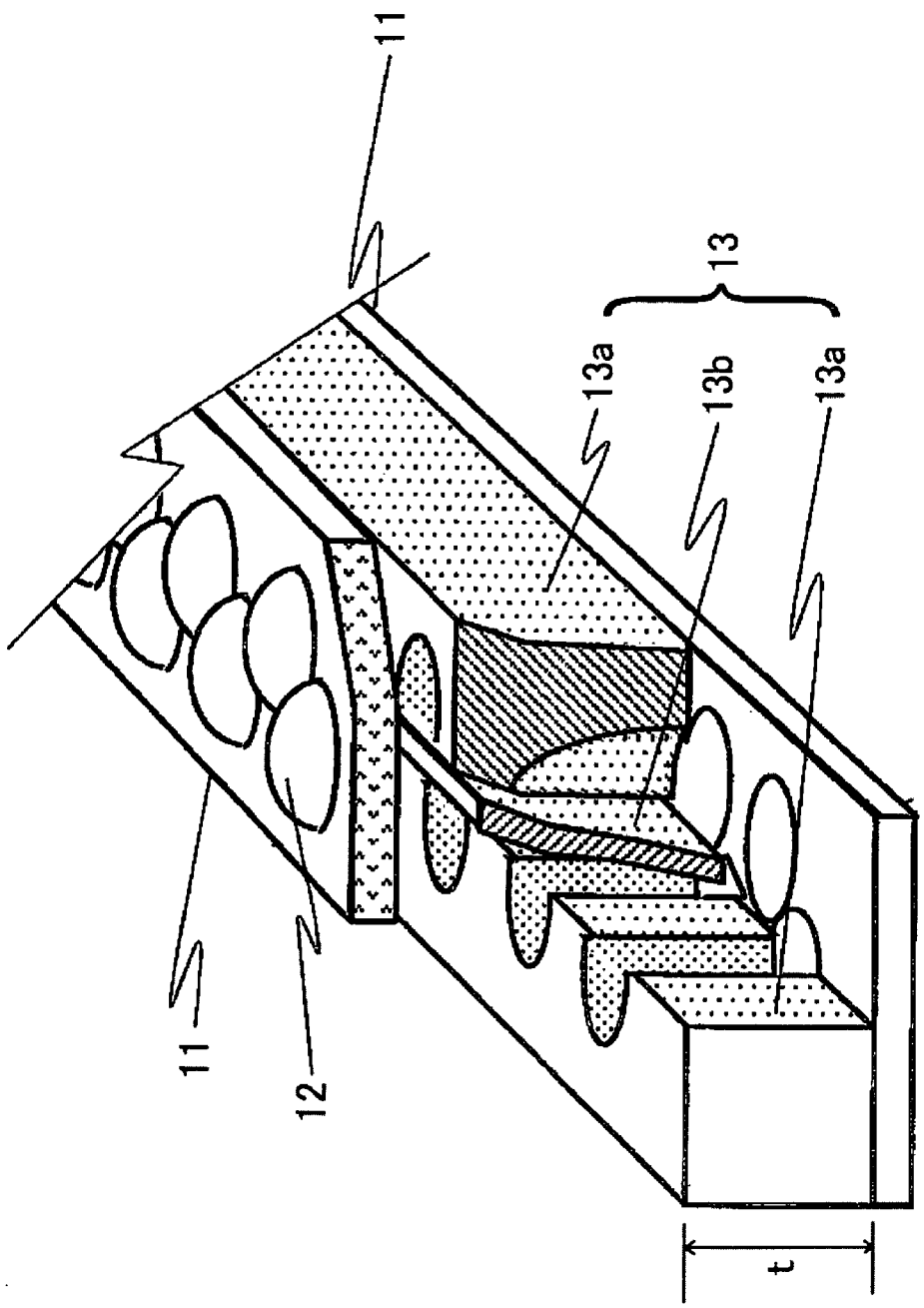
FIG. 5 is a figure showing the lens array used in the exposure device of this invention.
Figure 6:
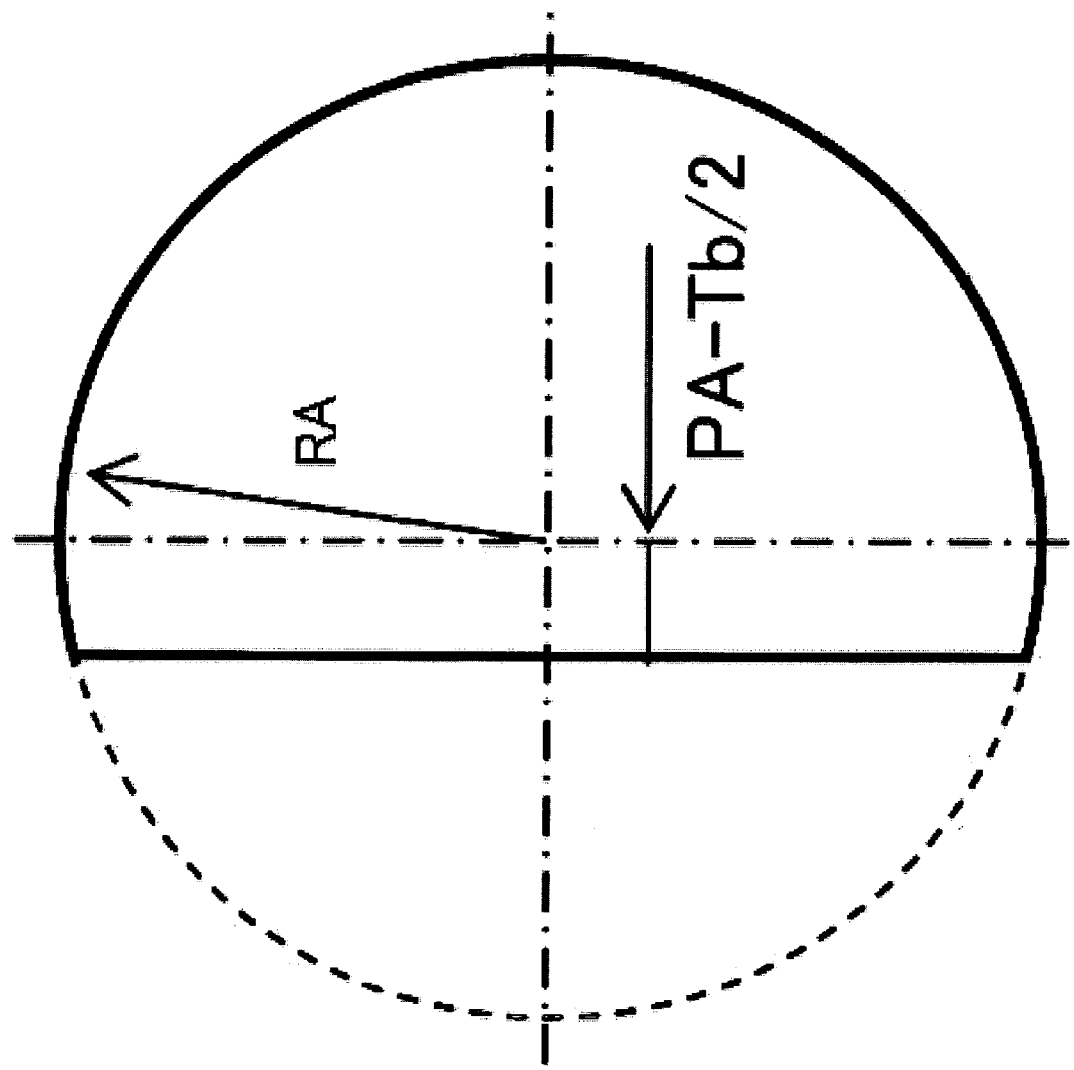
FIG. 6 is a figure showing the shape of an aperture of a shielding unit in the lens array used in the exposure device of this invention.

FIG. 4 is a plan view of the lens array in the LED array. FIG. 5 is a perspective view of the lens array. As shown in FIGS. 4 and 5, the lens array 1 has lens plates 11 as the first and second lens groups, micro lenses 12 as the first and second lenses, and a shielding unit 13 as a shielding unit. The shielding unit 13 has two comb members 13a having a length t in a direction of an optical axis and having apertures evenly spaced at an interval PY on one side of the comb member 13a, and also has a separating plate 13b having a thickness Tb and arranged between the two comb members 31a. As shown in FIG. 6, the aperture is in a shape of a circle having a radius RA, a distance PA exists between the center of the separating plate and the center of the circle (hereinafter referred to as the center of the aperture) having the radius RA, and the aperture is in a shape enclosed by the circle having the radius RA and a line arranged at a distance PA-Tb/2 from the center of the circle. The apertures of the comb members 13a face the apertures of the other comb members 13a via the separating plate 13b. The two comb members 13a are arranged so that the distance between the center of the aperture of the comb member 13a and the center of the aperture of the other comb member 13a on the opposite side over the separating plate 13b is PN. The comb members 13a and the separating plate 13 are formed with a material shielding the light beams from the light sources.

As shown in FIG. 5, the shielding unit 13 has the two lens plates 11 to shield the apertures so that the shielding unit 13 is sandwiched between the two lens plates 11. That is, a lens pair is formed with the two micro lenses 12 facing each other via the aperture of the shielding unit 13. On the lens plate 11, multiple micro lenses 12 are arranged in two rows in a staggered arrangement, and portions of the micro lenses 12 are arranged to overlap with the adjacent micro lenses 12. The micro lenses are arranged so that the interval between the micro lenses 12 on the same row is PY and that the distance between the center of the micro lens 12 and the width-wise center of the lens plate 11 is PA.

Figure 7:
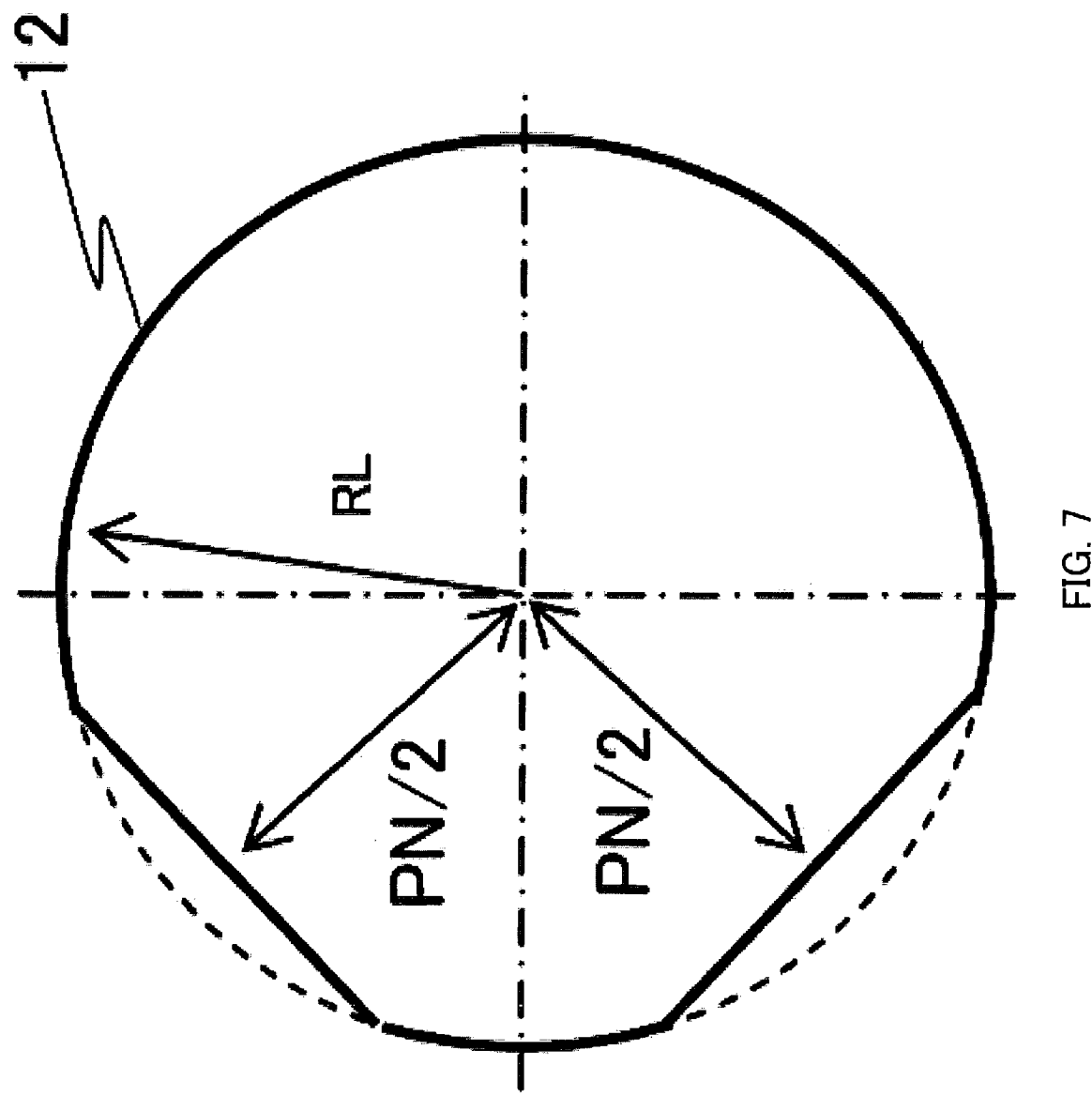
FIG. 7 is a figure showing the shape of a micro lens of the lens array used in the exposure device of this invention.

The micro lens 12 arranged on the lens plate 11 has two rotationally symmetrical high-order aspherical surfaces defined by Formula 1 below. In the cross section of the micro lens 12 taken along parallel to the lens plate 11 as shown in FIG. 7, the circle of the micro lens 12 has the radius RL, the distance between the center of the circle of the micro lens 12 and the center of the circle of the adjacent micro lens 12 is PN, and the micro lens 12 has a shape enclosed by the circle having the radius RL and two lines arranged at the distance PN/2 from the center of the circle having the radius RL.

$$z(r) = \frac{\frac{r^2}{C}}{1 + \sqrt{1 - \left(\frac{r}{C}\right)^2}} + Ar^4 + Br^6 \qquad \text{Formula 1}$$

This function z(r) is defined in a rotating coordinate system in which a coordinate in a direction of the radius is r and a direction parallel to the optical axis of the micro lens 12 is z axis. The origin of the coordinate axes is the vertex of the aspherical surface of each micro lens 12. The coordinate of z axis increases in a direction from the light emitting plane to the imaging plane in the lens array 1. C denotes a curvature radius, A denotes the fourth-order aspherical surface coefficient, and B denotes the sixth-order aspherical surface coefficient. The micro lens 12 of this invention is not limited to the one having the rotationally symmetrical high-order aspherical surface, but may have a spherical surface. Furthermore, the micro lens 12 may have a conic surface such as a parabola surface, an ellipse surface, a hyperboloid surface, and the like, and may have an aspherical toroid surface and an aspherical cylinder surface asymmetrical with respect to the optical axis. The micro lens 12 may have a publicly-known free-form surface.

Figure 8:
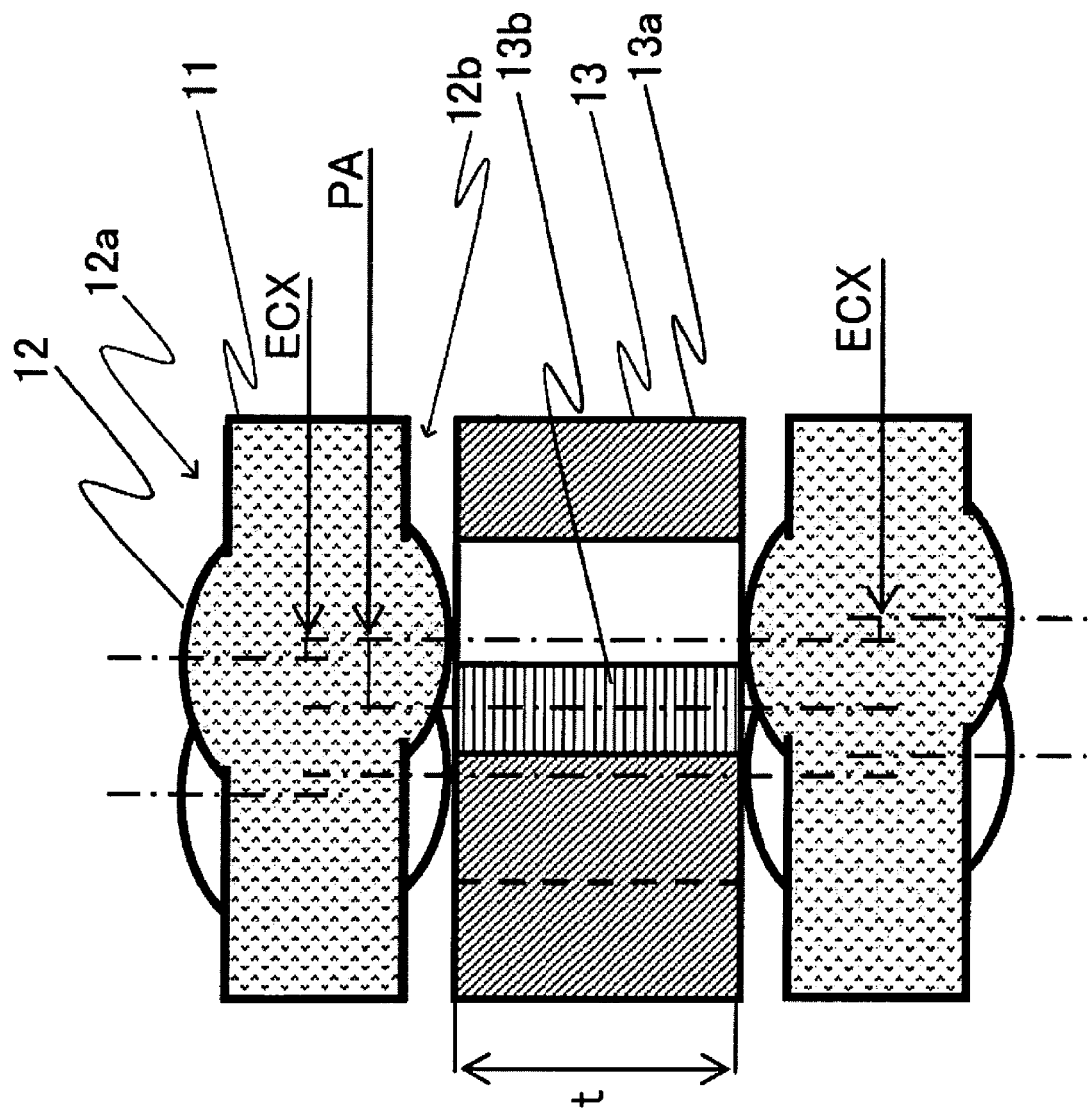
FIG. 8 is a cross section taken along line A-A in FIG. 4.
Figure 9:
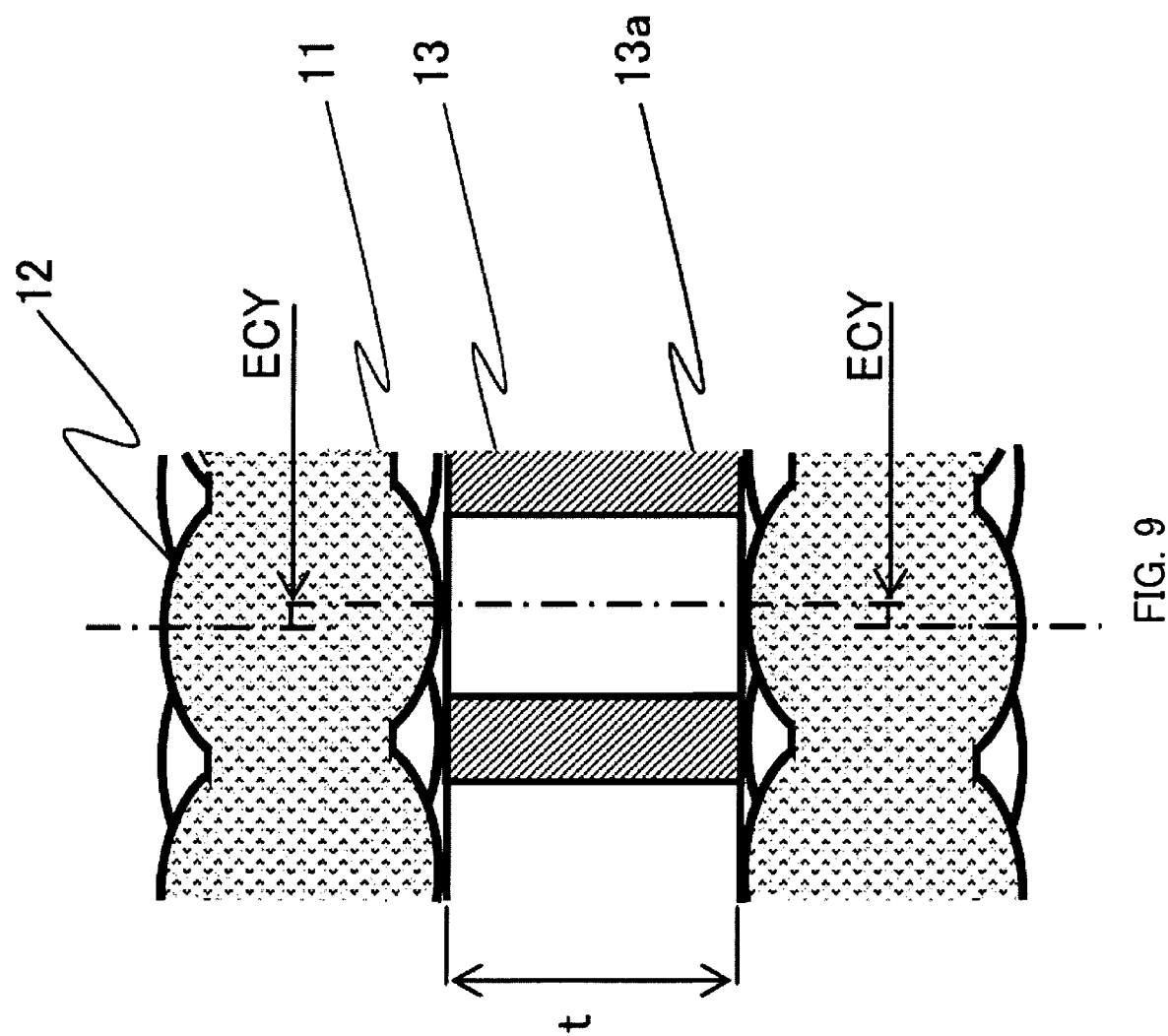
FIG. 9 is a cross section taken along line B-B in FIG. 4.

FIG. 8 is an A-A cross section of FIG. 4. FIG. 9 is a cross section taken along line B-B in FIG. 4. As shown in FIG. 8, in the micro lens 12 as described above, the central axis of an inner side curved surface 12b on a side of the shielding unit 13 is offset by a length ECX in a widthwise direction of the lens plate 11 from the central axis of an outer side curved surface 12a opposite to the inner side curved surface 12b. That is, the central axis of the outer curved surface 12a of the micro lens 12 in the upper side of FIG. 8 is offset to the left by the length ECX from the central axis of the inner side curved surface 12b. Similarly, the micro lens 12 on the opposite side of the shielding unit 13 has the optical axes offset by the length ECX in the widthwise direction of the lens plate 11, but the optical axis is offset to the right, which is opposite to the offset direction of the micro lens 12 of the upper side of FIG. 8.

As shown in FIG. 9, the central axis of the inner side curved surface 12b of the micro lens 12 is offset by a length ECY in a longitudinal direction of the lens plate 11 from the central axis of the outer side curved surface 12a. This offset direction in the longitudinal direction of the lens plate 11 is different from the above-described offset direction in the widthwise direction of the lens plate 11. The central axis of the outer side curved surface 12a of each micro lens 12 is offset to the left from the central axis of the inner side curved surface 12b. The off-center distance of the micro lens 12 having the offsets as described above is a length EC that is an offset between the central axis of the outer side curved surface 12a and the central axis of the inner side curved surface 12b. The off-center distance EC of the micro lens 12 can be calculated from a Pythagorean theorem $EC^2 = ECY^2 + ECX^2$ using the offset ECY in the longitudinal direction of the lens plate 11 and the offset ECX in the widthwise direction of the lens plate 11.

Figure 10:
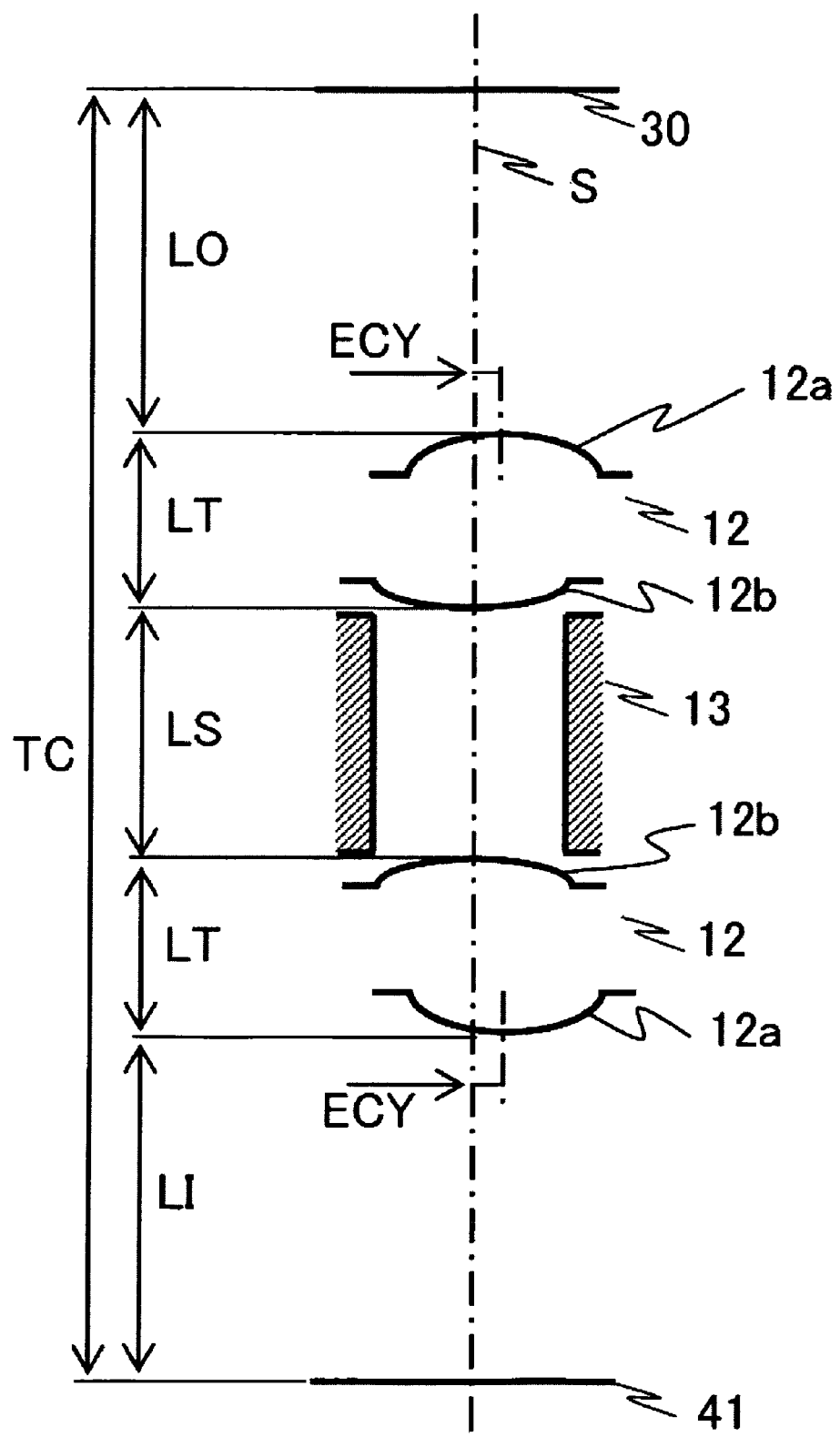
FIG. 10 is a schematic diagram showing the optical system of the exposure device of this invention.

FIG. 10 is a schematic diagram showing the optical system according to this invention. As shown in FIG. 2, the lens array 1 as described above is arranged between the photosensitive drum 41 and the LED array 30 at predetermined distances therefrom. At this moment, the surface of the photosensitive drum 41 is the imaging plane, and the surface of the LED array 30 is the object plane (hereinafter referred to as a light emitting plane in the first embodiment). It is assumed that the thickness of the micro lens 12 is LT, and the distance between each pair of micro lenses 12 is LS. It is assumed that the distance between the light emitting plane (the surface of the LED array 30) and the outer side curved surface 12a of the micro lens 12 on the light emitting plane side is LO, and that the distance between the imaging plane (the surface of the photosensitive drum 41) and the outer side curved surface 12a of the micro lens 12 on the imaging plane side is LI. The distance between the imaging plane and the light emitting plane is defined as TC. In this invention, it is assumed that an optical axis S of the micro lens 12 whose central axis is offset as described above is a line connecting the vertexes of each of the inner side curved surfaces 12b and the center of the aperture of the shielding unit 13.

The lens plate 11 constituting the lens array 1 as described above is made of, for example, a cycloolefin optical resin (made by ZEON CORPORATION under the trade name of ZEONEX E48R). The lens plate 11 and the multiple micro lenses 12 may be integrally formed through injection molding. For example, the micro lenses 12 have the arrangement intervals PY=1.2 mm, PA=0.2 mm, and PN=0.721 mm. Although the lens plate 11 is integrally formed including the multiple micro lenses 12 in this embodiment, this invention is not limited thereto. The micro lenses 12 may be formed separately and fixed at the predetermined arrangement interval.

The shielding unit 13 constituting the lens array 1 uses, for example, a polycarbonate, and can be formed through resin molding. The shielding unit 13 has, for example, the length in the optical axis direction t=2.5 mm, the aperture radius RA=0.45 mm, and the thickness of the separating plate 13b Tb=0.2 mm. The shielding unit 13 is not necessarily made though the resin molding, but may be formed through cutting operation. Alternatively, the shielding unit for shielding the light from the light source may be formed with the transparent material that has a shielding pattern thereon. The shielding unit may be formed on portions of the lens plate 11 to form the shielding pattern. Portions of the lens plate 11 may be roughened to shield the light, and furthermore, portions of the lens plate 11 may be cut off to shield the light.

Figure 11:
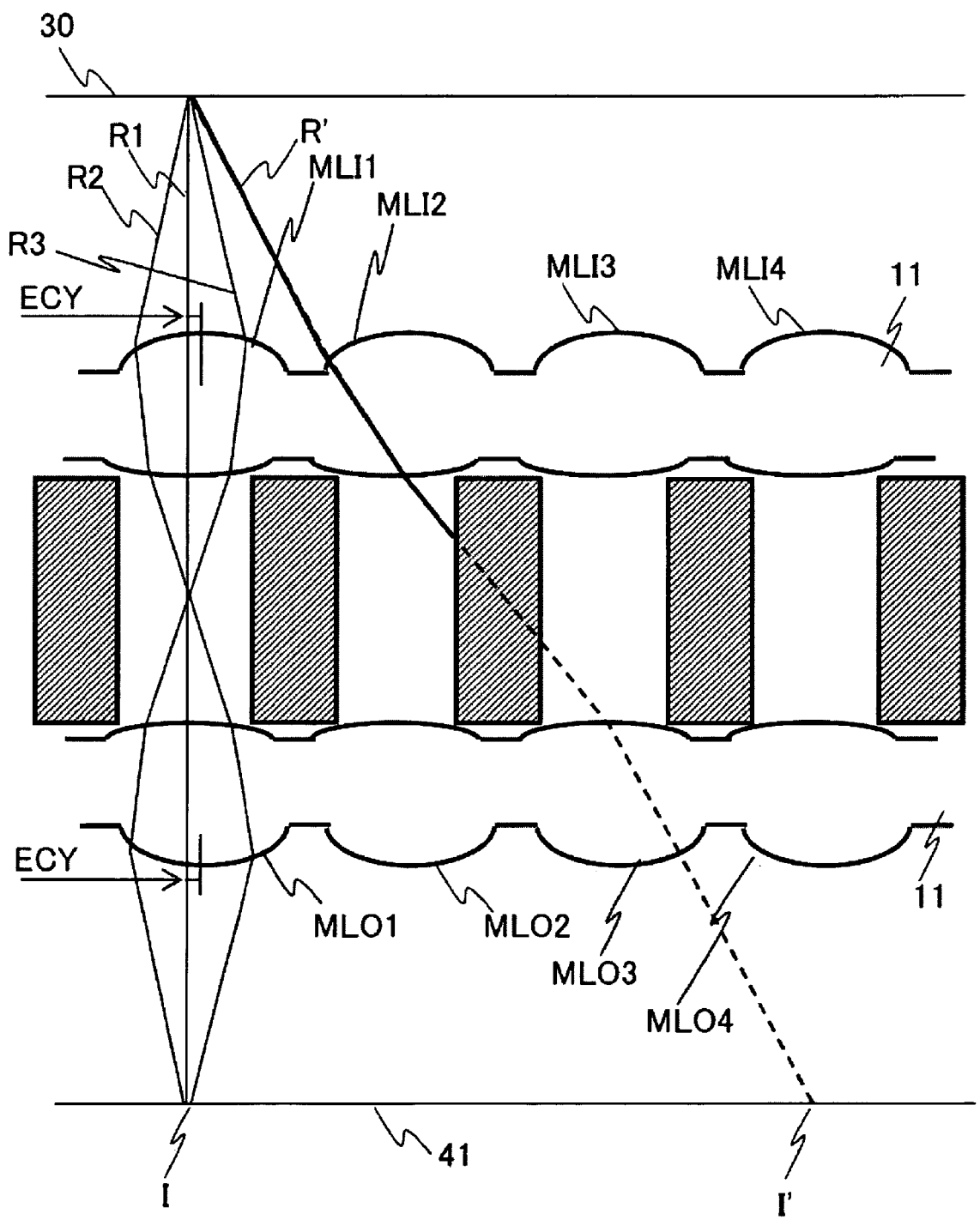
FIG. 11 is a figure showing the optical path in the lens array in the exposure device of this invention.

FIG. 11 is a figure showing the path of the light in the lens array 1. Among the members of the exposure device of this invention, FIG. 11 shows only the light emitting elements, some of the multiple micro lenses, the shielding unit, and the photosensitive drum. In the lens array 1, the lens plate 11 on the side of the light emitting elements 35 has the multiple micro lenses 12, namely, micro lenses MLI1, MLI2, MLI3, MLI4, . . . , and the lens plate 11 on the side of the imaging plane has the micro lenses 12, namely, micro lenses MLO1, MLO2, MLO3, MLO4, . . . as shown in FIG. 11.

When the light emitting device 35 emit light, the emitted light R1, R2, R3 enters into the micro lens MLI1 nearest to the light emitting element 35. The light R1, R2, R3 having entered the micro lens MLI1 is once converged in the aperture of the shielding unit 13, thereafter enters into the micro lens MLO1, and forms an optical image I on the photosensitive drum 41. A light R' having entered the micro lens MLI2 arranged next to the micro lens MLI1 nearest to the light emitting element 35 is shielded by the shielding unit 13. Accordingly, an optical image I' will not be formed on the photosensitive drum 41.

As described above, the light emitted from the light emitting element 35 is converged on the photosensitive drum 41 as an same-size erect image through the lens array, thus forming an exposure image of the light emitting element 35. The shielding unit 13A shields a so-called stray light, namely, a light that does not form an exposure image. Thus, the exposure image of the light emitting element 35 becomes clear.

Hereinafter described is a light quantity distribution of the exposure image formed by the exposure device of this invention. The lens array used in the exposure device has lengths and coefficients as shown in Table 1.

TABLE 1

| Variable | Description | Value in the Embodiment |
| --- | --- | --- |
| PY | Interval between adjacent micro lenses in arrangement direction (mm) | 1.200 |
| PN | Interval between adjacent micro lenses in a oblique direction (mm) | 0.721 |
| PA | Distance between center of lens and center of separating unit in widthwise direction | 0.200 |
| LO | Distance between object and lens surface (mm) | 2.300 |
| RL | Radius of micro lens (mm) | 0.500 |
| CO | Curvature radius of outer side curved surface (mm) | 0.6915 |
| AO | 4th-order aspherical surface coefficient of outer side curved surface | −0.3150 |
| BO | 6th-order aspherical surface coefficient of outer side curved surface | −0.3378 |
| CI | Curvature radius of inner side curved surface (mm) | −1.3786 |
| AI | 4th-order aspherical surface coefficient of inner side curved surface | 0.6100 |
| BI | 6th-order aspherical surface coefficient of inner side curved surface | 1.2575 |

TABLE 1-continued

| Variable | Description | Value in the Embodiment |
|---|---|---|
| LT | Thickness of lens (mm) | 1.000 |
| LS | Distance between the surfaces of the lenses (mm) | 2.520 |
| RA | Radius of aperture of shielding unit (mm) | 0.450 |
| t | Thickness of shielding unit in optical axis direction (mm) | 2.500 |
| LI | Distance between imaging plane and surface of lens | 2.300 |
| TC | Distance between imaging plane and object plane (mm) | 9.120 |

Figure 12:
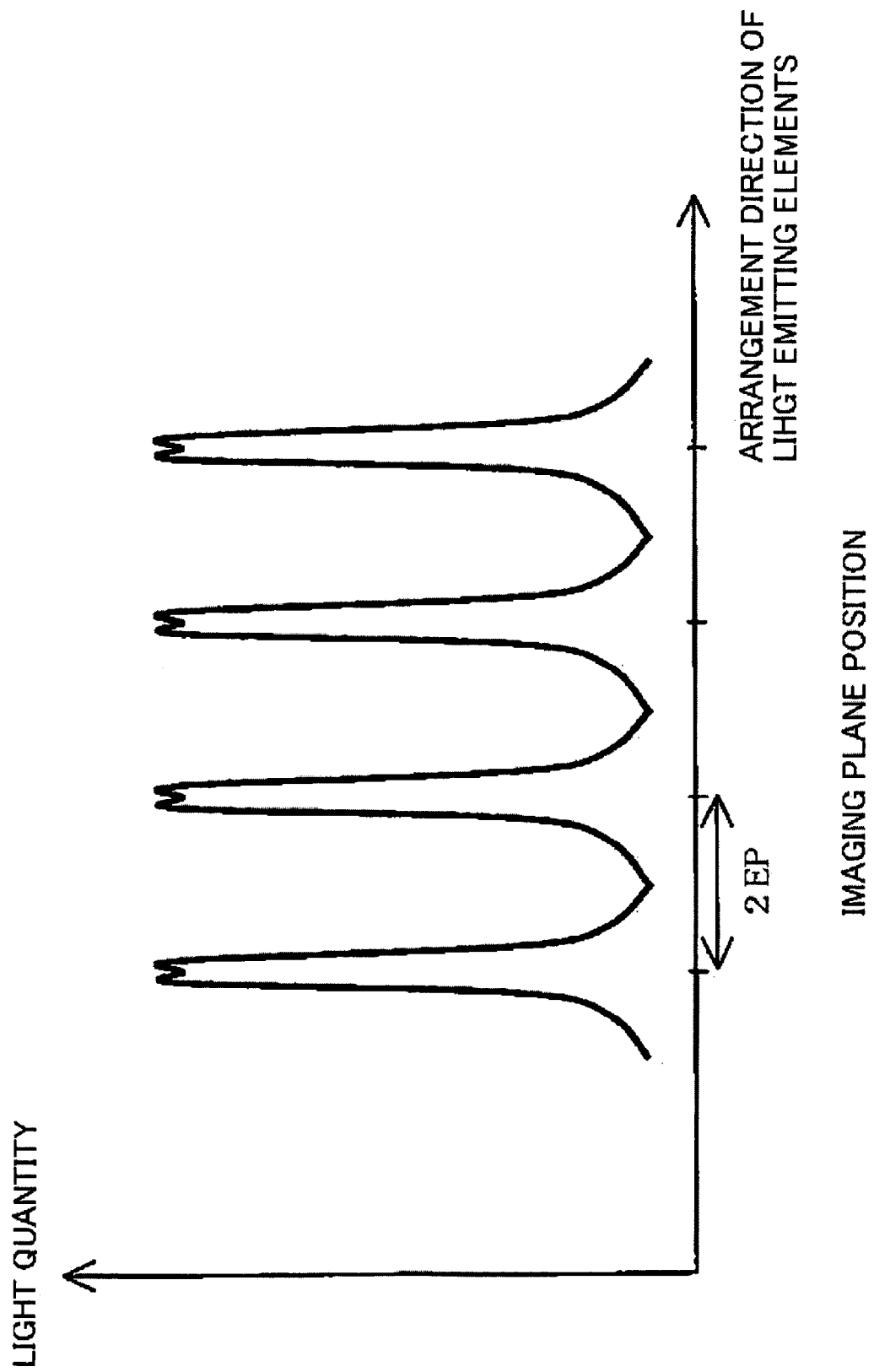
FIG. 12 is a figure showing the light distribution in a case where the axial off-center distance EC of the micro lens is less than half of the arrangement interval EP.
Figure 13:
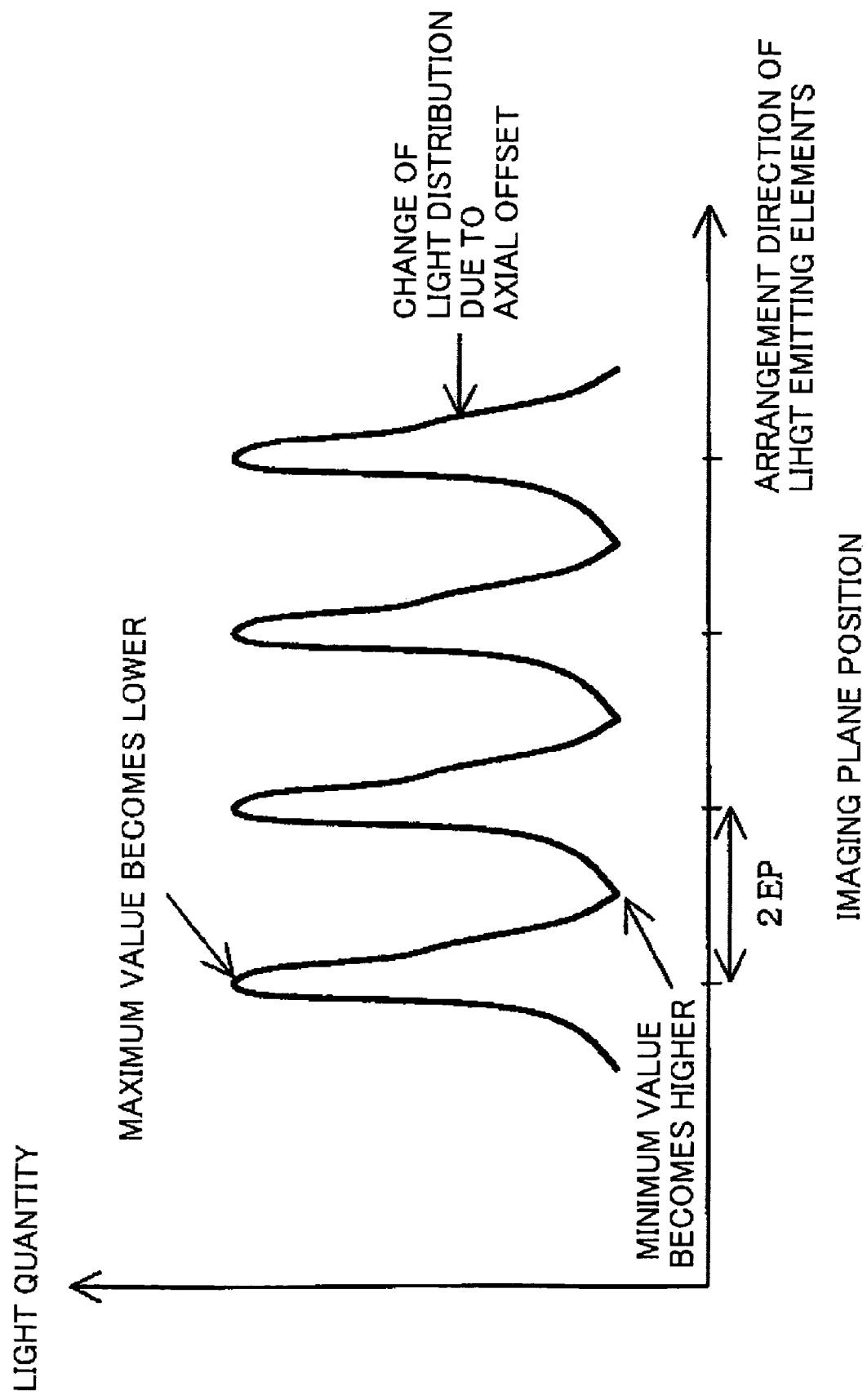
FIG. 13 is a figure showing the light distribution in a case where the axial off-center distance EC of the micro lens is more than half of the arrangement interval EP.

FIG. 12 is a light quantity distribution in a case where the axial off-center distance EC of the micro lenses is less than half of the arrangement interval EP. FIG. 13 is a light quantity distribution in a case where the axial off-center distance EC of the micro lenses is more than half of the arrangement interval EP. It should be noted that these are the light quantity distributions in a case where every two light emitting elements 35 are made to emit light, namely, where the interval between the light emitting elements 35 emitting light is 2EP.

As shown in FIG. 12, in the case where the axial off-center distance EC of the micro lenses is less than half of the arrangement interval EP, the exposure image of the light emitting elements 35 has high contrast. On the other hand, as shown in FIG. 13, in the case where the axial off-center distance EC of the micro lenses is more than half of the arrangement interval EP, the maximum light quantity of the exposure image becomes lower, and the light quantity distribution of each light emitting element becomes wider on the lower portion of the FIG. 13, and thus, the contrast of the exposure image of the light emitting elements 35 becomes lower.

Hereinafter described is a measurement result of an MTF (Modulation Transfer Function) showing the resolution of the optical image. It should be noted that the MTF shows the resolution of the exposure device, and shows the contrast of the light quantity in the optical image made by the LED array emitting light in the exposure device. Where the MTF is 100%, the optical image has the highest contrast, and the exposure device produces a high resolution. As the MTF becomes lower, the optical image has a lower contrast, and the exposure device produces a lower resolution. The MTF (%) is defined as MTF=$(I_{max}-I_{min})/(I_{max}+I_{min})\times 100(\%)$, where the maximum light quantity of the optical image is $I_{max}$, and the minimum light quantity between the two adjacent optical images is $I_{min}$.

Figure 15:
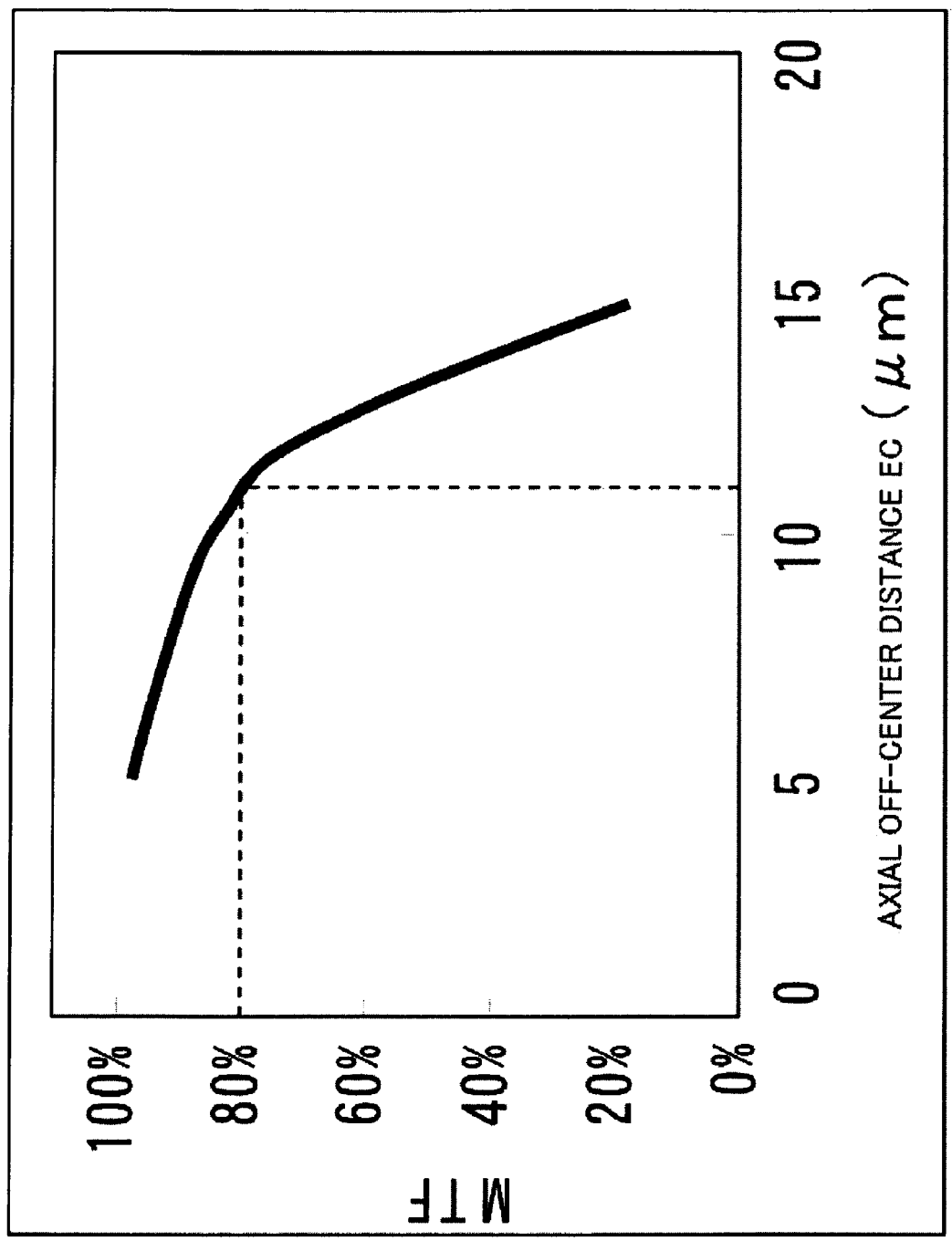
FIG. 15 is a figure showing the relationship between the axial off-center distance EC and MTF in the exposure device of the resolution 1200 dpi.
Figure 16:
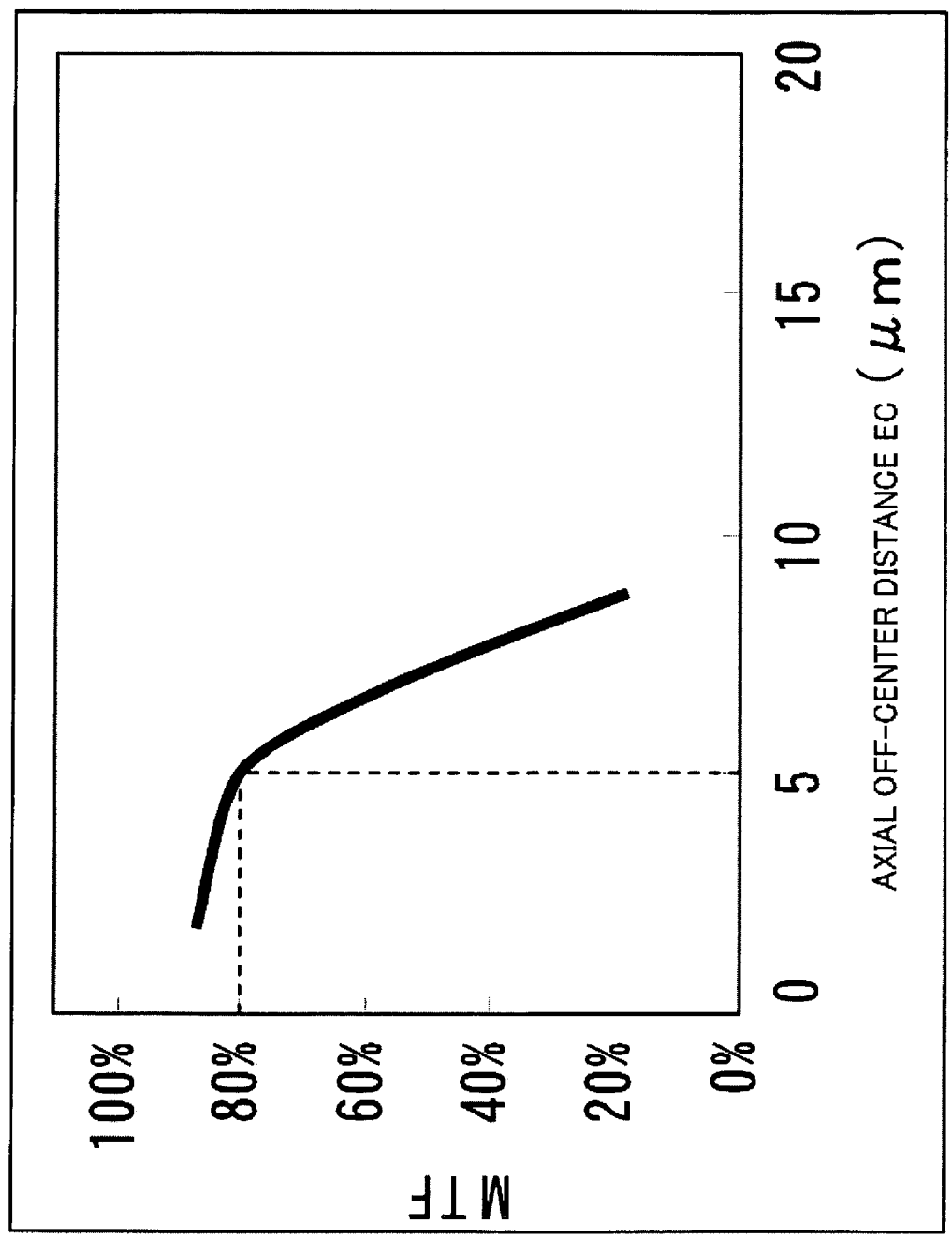
FIG. 16 is a figure showing the relationship between the axial off-center distance EC and MTF in the exposure device of the resolution 2400 dpi.

To measure the MTF, a microscopic digital camera is used to take a picture of the optical image at a position away by the distance LI (mm) as recited in Table 1 from the end surface of the lens array 1 of the exposure device 3 on the imaging plane side (the side of the photosensitive drum 41) and by analyzing the taken picture to figure out the light quantity distribution of the optical image of the light emitting element 35 to calculate the MTF. In the lens array 1 used in this measurement, the lens plate 11 on the light emitting plane side (the side of the LED array 30) has the micro lenses 12 whose optical axes are offset only in the arrangement direction of the light emitting element 35 and are not offset in a direction perpendicular to the arrangement direction, and the lens plate 11 on the object plane side (the side of the photosensitive drum 41) has the micro lenses 12 whose optical axes are not offset. The lens arrays 1 having various axial off-center distances EC are used to measure the MTF for each resolution. Every two light emitting elements 35 are made to emit light in the exposure device including the LED array 30 having the resolution 600 dpi as shown in FIG. 14, the exposure device including the LED array 30 having the resolution 1200 dpi as shown in FIG. 15, the exposure device including the LED array 30 having the resolution 2400 dpi as shown in FIG. 16.

Figure 14:
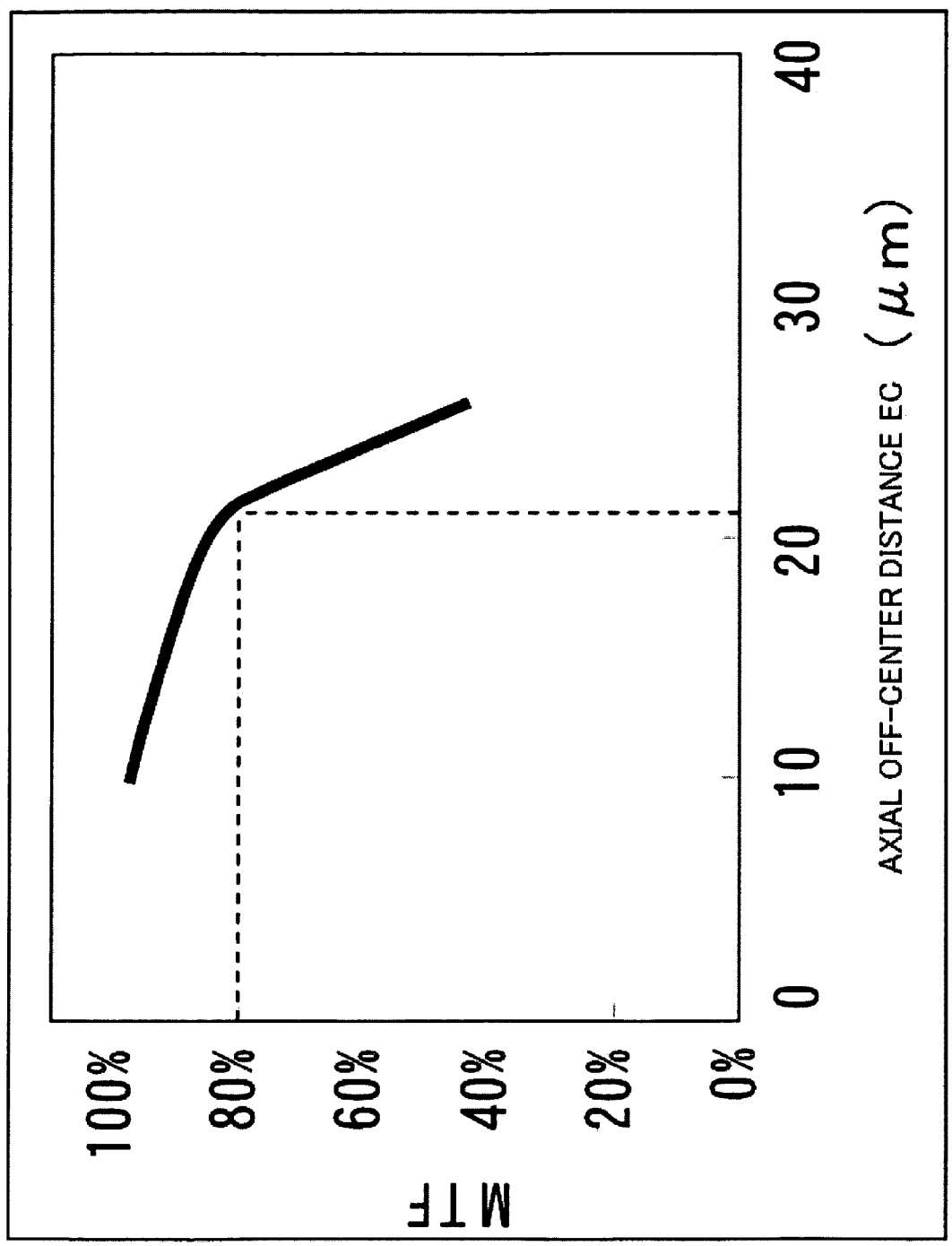
FIG. 14 is a figure showing the relationship between the axial off-center distance EC and MTF in the exposure device of the resolution 600 dpi.

As shown in FIG. 14, in the exposure device having the resolution 600 dpi, the MTF becomes 80% or more where EC is less than 21 µm. In the range where EC is more than 21 µm, the MTF curve becomes steeper. This means that the variation of the MTF with respect to the variation of EC is large in the range where EC is more than 21 µm. As shown in FIG. 15, the MTF is equal to or more than 80% in the exposure device having the resolution 1200 dpi where EC is less than 10.6 µm. The MTF curve becomes steeper in the range where EC is more than 10.6 µm. This means that the variation of the MTF with respect to the variation of EC is larger in the range where EC is more than 10.6 µm. As shown in FIG. 16, the MTF is equal to or more than 80% in the exposure device having the resolution 2400 dpi where EC is less than 5.3 µm. The MTF curve becomes steeper in the range where EC is more than 5.3 µm. This means that the variation of the MTF with respect to the variation of EC is large in the range where EC is more than 6 µm.

Specifically, in a case of the exposure device having the resolution 600 dpi as shown in FIG. 14, the MTF suddenly drops to less than 80% where the axial off-center distance EC becomes more than 21 µm. The resolution is 600 dpi (600 dots per inch) and 1 inch is 25400 µm, and accordingly, the distance EP between the adjacent light emitting elements is EP=25400/600=42 µm. It is preferable to satisfy EC<21 µm=42 µm/2=EP/2 because a picture of good quality cannot be obtained unless the MTF is equal to or more than 80%. Thus, EC should be less than EP/2. Similarly, in a case of the exposure device having the resolution 1200 dpi as shown in FIG. 15, the MTF suddenly drops to less than 80% where the offset EC becomes more than 10.6 µm. The resolution is 1200 dpi and 1 inch=25400 µm, and accordingly, the distance EP between the adjacent light emitting elements is EP=25400/1200≈21.2 µm. Considering that the MTF should be equal to or more than 80%, it is preferable to satisfy EC<10.6 µm=21.2 µm/2=EP/2. Thus, EP should be less than EP/2. Similarly, in a case of the exposure device having the resolution 2400 dpi as shown in FIG. 16, the MTF suddenly drops to less than 80% where the offset EC becomes more than 5.3 µm. The resolution is 2400 dpi and 1 inch=25400 µm, and accordingly, the distance EP between the adjacent light emitting elements is EP=25400/2400≈10.6 µm. Considering that the MTF should be equal to or more than 80%, it is preferable to satisfy EC<5.3 µm=10.6 µm/2=EP/2. Thus, EC should be less than EP/2. As described above, EC<EP/2 can be generally derived from the data based on the three resolutions, namely, 600 dpi, 1200 dpi, and 2400 dpi.

Subsequently, the lens array according to this embodiment was installed in the image forming apparatus, namely, a color LED printer. The image quality of images formed by the LED color printer having the lens array according to this embodiment was evaluated. The quality of an image formed by each of the image forming apparatuses was evaluated by forming and evaluating an image in which every two pixels are printed in the entire pixels. In the image forming apparatus of the resolution 600 dpi, the lens array including the lens plate whose axial off-center distance EC is less than 21 μm produced an image of good quality. On the other hand, the lens array including the lens plate whose axial off-center distance EC is equal to or more than 22 μm produced streaks and uneven density. In the image forming apparatus of the resolution 1200 dpi, the lens array including the lens plate whose axial off-center distance EC is less than 11 μm produced an image of good quality. On the other hand, the lens array including the lens plate whose axial off-center distance EC is equal to or more than 12 μm produced streaks and uneven density. In the image forming apparatus of the resolution 2400 dpi, the lens array including the lens plate whose axial off-center distance is less than 5 μm produced an image of good quality. On the other hand, the lens array including the lens plate whose axial off-center distance EC is equal to or more than 6 μm produced streaks and uneven density. Thus, an image of good quality without streaks and uneven density can be obtained where the measured MTF value is equal to or more than 80% and where the variation of the MTF is small with respect to EC.

Hereinafter described is the reason why an image of good quality can be obtained where the MTF is less than 80%. Essentially, it is necessary to sufficiently raise the potential of a portion of the electrostatic latent image to which the toner should not be attached in a printed image, and such portion should be dark in an image formed by the LED head. However, if the MTF value does not reach 80%, a light from the LED head may be emitted to a portion of an image that should not be exposed to light, thereby reducing the potential of such portion that should have a sufficiently high potential in the electrostatic latent image. As described above, the toner attached to the portion having the high potential produces streaks and dark spots in the printed image obtained though the above-described image evaluation method. Thus, a threshold value should be MTF=80%.

From this result and the relationship between the resolution of the exposure device and the arrangement interval of the light emitting elements, it can be understood that the axial off-center distance EC of the micro lens 12 and the arrangement interval EP of the light emitting elements 35 in the exposure device 3 should satisfy a relationship EC<EP/2 in order to obtain good optical characteristics.

This embodiment can prevent deterioration of the resolution conventionally occurring with lenses having axial offsets. In the exposure device according to this embodiment, a formula EC<EP/2 is satisfied in the relationship between the axial off-center distance EC and the arrangement interval EP of the light emitting elements 35 in the exposure device 3. The axial off-center distance EC is an offset distance between the central axis of the micro lens 12 on the light emitting plane side (the side of the LED array 30) and the central axis of the micro lens 12 on the imaging plane side (the side of the photosensitive drum 41). The image forming apparatus 100 having the exposure device can form an image on a printing medium P according to print data without producing streaks, uneven density, and the like deteriorating the quality of the image printed on the print medium P.

The exposure device and the image forming apparatus of this invention does not need the high-precision micro lenses 12 whose axial off-center distance EC is small. The exposure device and the image forming apparatus of this invention can use the lens plates 11 in which the multiple micro lenses 12 are formed integrally to constitute the lens group, and can also use the micro lenses 12 formed though resin molding. That is, an image of good quality can be obtained, even where the lens plate 11 having the integrally-formed multiple micro lenses 12 is used. An image of good quality can also be obtained, even where the micro lenses 12 formed through resin molding is used.

Second Embodiment

In the second embodiment, an image reading apparatus is described. The image reading apparatus according to the second embodiment uses the lens array used in the exposure device in the image forming apparatus according to the first embodiment.

Figure 17:
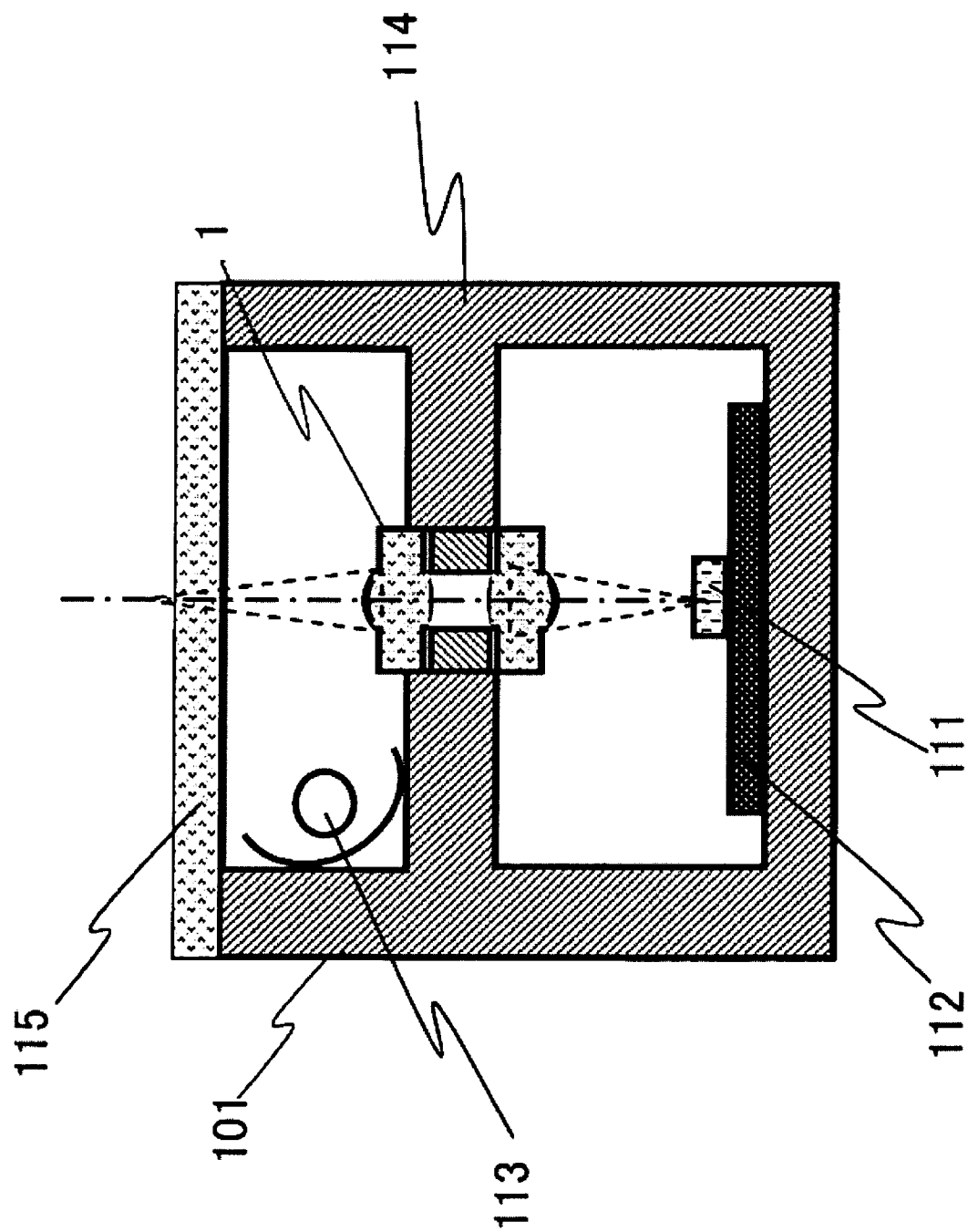
FIG. 17 is a figure showing a reading apparatus of this invention.

FIG. 17 is a cross section of the reading apparatus according to this invention. As shown in FIG. 17, the reading apparatus 101 is held by a holding member 114. The reading apparatus 101 has the lens array 1 being the same as the first embodiment, light receiving elements 111 formed on a wiring circuit board 112 in the holding member 114 for converting a received optical image into an electric signal, and a light source 113 arranged between the holding member 114 and a document table 115 supporting a document. The light source 113 emits light to the document to be read. The light receiving elements 111 are arranged on a line and are spaced at an interval RP on the wiring circuit board 112.

The arrangement interval RP is changed as necessary according to the resolution of the reading apparatus. For example, the arrangement interval RP is 42 μm in a case of the exposure device of 600 dpi. The arrangement interval RP is 21 μm in a case of the exposure device of 1200 dpi. The arrangement interval RP is 10.6 μm in a case of the exposure device of 2400 dpi.

Figure 18:
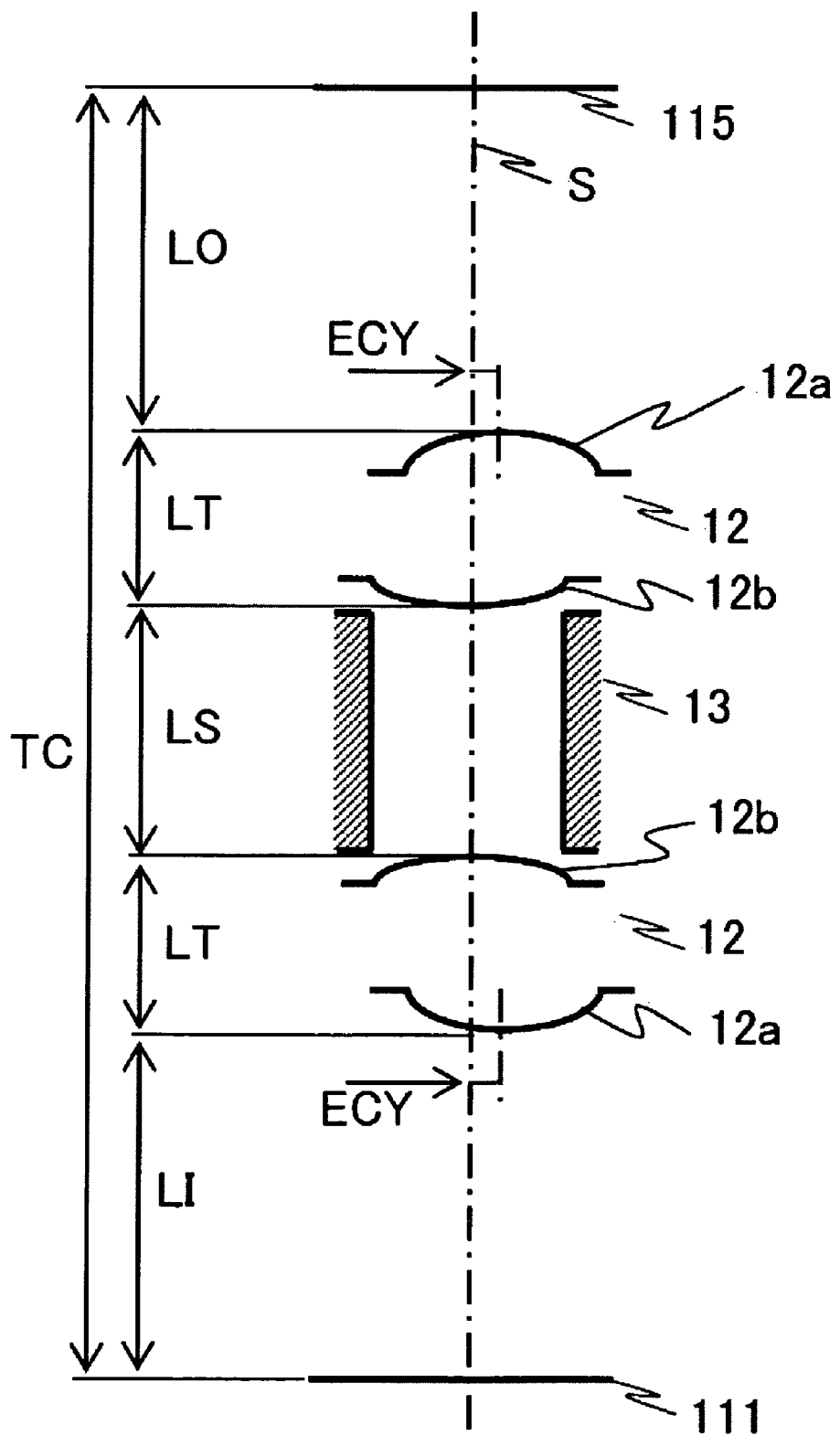
FIG. 18 is a schematic diagram showing the optical system of the reading apparatus of this invention.

FIG. 18 is a schematic diagram showing the optical system in the reading apparatus of this invention. The lens array 1 in the second embodiment is the same as the lens array 1 according to the first embodiment. The lens array 1 is arranged between the light receiving elements 111 and the document on the document table 115 at predetermined distances therefrom. At this moment, the surfaces of the light receiving elements 111 is an optical plane, and the surface of the document to be read is an object plane. It is assumed here that the thickness of the micro lens 12 is LT, that the distance between the micro lenses 12 is LS, that the distance between the outer side curved surface 12a of the micro lens 12 on the light emitting plane side and the outer side curved surface 12a of the micro lens 12 on the object plane side (the surface of the document) is LO, and that the distance between the imaging plane (the surface of the light receiving element 111) and the outer side curved surface 12a of and the object plane is defined as TC. The optical axis S of the micro lens 12 whose central axis is offset as described above is a line connecting the vertexes of the inner side curved surfaces 12b and the center of the aperture of the shielding unit 13.

In the reading apparatus as described above, the light emitted from the light source 113 is reflected on the surface of the document, not shown, arranged on the top surface of the document table 115. Some of the reflected light from the document passes through the lens array 1 and forms an optical image on the surface of the light receiving element 111. The light receiving element 111 converts the optical image into the electric signal. An image processing unit, not shown, generates image data based on the electric signal corresponding to the optical image of the document.

Using the reading apparatus as described above with various lens arrays 1 including the micro lenses 12 of different axial off-center distances EC according to the resolutions, a document was actually read and image data thereof were generated. The document to be read by the reading apparatus has an image in which every two pixels are printed in the entire pixels. Such document was prepared for each resolution. That is, a document having the dots printed at every 84 μm on the print medium P was used for the resolution 600 dpi. A document having the dots printed at every 42 μm on the print medium P was used for the resolution 1200 dpi. A document having the dots printed at every 21 μm on the print medium P was used for the resolution 2400 dpi.

First, with the reading apparatus of the resolution 600 dpi, image data of good quality faithfully reproducing the image on the document was obtained using the lens array 1 consisting of the micro lenses 12 whose axial off-center distance EC is less than 21 μm. On the other hand, in a case where the lens array 1 consisting of the micro lenses 12 whose axial off-center distance EC is 22 μm or more, the dots printed at every two pixels were sometimes incorrectly read as two successive dots, and some dots were not read at all. With the reading apparatus of the resolution 1200 dpi, image data of good quality faithfully reproducing the image on the document was obtained using the lens array 1 consisting of the micro lenses 12 whose axial off-center distance EC is less than 11 μm. On the other hand, in a case where the lens array 1 consisting of the micro lenses 12 whose axial off-center distance EC is 11 μm or more, the dots printed at every two pixels were sometimes incorrectly read as two successive dots, and some dots were not read at all. With the reading apparatus of the resolution 2400 dpi, image data of good quality substantially the same as the document was obtained using the lens array 1 consisting of the micro lenses 12 whose axial off-center distance EC is less than 5 μm. On the other hand, in a case where the lens array 1 consisting of the micro lenses 12 whose axial off-center distance EC is 5 μm or more, the dots printed at every two pixels were sometimes incorrectly read as two successive dots, and some dots were not read at all.

From this result, it can be understood that a formula EC<RP/2 is satisfied in the relationship between the arrangement interval RP of the light receiving elements 111 and the axial off-center distance EC of the micro lens 12 in the reading apparatus 101 providing good optical characteristics.

As hereinabove described, the image data faithfully reproducing the image on the document can be obtained by satisfying a formula EC<RP/2 in the relationship between the arrangement interval EP of the light receiving elements 111 and the axial off-center distance EC in the reading apparatus 101, namely, the offset distance between the central axis of the micro lens 12 on the object plane side (the side of the document) and the central axis of the micro lens 12 on the imaging plane side (the side of the light receiving element).

The reading apparatus according to this invention does not need the high-precision micro lenses 12 whose axial off-center distance EC is small. The reading apparatus according to this invention can use the lens plates 11 in which the multiple micro lenses 12 are formed integrally to constitute the lens group, and can also use the micro lenses 12 formed though resin molding. That is, the reading apparatus according to this invention can provide image data faithfully reproducing the image on the document, even where the reading apparatus uses the lens plates 11 having the integrally-formed multiple micro lenses 12. Furthermore, the reading apparatus can also provide image data faithfully reproducing the image on the document, even where the reading apparatus uses the micro lenses 12 formed through resin molding.

Third Embodiment

In the third embodiment, the lens array used in the exposure device in the image forming apparatus will be described with respect to the structure, the operation, the optical characteristics, and the like.

Figure 19:
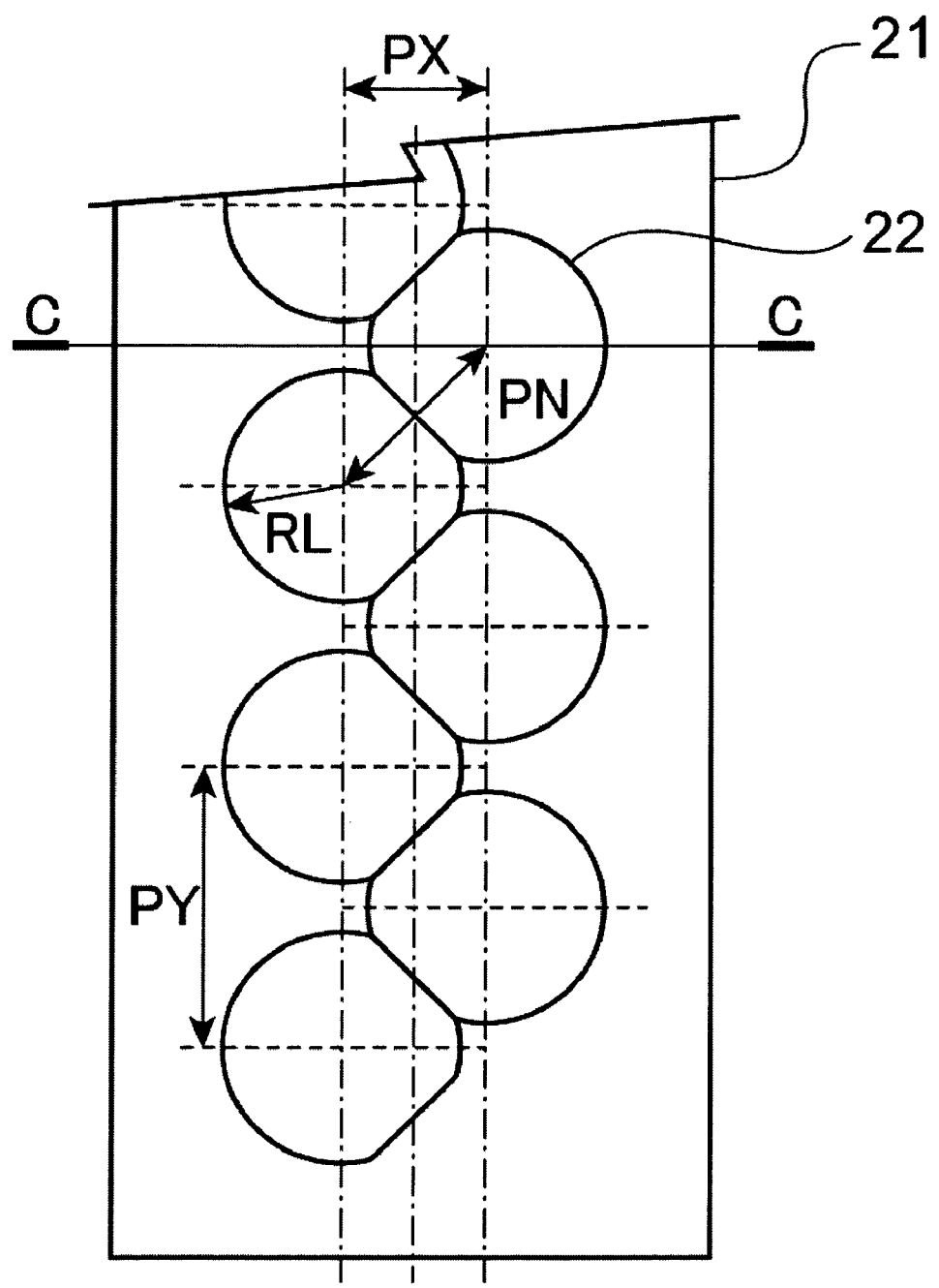
FIG. 19 is a plan view of the lens array used in the exposure device of this invention.
Figure 20:
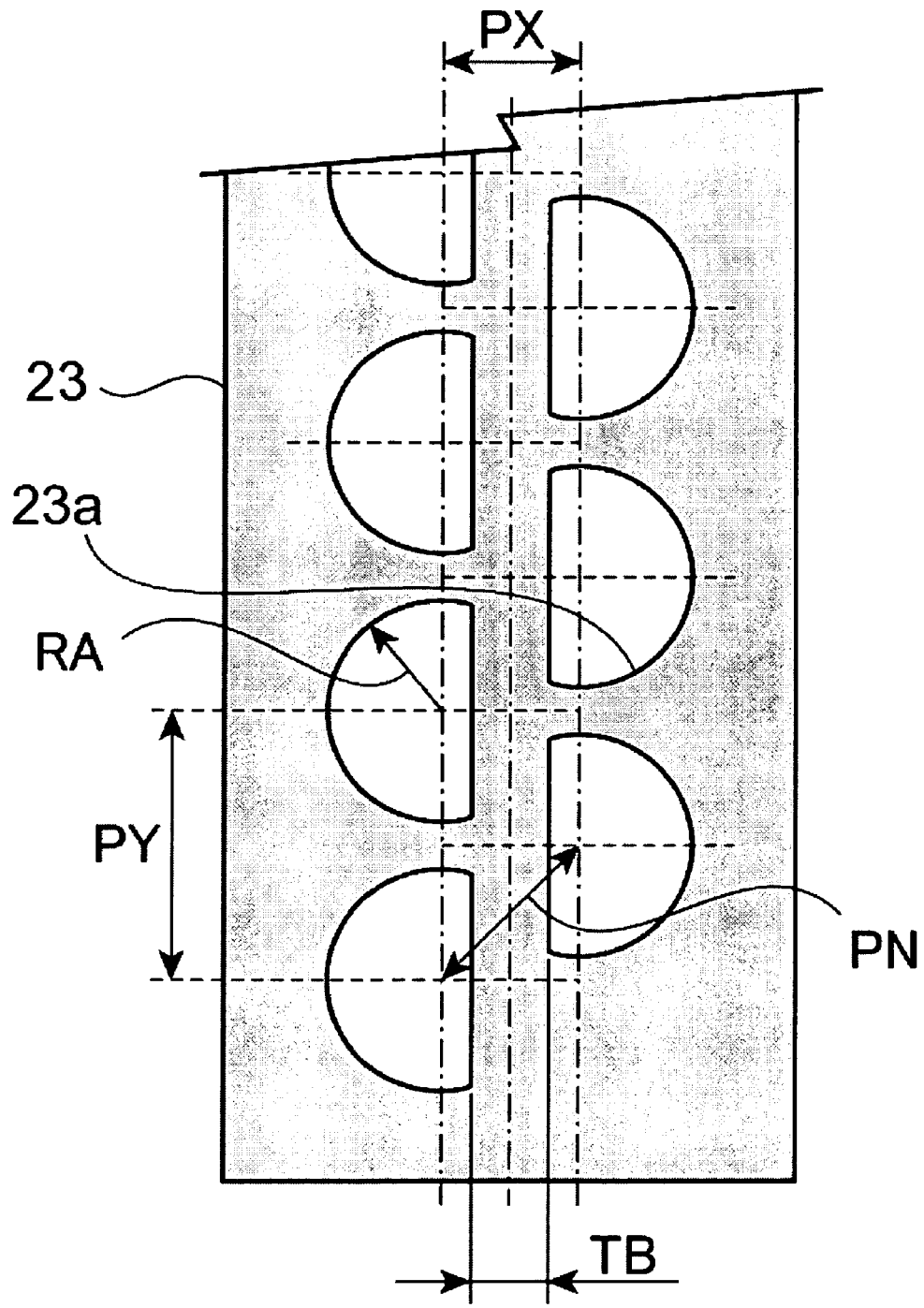
FIG. 20 is a plan view of a shielding unit used in the exposure device of this invention.
Figure 21:
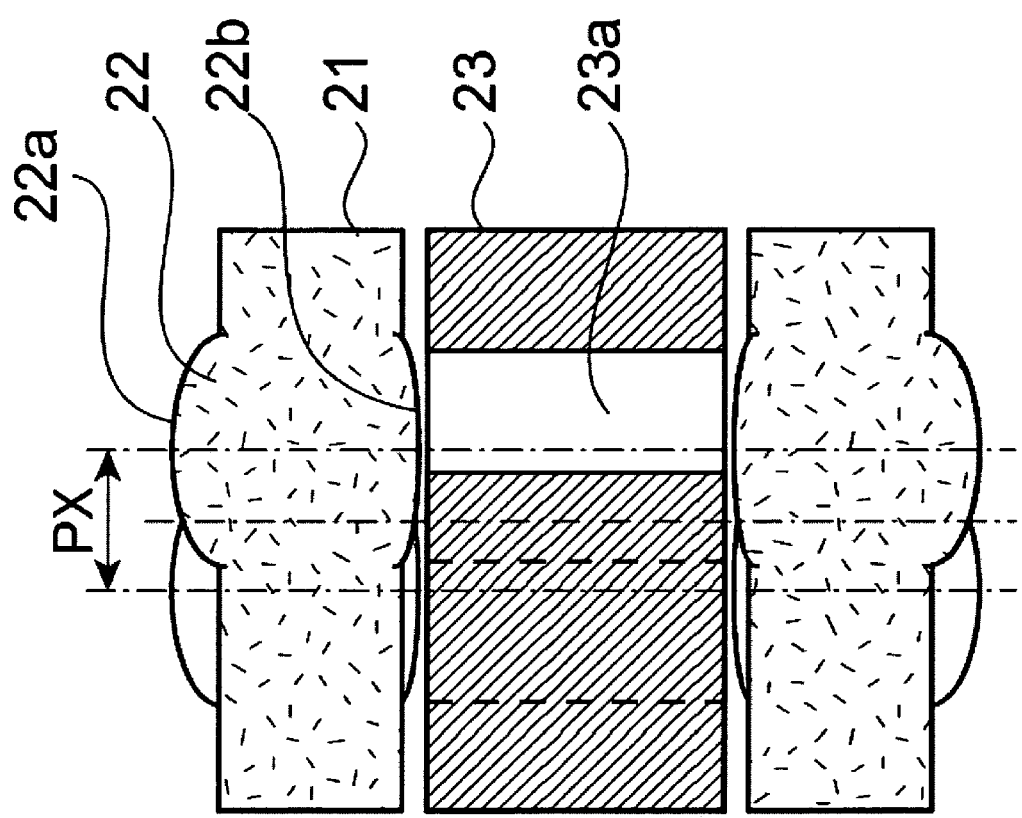
FIG. 21 is a cross section taken along line C-C in FIG. 19.
Figure 22:
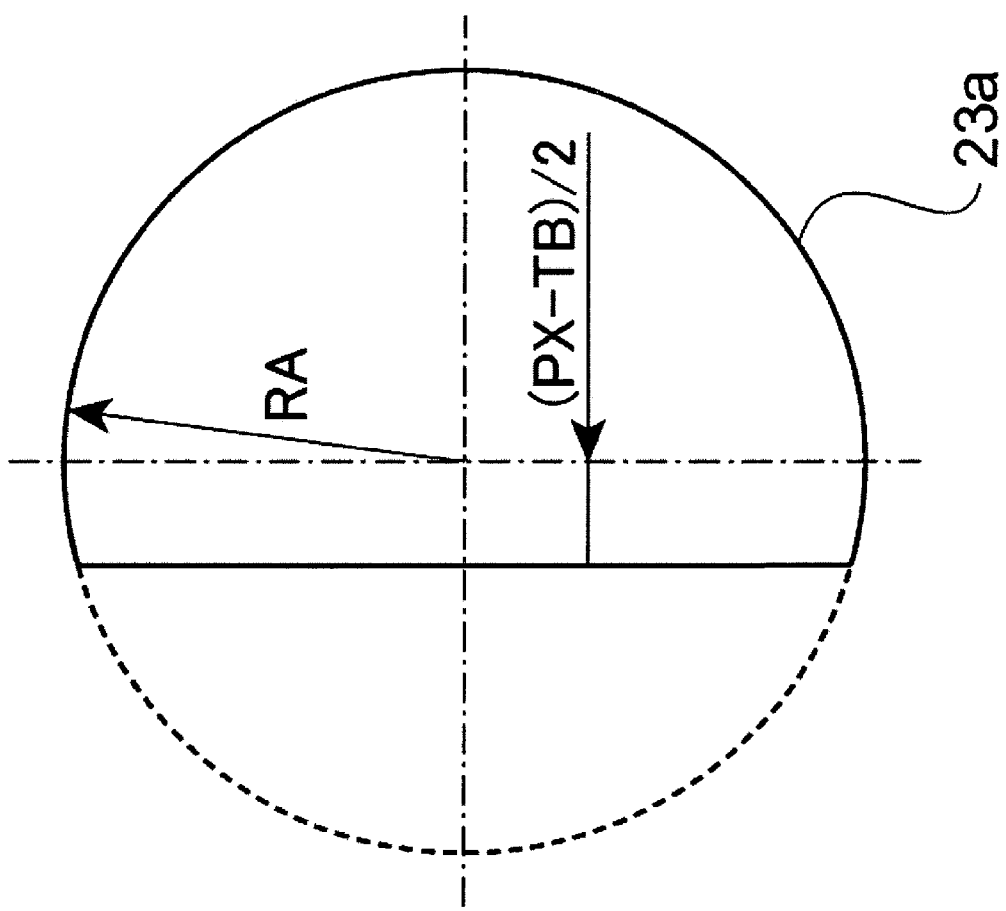
FIG. 22 is a figure showing the shape of the aperture of the shielding unit in the lens array used in the exposure device of this invention.

The lens array will be specifically described with reference to FIGS. 19 to 22. FIG. 19 is a plan view of the lens array. FIG. 20 is a plan view of a shielding unit 23. FIG. 21 is a cross section taken along line C-C in FIG. 19. FIG. 22 shows the shape of the aperture of the shielding unit 23 of the lens array. The lens array consists of a lens plate 21 and the shielding unit 23. The lens array is consisted of the lens plates 21 serving as lens aggregations and the shielding unit 23. The lens array has lens groups, each of which consists of two micro lenses 22 arranged to have the same optical line. The lens groups are arranged in two rows in a direction perpendicular to the optical axes. The lens plate 21 has multiple micro lenses 22 arranged thereon. Any one of the micro lenses 22 has the first curved surface 22a and the second curved surface 22b. The second curved surface 22b faces the shielding unit 23. The first curved surface 22a is a surface opposite to the second curved surface 22b. The vertex of the first curved surface 22a and the vertex of the second curved surface 22b are arranged on the same optical line. The micro lenses 22 are arranged on the lens plate 21, and are evenly spaced at an interval PY. The micro lenses 22 are arranged in two rows in the arrangement direction. The two rows are spaced apart by an interval PX. In the third embodiment, PX is less than PY. The micro lens 22 has a radius RL. The distance between the obliquely adjacent micro lenses 22 is PN. The micro lenses 22 are arranged so that portions of the micro lens 22 overlaps with the adjacent micro lenses 22. The lens plate 21 is made of a transparent material that allows light from the light emitting elements to pass through the lens plate 21.

The shielding unit 23 is made of a material that shields the light emitting elements. The shielding unit 23 is formed with polycarbonate through injection molding. The shielding unit 23 has an aperture 23a formed as a diaphragm. An arrangement interval of the apertures 23a is PY that is the same as the arrangement interval of the micro lenses 22. The apertures 23a are arranged in two rows in the arrangement direction. The rows are spaced apart by the interval PX. The aperture 23a is in a shape enclosed by a cylindrical shape having a radius RA and a surface away by a distance (PX-TB)/2 from the central axis of the cylindrical shape. The aperture 23a and the micro lenses 22 are arranged so that the central axis of the cylindrical shape constituting the aperture 23a is the same as the optical axis of the micro lens 22.

Figure 23:
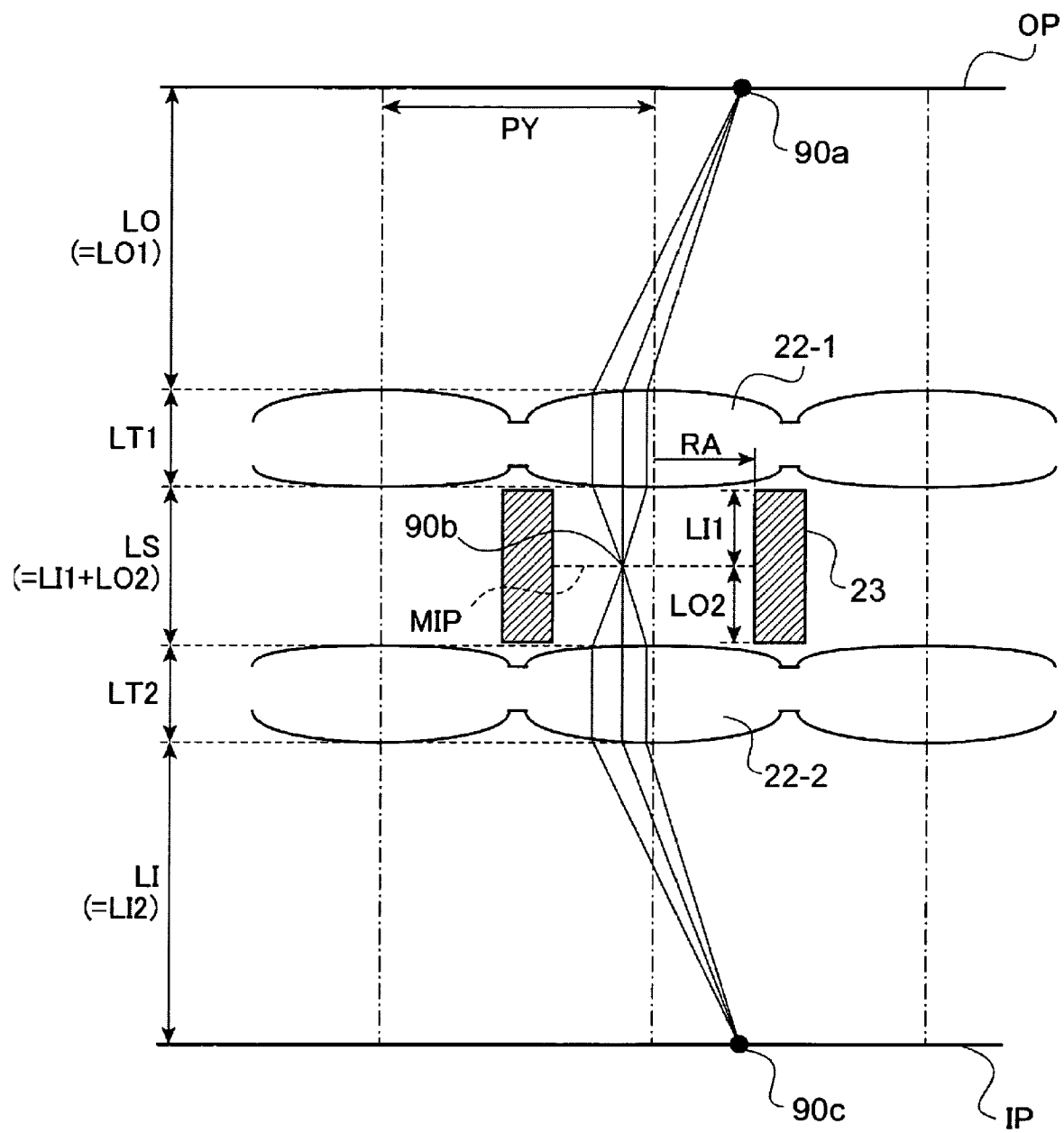
FIG. 23 is a figure describing the optical path of the lens array in the exposure device of this invention.

The structure and the operation of the lens array will be hereinafter specifically described with reference to FIG. 23. FIG. 23 shows an optical path in the lens array.

The structure of the lens array will be described. FIG. 23 is a cross section of the lens array taken along a surface perpendicular to the surface of the lens plate 21 to show the optical axis of the micro lenses 22. The horizontal direction of FIG. 23 is the arrangement direction of the micro lenses 22. The first micro lens 22-1 is arranged at a position away by the distance LO from the object plane of the lens array. The second micro lens 22-2 is arranged at a position away by the distance LS from the first micro lens 22-1 to face the first micro lens 22-1. The first micro lens 22-1 and the second micro lens 22-2 are arranged so that the optical axis of the first micro lens 22-1 is the same as the optical axis of the second micro lens 22-2. The lens array forms the optical image at a position away by the distance LI from the micro lens 22-2 in the optical axis direction. The first micro lens 22-1 has a thickness LT1 and a focal length F1. Through the first micro lens 22-1, an object at a position away by the distance LO1 forms an optical image on a surface away by the distance LI1 in the optical axis direction. The second micro lens 22-2 has a focal length F2. Through the second micro lens 22-2, an object at a position away by the distance LO2 forms an optical image at a position away by the distance LI2 in the optical axis direction. The distance LO between the object plane of the lens array and the first micro lens 22-1 is set to be the same as the distance LO1. The distance LS between the first micro lens 22-1 and the second micro lens 22-2 is made to be LS=LI1+LO2.

The distance LI between the second micro lens 22-2 and the imaging plane of the lens array is set to be the same as LI2. The first micro lens 22-1 and the second micro lens 22-2 may be the same with each other. Both of the first micro lens 22-1 and the second micro lens 22-2 have the thickness LT1 and the focal length F1. Where the object at the position away by the distance LO1 forms the optical image on the surface away by the distance LI1 in the optical direction, the distance between the object plane of the lens array and the first micro lens 22-1 is set to be the same as the distance LO1. The interval LS between the first micro lens 22-1 and the second micro lens 22-2 is set to be LS=2*LI1. The first micro lens 22-1 and the second micro lens 22-2 are arranged to face each other so that the curved surface of the second micro lens 22-2 on the imaging plane side has the same shape as the curved surface of the first micro lens 22-1 on the object plane side. The distance between the second micro lens 22-2 and the imaging plane of the lens array is set to be the same as LO1. Thus, LI=LO. The focal length F2 of the second micro lens 22-2 is the same as the focal length F1 of the first micro lens 22-1. Thus, F2=F1. Each curved surface of the micro lens 22 is formed with the rotationally symmetrical high-order aspherical surface defined by Formula 1 described above, so that spherical aberration can be corrected and a high resolution can be obtained.

The operation of the lens array will be hereinafter described. The light from an LED array 70 as an object 90a enters into the first micro lens 22-1, and the first micro lens 22-1 forms an intermediate image 90b on an intermediate image surface MIP at a position away by the distance LI1 in the optical axis direction. Through the second micro lens 22-2, the intermediate image 90b forms an optical image 90c. The optical image 90c is the same-size erect image of the object 90a. The intermediate object 90b is an inverted reduced image of the object 90a. The optical image 90c is an inverted enlarged image of the intermediate image 90b through the second micro lens 22-2. The chief ray of light rays from each point of the surface of an object becomes parallel to the optical axis between the first micro lens 22-1 and the second micro lens 22-2, which constitute a so-called telecentric optical system. The lens array arranged as described above produces a same-size erect image of the LED array 70. Among light rays from the LED array 70, stray lights not forming an optical image are shielded by the shielding unit 23.

The lens array forms a same-size erect image of the LED array 70, even where the lens having the same optical characteristics is used in the first micro lens 22-1 and the second micro lens 22-2. A light from the LED array 70 as the object 90a enters into the first micro lens 22-1, and the first micro lens 22-1 forms the intermediate image 90b on the intermediate image surface MIP at the position away by the distance LI1 in the optical axis direction. The second micro lens 22-2 forms the optical image 90c of the intermediate image 90b. The optical image 90b is the same-size erect image of the object 90a. The telecentric optical system is constituted between the first micro lens 22-1 and the second micro lens 22-2. The above-described optical arrangement enables the lens array to form the same-size erect image of the LED array 70, even where the lens having the same optical characteristics is used in the first micro lens 22-1 and the second micro lens 22-2.

Figure 24:
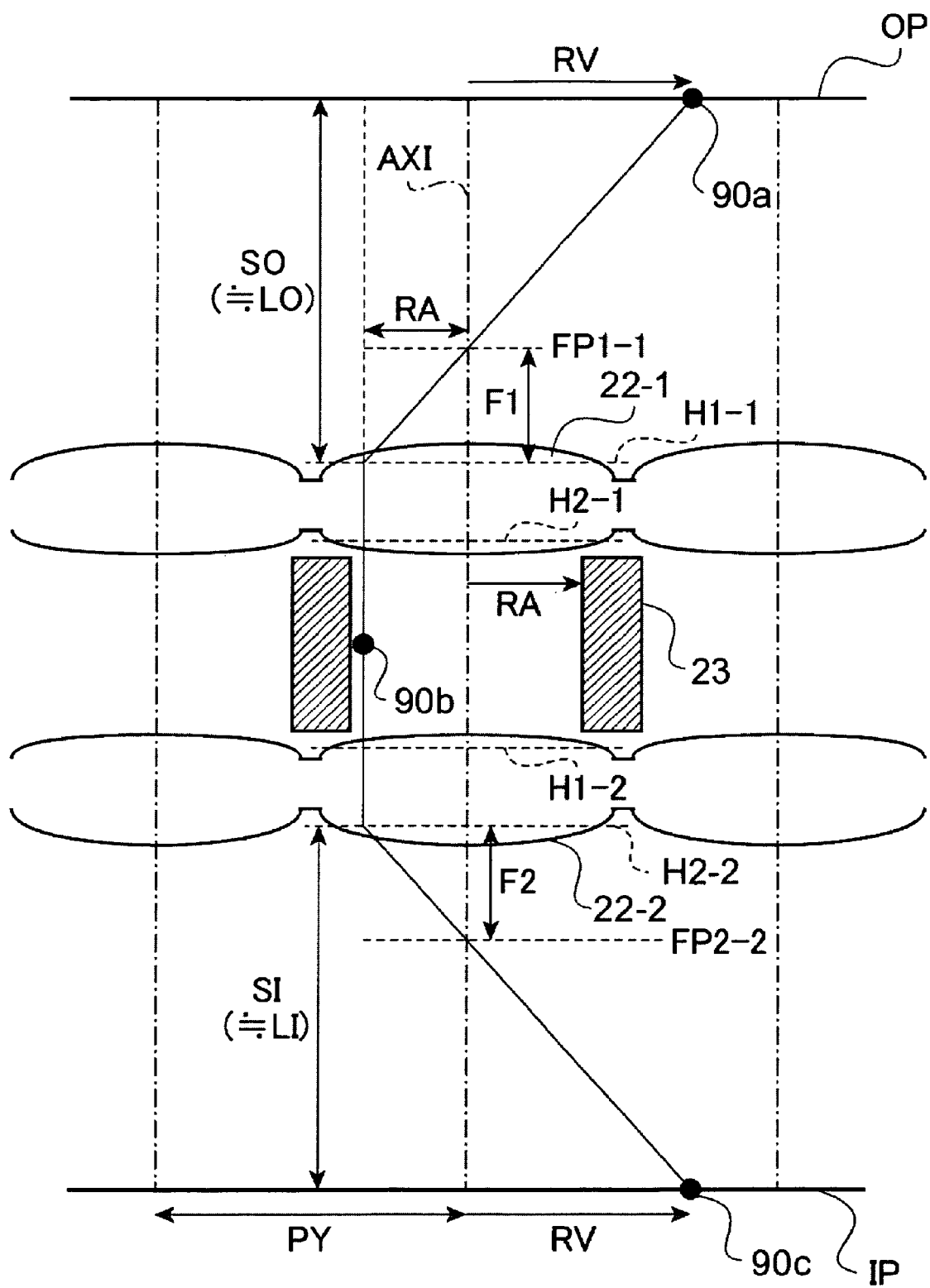
FIG. 24 is a cross section of the lens array taken along a surface perpendicular to the surface of the lens plate 21 to show the optical axes of the micro lenses 22.

Next, the optical characteristics of the micro lenses 22 formed on the lens array are described with reference to FIG. 24. FIG. 24 is a cross section of the lens array taken along a surface perpendicular to the surface of the lens plate 21 to show the optical axis of the micro lenses 22.

The horizontal direction of FIG. 24 is the arrangement direction of the micro lenses 22. The first micro lens 22-1 has the focal length F1. Specifically, the first micro lens 22-1 has the focal length F1. Specifically, the focal length F1 is the distance between the first principal plane H1-1 of the first micro lens 22-1 to the first focal plane FP1-1. The distance between the first principal plane H1-1 and the object plane is SO. The second micro lens 22-2 has the focal length F2. Specifically, the focal length F2 is the distance between the second principal plane H2-2 of the second micro lens 22-2 to the second focal plane FP2-2. The distance between the second principal plane H2-2 and the image plane is SI. The difference between the distance SO and the distance LO is inversely proportional to the curvature radius of the curved surface of the first micro lens 22-1 on the object plane side. Similarly, the difference between the distance SI and the focal length LI is inversely proportional to the curvature radius of the curved surface of the second micro lens 22-2 on the imaging plane side. But the difference between the distance SO and the distance LO and the difference between the distance SI and the distance LI can be ignored because the curvature radius of the curved surface of each micro lens 22 is sufficiently large in the lens array according to the third embodiment. Thus, SO is approximately equal to LO, and SI is approximately equal to LI. A vision radius RV of the first micro lens 22-1 can be obtained from Formula 2 below because: the chief ray of light rays from each point of the surface of an object becomes parallel to the optical axis between the first micro lens 22-1 and the second micro lens 22-2; the light rays are restricted by the side walls of the shielding unit 23; and the two triangles formed by the light ray, the object plane, the first principal plane of the first micro lens 22-1, and the optical axis AXI of the first micro lens 22-1 are geometrically similar to each other.

$$RV = RA \frac{LO - F1}{F1} \qquad \text{Formula 2}$$

Figure 25:
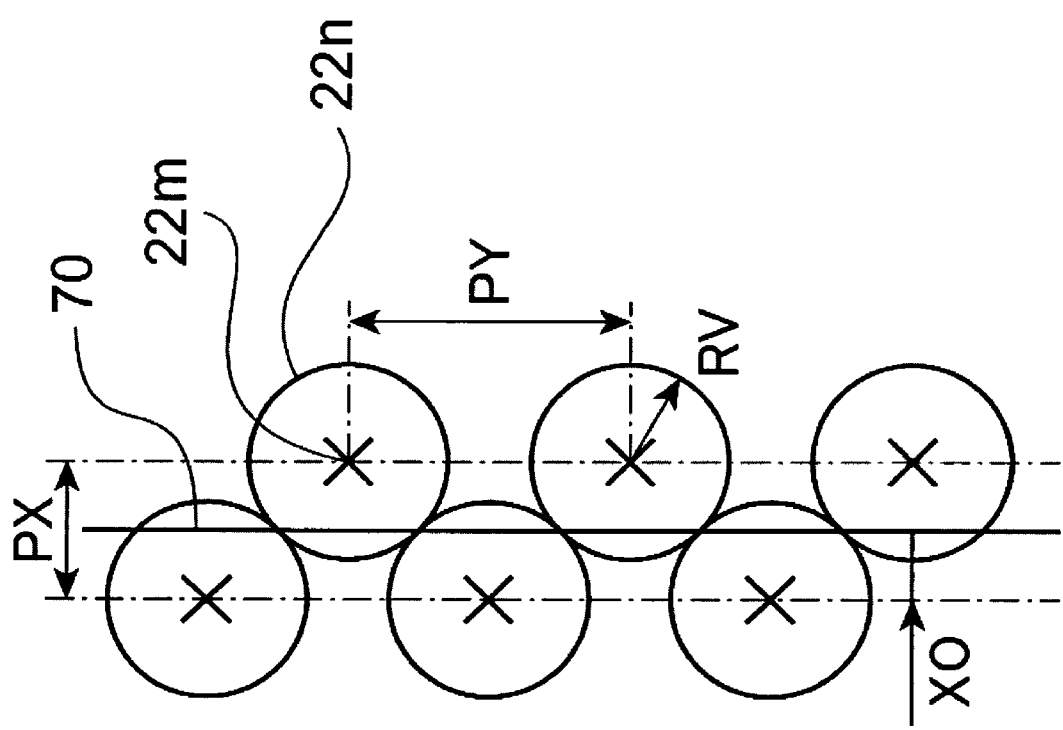
FIG. 25 is a schematic diagram showing the optical arrangement in a case where the micro lenses integrally formed on the lens array of this invention are arranged in two linear rows.
Figure 26:
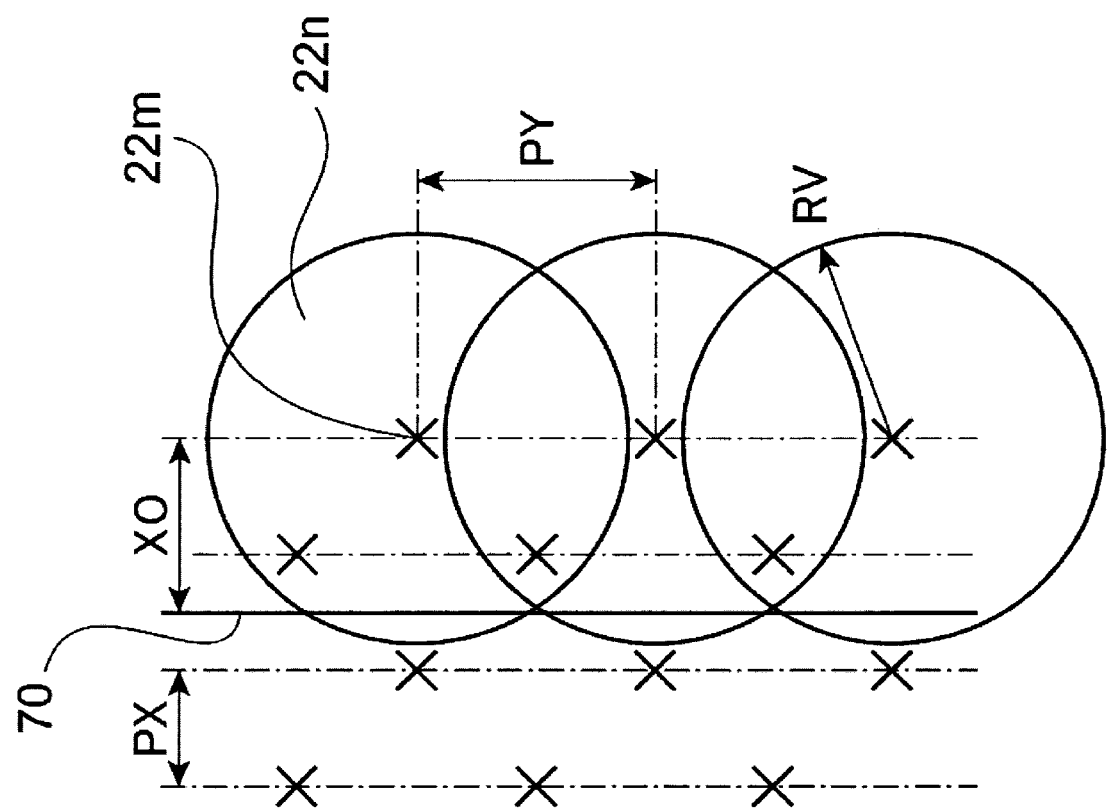
FIG. 26 is a schematic diagram showing the optical arrangement in a case where the micro lenses integrally formed on the lens array of this invention are arranged in multiple linear rows.

The relationship between the arrangement of the micro lens 22 and the vision radius RV will be specifically hereinafter described with reference to FIGS. 25 and 26. FIG. 25 shows a schematic diagram showing the optical arrangement in a case where the micro lenses 22 integrally formed into the lens array are arranged in two rows. FIG. 26 shows a schematic diagram showing the optical arrangement in a case where the micro lenses 22 integrally formed into the lens array are arranged in multiple rows.

FIG. 25 shows a schematic diagram showing the optical arrangement in a case where the micro lenses 22 integrally formed into the lens array are arranged in two rows. FIG. 25 shows a case where the micro lenses 22 are arranged in two rows, where all the LED elements in the LED array 70 are covered by the vision of at least one micro lens 22, and where the vision radius RV of all the optical images of the LED array 70 formed on the photosensitive drum 41 become the smallest. That is, FIG. 25 is shows the condition where the vision radius RV of the micro lens 22 is the smallest while the lens array can operate. An intersecting point between the optical axis of the micro lens 22 and the object plane is 22m, and the vision of the micro lens 22 is 22n. The vision radius RV in this condition is expressed with Formula 3 below, where the interval of the micro lenses 22 in the arrangement direction is PY and where the interval of the micro lenses 22 in a direction perpendicular to the arrangement direction is PX.

$$RV = \sqrt{\left(\frac{PX}{2}\right)^2 + \left(\frac{PY}{4}\right)^2} \quad \text{Formula 3}$$

Formula 4 below expressing an operation condition of the lens array can be derived from Formula 2 and Formula 3, where the focal length of the micro lens 22 is F1, the maximum value of the distance between the optical axis of the micro lens 22 and where the inner sidewall of the aperture 23a of the shielding unit 23 is RA.

$$\sqrt{\left(\frac{PX}{2}\right)^2 + \left(\frac{PY}{4}\right)^2} \leq RA\frac{LO-F1}{F1} \quad \text{Formula 4}$$

FIG. 26 shows a schematic diagram showing the optical arrangement in a case where the micro lenses 22 integrally formed into the lens array are arranged in multiple rows. The LED elements are arranged in array to form the LED array 70. FIG. 26 shows the positional relationship on the object plane between the LED array 70 and the optical axes of the micro lenses 22. FIG. 26 shows a case where all the LED elements in the LED array 70 are covered by the vision of at least one micro lens 22 on the outermost row and where the vision radius RV of the micro lenses 22 on the outermost row is the smallest. The vision radius RV in this condition can be obtained from Formula 5, where XO is the distance between the optical axis of the micro lenses on the outermost row and the LED array 70 in the direction perpendicular to the arrangement direction of the micro lenses 22 and to the optical axis of the micro lenses 22, where PY is the distance between the micro lenses 22 in the arrangement direction of the micro lenses 22, and where PX is the distance between the micro lenses in a direction perpendicular to the arrangement direction of the micro lenses 22.

$$RV = \sqrt{(XO)^2 + \left(\frac{PY}{4}\right)^2} \quad \text{Formula 5}$$

Formula 6 expressing the operation condition of the lens array can be derived from Formula 2 and Formula 5, where the focal length of the micro lens 22 is F1, the distance between the lens array and the object plane of the lens array is LO, and the maximum distance between the optical axis of the micro lens 22 and the inner side wall of the aperture 23a of the shielding unit 23 is RA. It should be noted that in a case where the micro lenses 22 are arranged in one row, the operating condition of the lens array is obtained by substituting XO=0 into Formula 6.

$$\sqrt{(XO)^2 + \left(\frac{PY}{4}\right)^2} \leq RA\frac{LO-F1}{F1} \quad \text{Formula 6}$$

Figure 27:
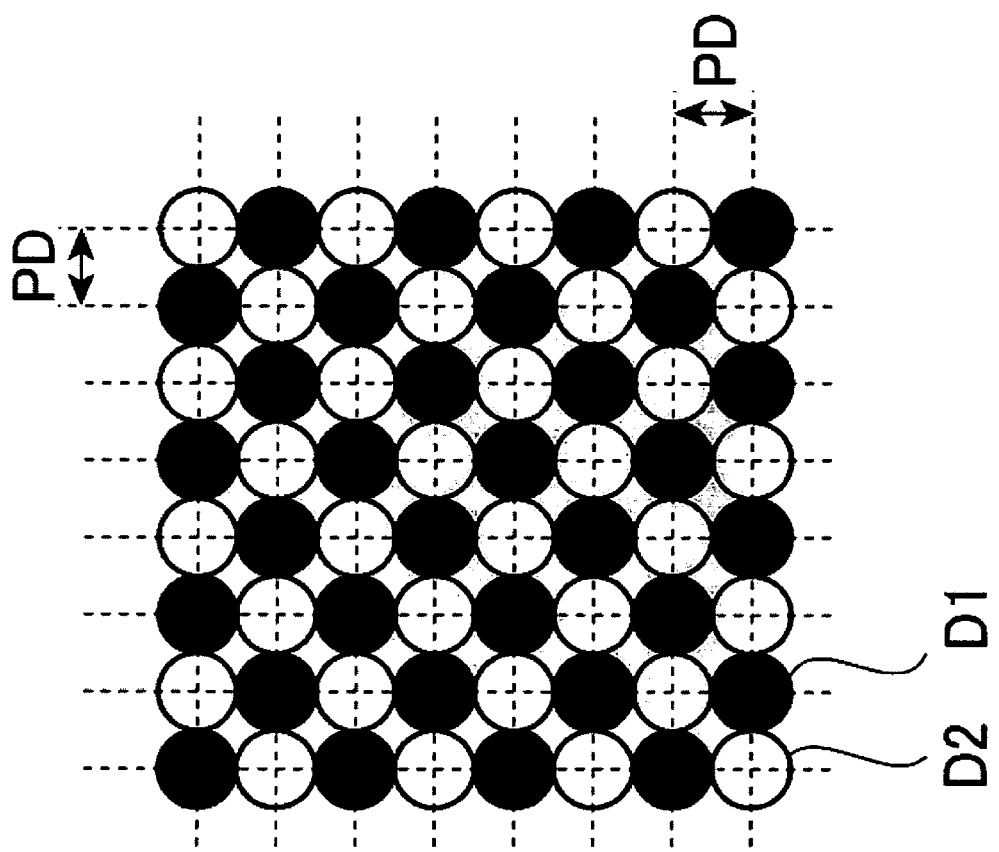
FIG. 27 is a schematic diagram showing an image in which every two pixels are printed in the entire pixels relating to the evaluation of the lens array of this invention.

The evaluation result of the optical characteristics of the lens array according to this embodiment will be hereinafter described with reference to FIG. 27. FIG. 27 shows a schematic diagram showing an image in which every two pixels are printed among the pixels relating to the evaluation of the lens array.

The LED head including the lens array according to this embodiment were subjected to the measurement of the MTF (Modulation Transfer Function) representing the resolution of the optical image. The measurement result showed that all of the LED head have the MTF equal to or more than 80%. The MTF represents the resolution of the exposure device and the contrast of the light quantity of the optical image formed by the LED array 70 emitting light in the exposure device. Where the MTF is 100%, the optical image has the highest contrast, and the exposure device produces a high resolution. As the MTF becomes lower, the optical image has a lower contrast, and the exposure device produces a lower resolution. The MTF (%) is defined as MTF=$(I_{max}-I_{min})/(I_{max}+I_{min})\times 100(\%)$, where the maximum light quantity of the optical image is $I_{max}$ and the minimum light quantity between the two adjacent optical images is $I_{min}$. In this MTF measurement, a microscopic digital camera is used to take a picture of the optical image at a position away by the distance LI (mm) from the end surface of the lens array of the LED head on the side of the photosensitive drum 41 and by analyzing the taken picture to figure out the light quantity distribution of the optical image of the LED array 70 to calculate the MTF. In the measurement of the MTF, the LED head is used that has the LED array 70 whose arrangement interval is PD=0.0423 mm. The resolution of the LED head is 600 dpi. Thus, 600 pieces of the LED elements are arranged per 1 inch, i.e., approximately 25.4 mm, in the LED array 70. The measurement was performed by causing every two LED elements to emit light in the LED array 70 having the lens array on the LED head. The LED array 70 according to this embodiment was installed in the image forming apparatus, namely, a color LED printer. The image quality of images formed by the LED color printer having the LED array 70 according to this embodiment was evaluated. The evaluation of the images of the image forming apparatus is done by forming an image in which dots are printed at every two pixels on all over a printing area as shown in FIG. 27 and evaluating the image quality of the formed image. It should be noted that D1 denotes a printed dot and D2 denotes a non-printed dot.

In the third embodiment, the micro lens 22 is described as a rotationally symmetrical high-order aspherical surface. But this invention is not limited thereto. The micro lens 22 may be formed with surfaces having a spherical surface, an anamorphic aspherical surface, a parabola surface, an ellipse surface, a hyperboloid surface, a conic surface, and the like. In the third embodiment, the lens plate 21 is formed by injecting the resin into the mold and molding the resin into the shape of the mold. But the resin may also be used as the mold, and the lens plate 21 may be formed through cutting operation. In the third embodiment, the resin is used as the material of the lens plate 21, but glass may also be used as the material of the lens plate 21. In the third embodiment, the polycarbonate is used as the material of the shielding unit 23, but other materials may also be used for the shielding unit 23. In the third embodiment, the shielding unit 23 is formed through injection molding, but other molding and forming methods may be used. In the third embodiment, the LED array 70 having multiple LED elements is used as the light emitting unit. But the light emitting unit may use, for example, organic EL (Electroluminescence) elements and a semiconductor laser. Alternatively, the exposure device may be made that has the light emitting unit having a fluorescent light, a halogen lamp, and the like combined with a shutter consisting of a liquid crystal element.

As hereinabove described in the third embodiment, all the micro lenses 22 can be formed with high-precision, even where the lens array is long in the arrangement direction of the micro lenses. The exposure device having the lens array according to this embodiment can provide the optical image of sufficiently high contrast. The image forming apparatus having the lens array according to this embodiment can provide a printed image of high quality without streaks and dark and light spots.

Fourth embodiment

The fourth embodiment describes a manufacturing method of the lens array in the exposure device in the image forming apparatus according to the third embodiment.

For the sake of easy understanding of the manufacturing of the lens plate 21 of this invention, a manufacturing method and a mold for a conventional lens plate 19 are described first. Thereafter, a manufacturing method and a mold for the lens plate 21 of this invention will be described. Hereinafter, the mold for the conventional lens plate 19 will be specifically described with reference to FIGS. 28 to 30.

Figure 28:
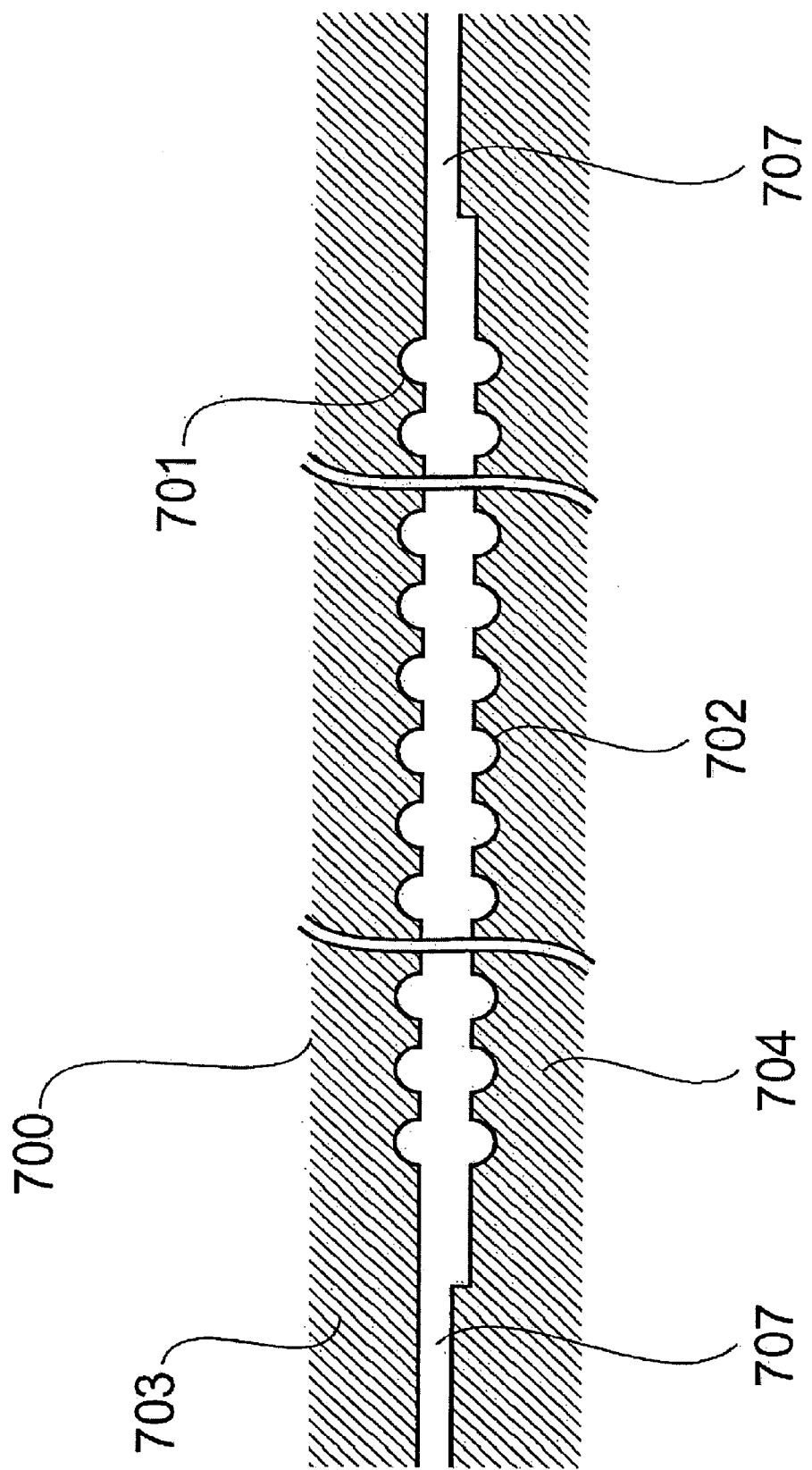
FIG. 28 is a figure showing a conventional mold used in a conventional manufacturing method for a lens plate of a lens array.
Figure 29:
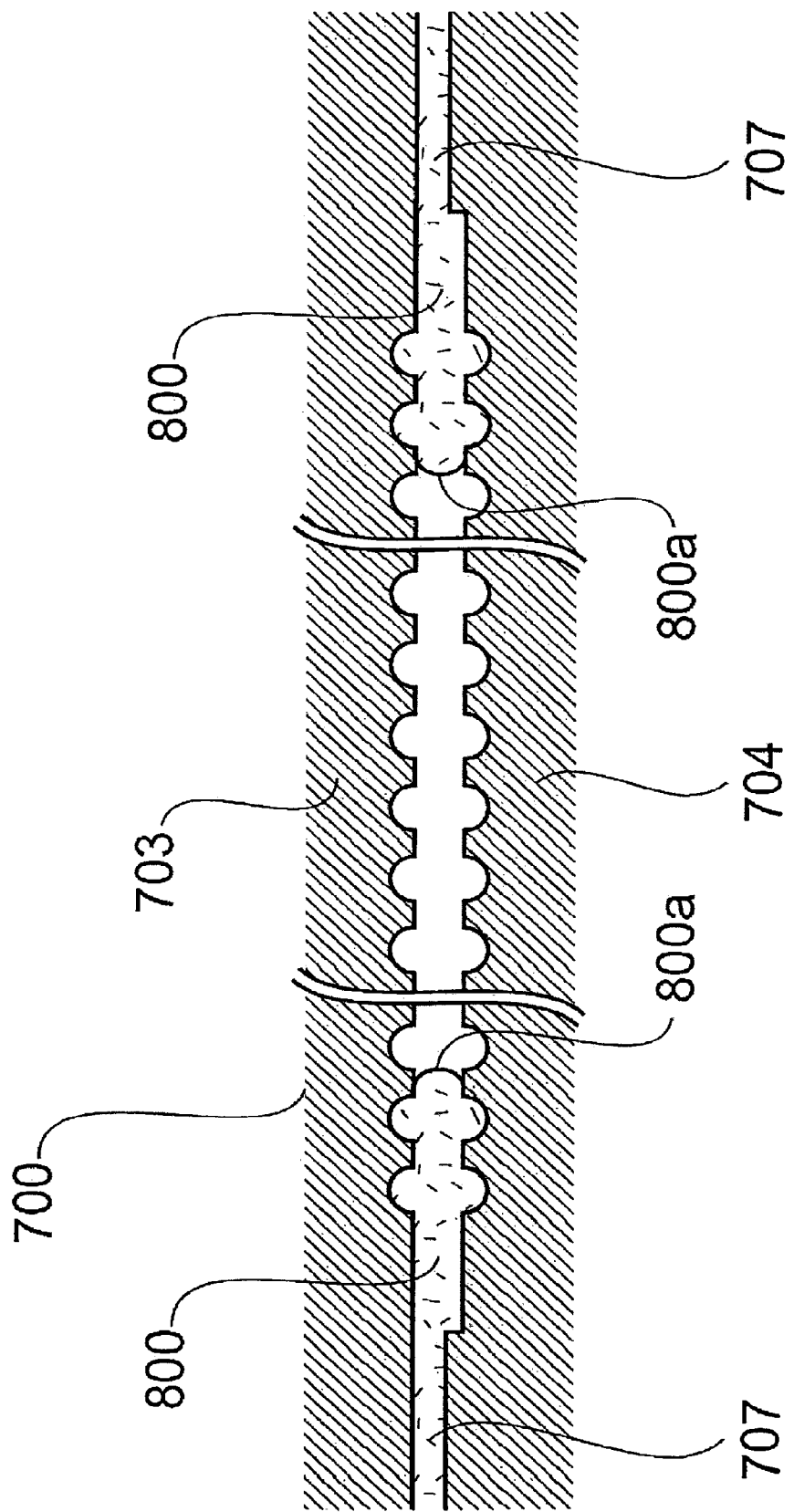
FIG. 29 is a schematic diagram showing a process of injecting a resin into the conventional mold.
Figure 30:
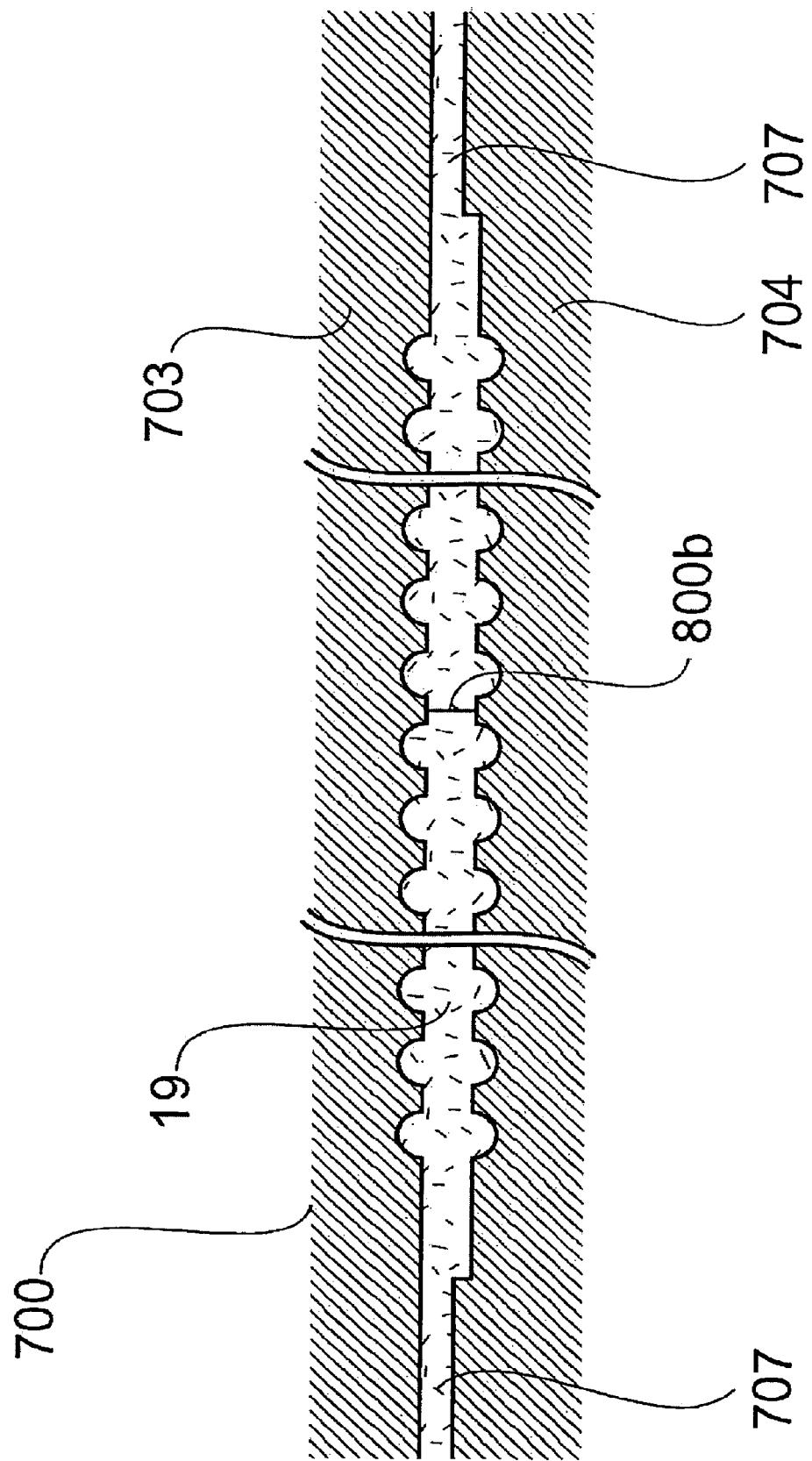
FIG. 30 is a schematic diagram showing the conventional mold when the resin has been injected into the conventional mold.

FIG. 28 is a schematic diagram showing a conventional mold 700 used for manufacturing the conventional lens plate 19 of the lens array. FIG. 28 is a cross section parallel to the arrangement direction of multiple movable-side curved surfaces 701. The horizontal direction of FIG. 28 is the arrangement direction of the movable-side curved surface 701. FIG. 29 is a schematic diagram showing a process of injecting a resin 800 into the conventional mold 700. FIG. 30 is a schematic diagram showing the conventional mold when the resin has been injected into the conventional mold. The conventional mold 700 is consisted of an upper mold 703, a lower mold 704, and gates 707. Compared with a mold 600 according to the fourth embodiment of this invention described later, the conventional mold 700 has a different number of gates 707, described later, serving as inlets for injecting the mold 800 forming the lens plate 19. Each constituent member of the conventional mold 700 is described later.

The upper mold 703 in the conventional mold 700 is a movable mold separating from the lens plate 19 at first. The movable-side curved surface 701 formed on the upper mold 703 faces the lower mold 704. The movable-side curved surface 701 has a curved shape corresponding to a second surface shape of the lens plate 19, and forms the second surface shape on the lens plate 19. It should be noted that the movable-side curved surfaces 701 are arranged in two substantially-linear rows parallel to each other to correspond to the second surface of the lens plate 19. The lower mold 704 in the conventional mold 700 is separated from the lens plate 19 after the upper mold 703 is separated from the lens plate 19. A fixed-side curved surface 702 formed on the lower mold 704 faces the upper mold 703. The fixed-side curved surface 702 has a curved shape corresponding to a first surface shape of the lens plate 19, and forms the first surface shape on the lens plate 19. It should be noted that the fixed-side curved surfaces 702 are arranged in two substantially-linear rows parallel to each other to correspond to the first surface of the lens plate 19. The gates 707 in the conventional mold 700 are inlets for the resin 800, and are arranged at both end portions of the conventional mold 700 in the arrangement direction of the multiple movable-side curved surfaces 701.

The manufacturing process for forming the lens plate 19 using the conventional mold 700 will be hereinafter specifically described with reference to FIGS. 28 to 30.

As shown in FIG. 28, the resin 800 is softened by heat, and is injected through the gates 707 into a space enclosed by the upper mold 703 and the lower mold 704 of the conventional mold 700. A flow front 800a shown in FIG. 29 is a forefront portion of the resin 800 injected into the space enclosed by the upper mold 703 and the lower mold 704 of the conventional mold 700. The flow front 800a is a boundary surface between the resin 800 and air. The resin 800 is injected through the gates 707 formed at both end portions of the upper mold 703 of the conventional mold 700, and the flow front 800a moves from the gates 707 to the center in the arrangement direction of the movable-side curved surfaces 701 of the conventional mold 700. When the resin 800 is sufficiently injected into the space enclosed by the upper mold 703 and the lower mold 704 of the conventional mold 700 as shown in FIG. 30, the two flow fronts 800a moving from the both end portions of the conventional mold 700 collide with each other in the proximity to the center of the conventional mold 700 in the arrangement direction of the movable-side curved surfaces 701. After the flow fronts 800a move from the both end portions of the conventional mold 700 in the arrangement direction and collide with each other, a stress occurs in the resin 800.

The flow fronts 800a colliding with each other as described above form a weld line 800b in the proximity to the center of the conventional mold 700 in the arrangement direction of the micro lenses 22 on the lens plate 19 after the lens plate 19 is formed. The weld line 800b is a trace of thread-like thin line emerging at a portion where two or more flow fronts 800a merge into one and collide with each other within the mold. At the portion in which the weld line 800b emerges, mechanical characteristics especially impact tenacity characteristics are greatly deteriorated, and the optical characteristics are also deteriorated. Specifically, at the portion in which the weld line 800b emerges, the molecular orientation of the resin 800 changes, and accordingly, the refraction index changes. For example, where the refraction index becomes higher, the transparency is deteriorated, and the focal length of the lens becomes shorter. Thus, a change of the refraction index raises a difference in the focal lengths of the lenses between a portion in which the weld line 800b emerges and the other portions. In addition, an internal stress occurring at the portion of the resin 800 in which the weld line 800b emerges deteriorates the precision of the shape of the aspherical lens having the first surface and the second surface. If the precision of the shape of the lens deteriorates, the spherical aberration cannot be sufficiently corrected.

The manufacturing method, the mold, and the like for the lens array according to the fourth embodiment of this invention will be hereinafter described. Specifically, a mold 600 used for manufacturing the lens plate 21 of the lens array according to the fourth embodiment will be first described. Then, the manufacturing method for forming the lens plate using the mold 600 will be described. Thereafter, the molded lens 11 will be described.

Figure 31:
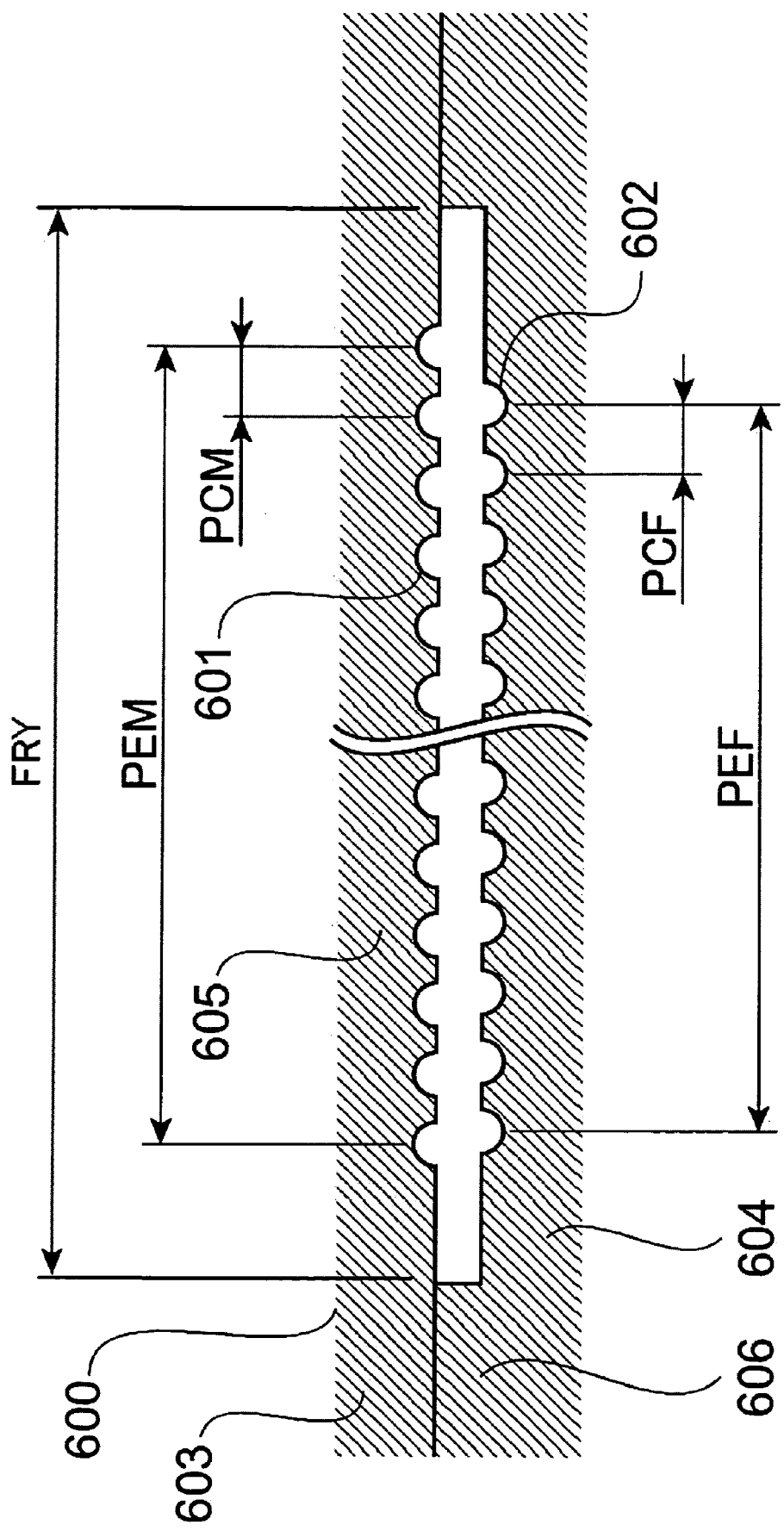
FIG. 31 is a figure showing a mold used in the manufacturing method of the lens plate of the lens array of this invention.
Figure 32:
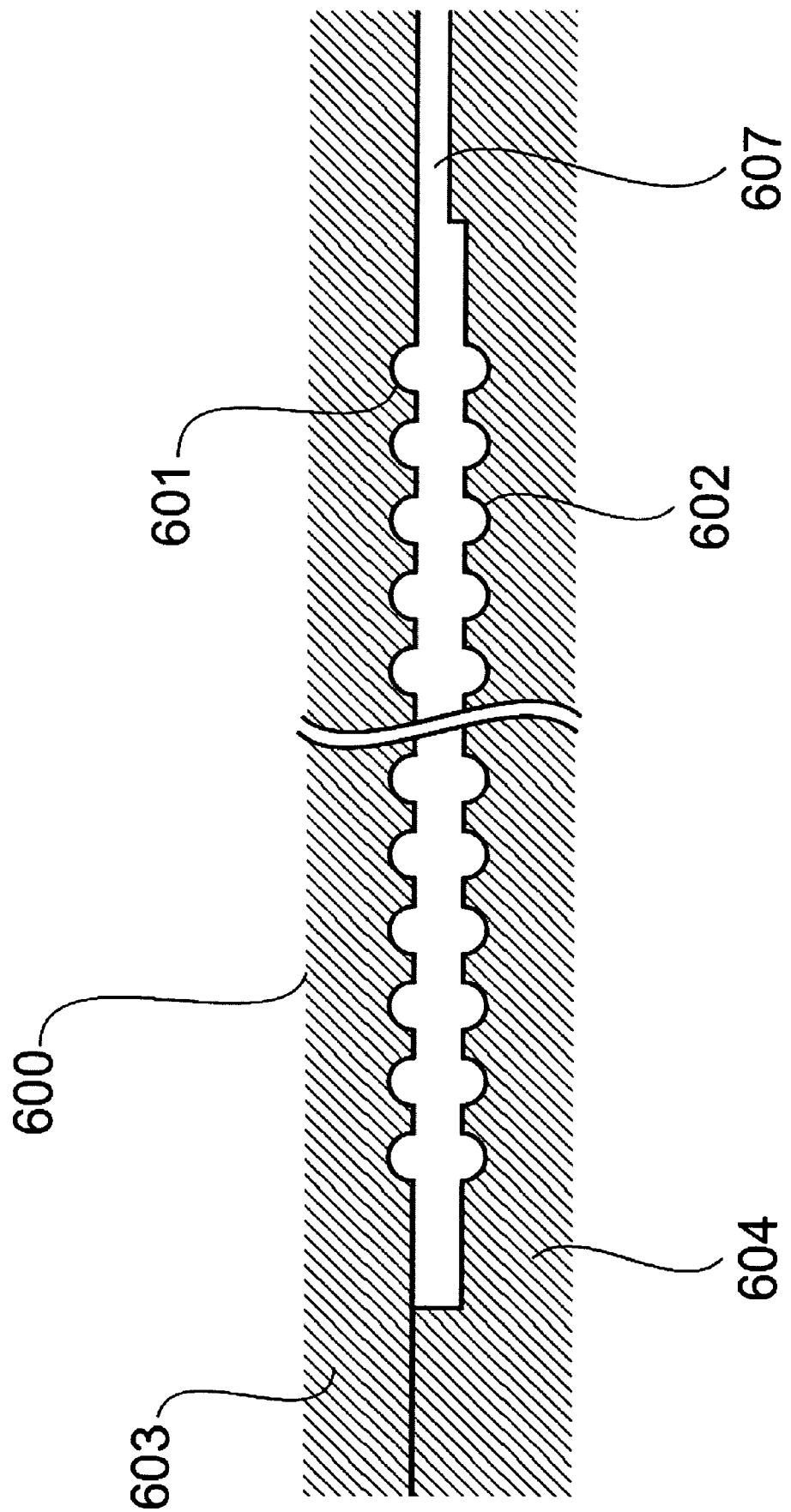
FIG. 32 is a figure showing the mold used in the manufacturing method of the lens plate of the lens array of this invention.

The mold 600 used for manufacturing the lens plate 21 of the lens array according to the fourth embodiment will be hereinafter specifically described with reference to FIGS. 31 and 32. FIGS. 31 and 32 are schematic diagrams showing the mold 600 used for manufacturing the lens plate 21 of the lens array according to the fourth embodiment.

FIG. 31 shows not only the mold 600 but also reference symbols relating to dimensional precisions, described later. The mold 600 shown in FIG. 32 has a gate 607 for manufacturing the lens as described later. Both of FIGS. 31 and 32 are cross sections of the mold 600 taken along parallel to the arrangement direction of multiple movable-side curved surfaces 601 and to a direction of the optical axis of each lens of the lens plate. The horizontal direction of FIGS. 31 and 32 are the arrangement direction of the movable-side curved surfaces 601. The mold 600 consists of an upper mold 603, a lower mold 604, and the gate 607. Compared with the conventional mold 700 as described above, the mold 600 has the only one gate 607, as described later, serving as an inlet for injecting the resin 800 for forming the lens plate 21. Each constituent member of the mold 600 will be hereinafter described.

The upper mold 603 of the mold 600 is a movable mold separating from the lens plate 21 at first. The movable-side curved surfaces 601 formed on the upper mold 603 face the lower mold 604. The movable-side curved surface 601 has a curved shape corresponding to the shape of a second surface 22b of the lens plate 21, and forms the shape of the second surface 22b on the lens plate 21. It should be noted that the movable-side curved surfaces 601 are arranged in two substantially-linear rows parallel to each other to correspond to the second surface 22b of the lens plate 21. The lower mold 604 of the mold 600 is a mold separating from the lens plate 21 after the upper mold 603 is separated from the lens plate 21. Fixed-side curved surfaces 602 formed on the lower mold 604 face the upper mold 603. The fixed-side curved surface 602 has a curved shape corresponding to the shape of the first surface 22a of the lens plate 21, and forms the shape of the first surface 22a on the lens plate 21. It should be noted that the fixed-side curved surfaces 602 are arranged in two substantially-linear rows parallel to each other to correspond to the first surface 22a of the lens plate 21. The gate 607 in the mold 600 is an inlet for the resin 800, and is arranged at an end portion of the mold 600 in the arrangement direction of the multiple movable-side curved surfaces 601.

As shown in FIG. 31, an interval PCM at the end portion of the upper mold 603 in the arrangement direction of the movable-side curved surfaces 601 is set to be different from an interval PCF at the end portion of the lower mold 604 in the arrangement direction of the fixed-side curved surfaces 602. Specifically, the interval PCM is larger than the interval PCF. The mold 600 is made so that a distance PEM between one of the movable-side curved surfaces 601 at one end in the arrangement direction and one of the movable-side curved surfaces 601 at the other end in the arrangement direction is different from a distance PEF between one of the fixed-side curved surfaces 602 at one end in the arrangement direction and one of the fixed-side curved surfaces 602 at the other end in the arrangement direction. Specifically, the distance PEM is larger than the distance PEF. It should be noted that PEF is, for example, 300 mm, and that the difference between PEM and PEF is, for example, 0.03 mm. The mold 600 as described above forms a space enclosed by the movable-side curved surfaces 601 and the fixed-side curved surfaces 602, when the upper mold 603 and the lower mold 604 are combined. When the softened resin 800 is injected into the space through the gate 607, the lens plate 21 is formed.

Figure 33:
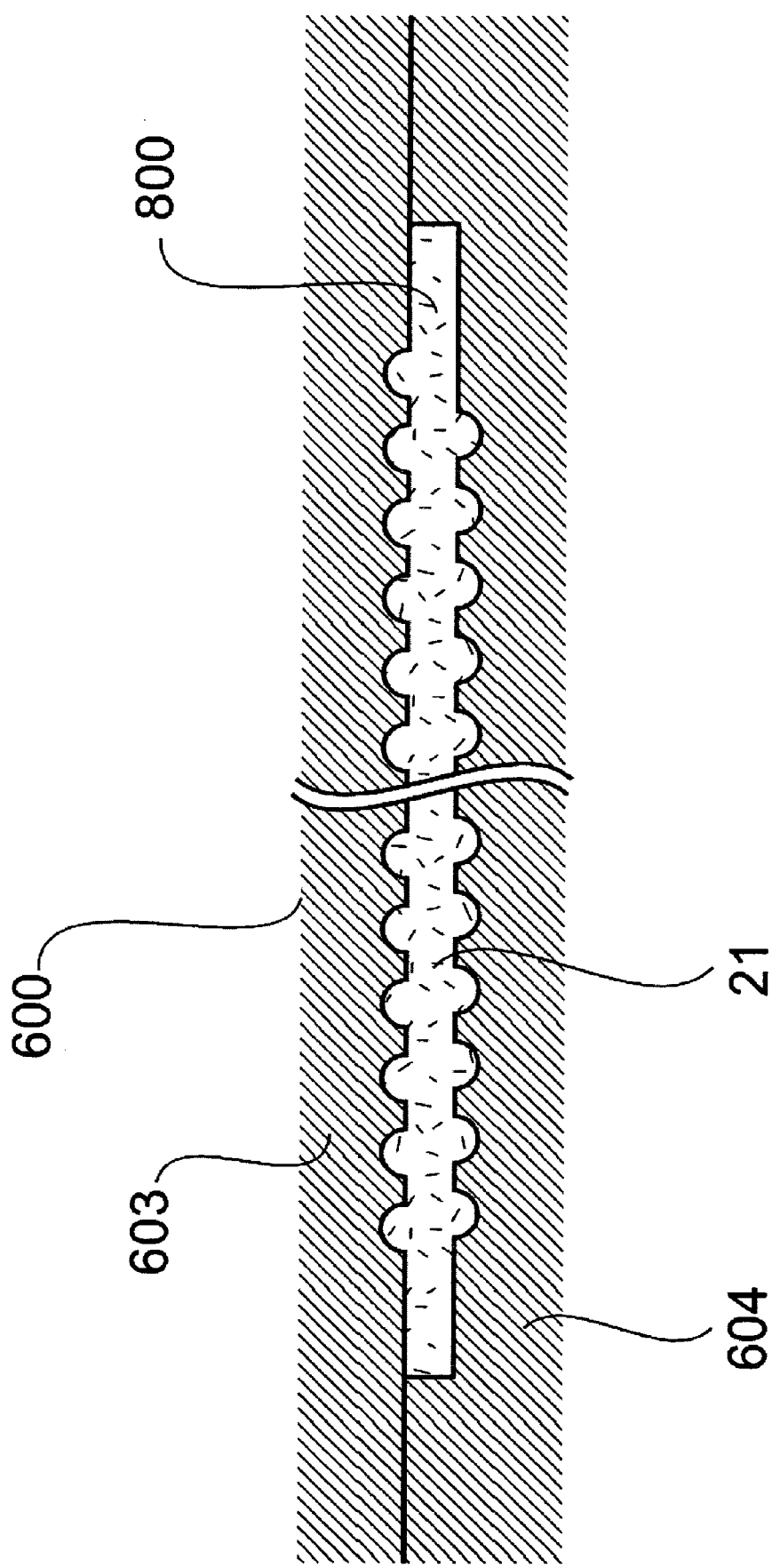
FIG. 33 is a schematic diagram showing the mold of this invention when a space enclosed by an upper mold and a lower mold is filled with a soften resin.
Figure 34:
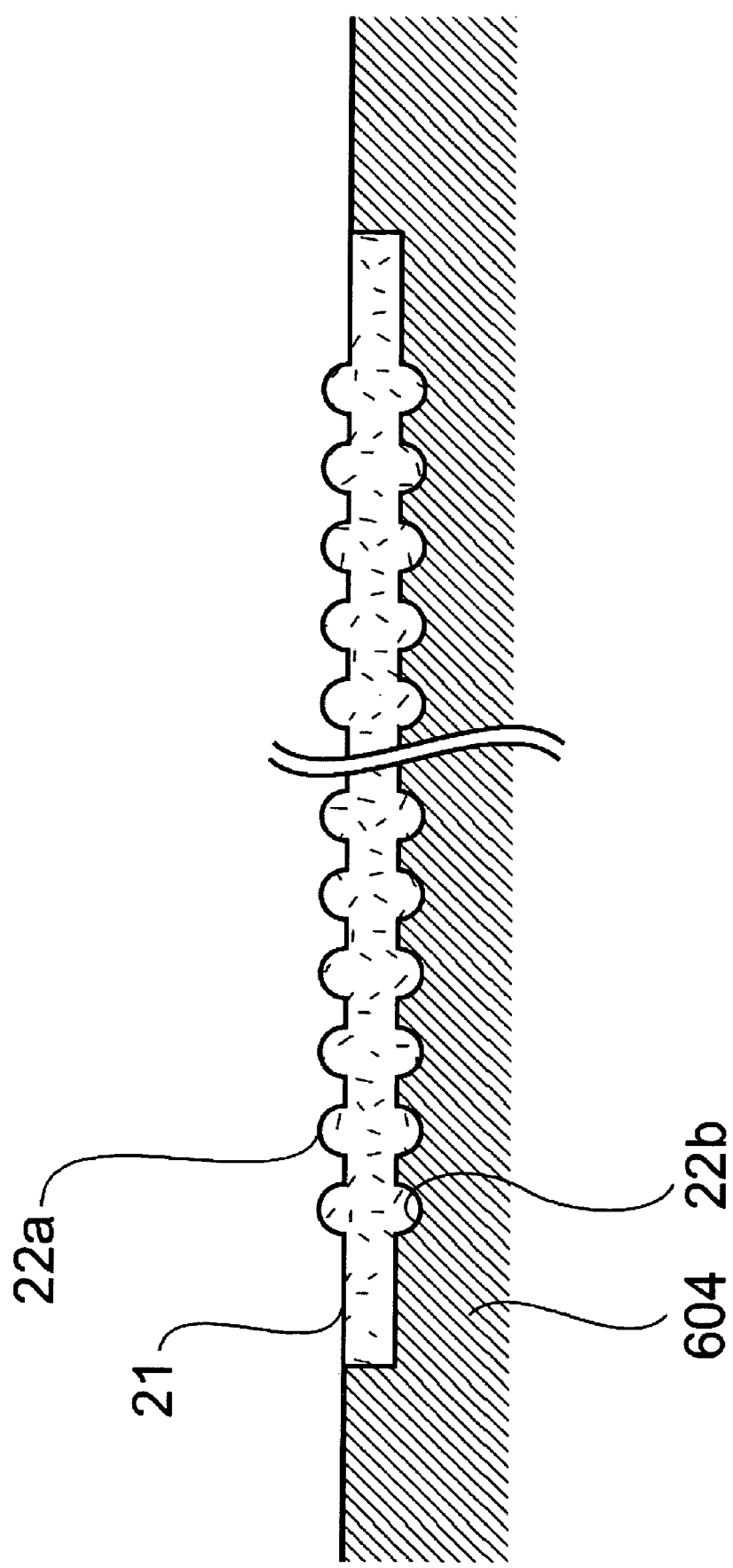
FIG. 34 is a schematic diagram showing the mold of this invention when the upper mold is released from the lower mold.
Figure 35:
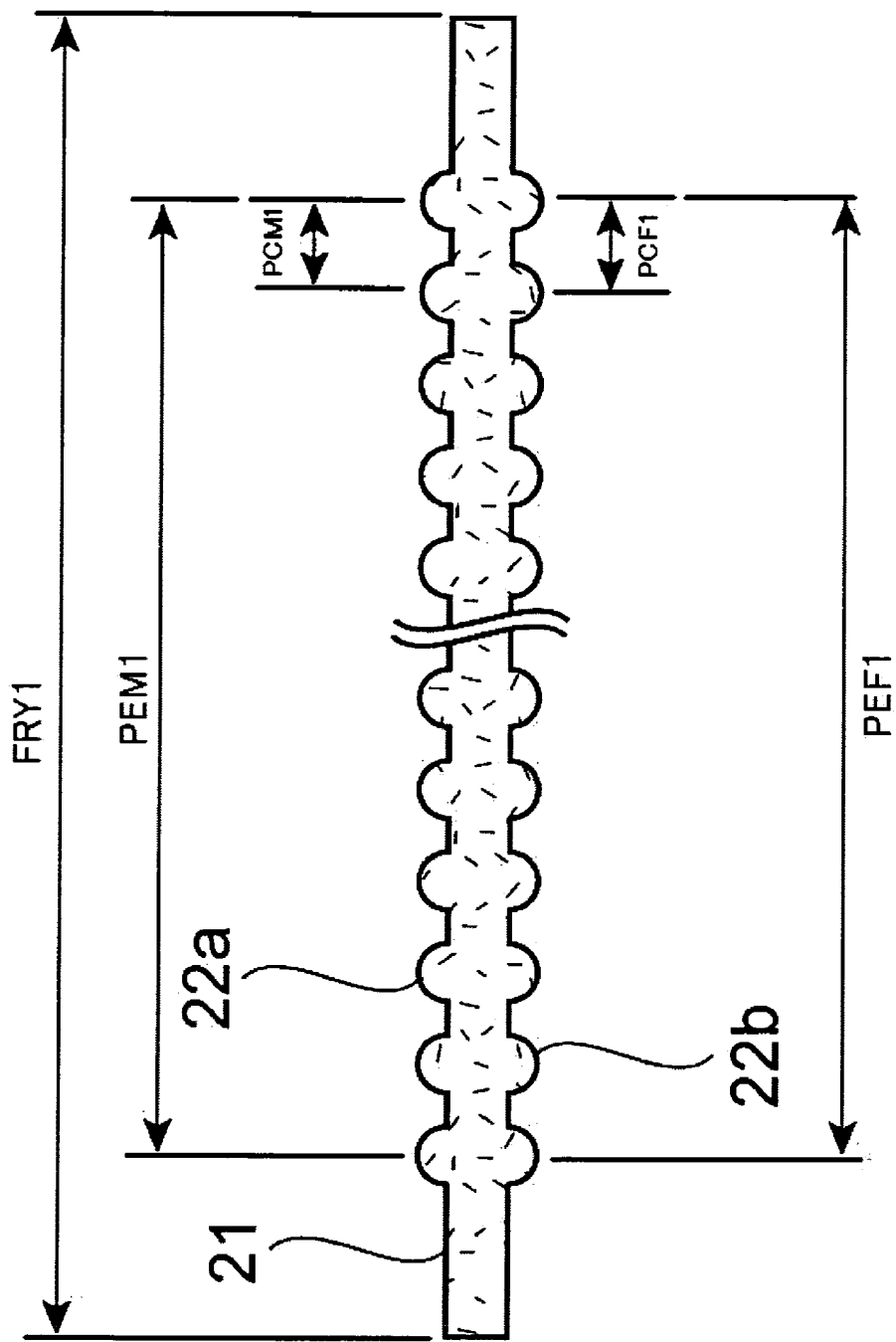
FIG. 35 is a schematic diagram showing the lens plate of the lens array of this invention after the molding is finished.

The manufacturing method for forming the lens plate 21 using the mold 600 will be hereinafter specifically described in detail with reference to FIGS. 33 to 35. FIG. 33 is a schematic diagram showing the mold 600 having the soften resin 800 filled in the space formed by the upper mold 603 and the lower mold 604 combined together. FIG. 34 is a schematic diagram showing the mold 600 when the upper mold 603 is released from the lower mold 604. FIG. 35 shows the schematic diagram showing the lens plate 21 after the molding.

As shown in FIG. 33, the resin 800 softened by heat is injected into the space enclosed by the upper mold 603 and the lower mold 604 of the mold 600. As shown in FIG. 34, the upper mold 603 moves in a direction away from the lens plate 21 at first. Thus, as shown in FIG. 34, the upper surface of the lens plate 21 is exposed to open air. Thereby, the temperature of the upper surface of the lens plate 21 decreases, and the lens 11 shrinks. However, the temperature of the lower surface of the lens plate 21 does not decrease as much as the temperature of the upper surface of the lens plate 21. Accordingly, the lower surface of the lens plate 21 does not shrink as much as the upper surface of the lens plate 21 because the lower surface of the lens plate 21 is still in contact with the lower mold 604. Subsequently, as shown in FIG. 35, the lower mold 604 is released from the lens plate 21. At this moment, the entire lens plate 21 is exposed to open air, and the temperature of the lens plate 21 decreases, and the entire lens plate 21 shrinks. If the conventional mold is used in the above manufacturing method, the decrease of the temperature would be different between the upper surface and the lower surface of the lens plate 21 because the upper surface of the lens plate 21 is in contact with open air for a longer time than the lower surface. Thus, with the conventional mold, the shrinking ratio of the lens plate 21 would be different between the upper surface and the lower surface. Specifically, the shrinking ratio of the upper surface is larger than the shrinking ratio of the lower surface. Thus, the position of the second surface 22b would move toward the center portion of the lens plate 21 in the arrangement direction of the micro lenses 22 from the position corresponding to the first surface 22a.

However, in the mold 600 of this invention, the arrangement interval of the movable-side curved surfaces 601 on the upper mold 603 is larger by a predetermined amount than the arrangement interval of the fixing side curved surfaces 602. With the mold 600 of this invention, the position of the second surface 22b is coincident with the position of the first surface 22a in the arrangement direction of the micro lenses 22 after the shrinking of the lens plate 21 is finished. The difference between the arrangement interval of the movable-side curved surfaces 601 formed on the upper mold 603 and the arrangement interval of the fixed-side curved surfaces 602 is derived from experiments. Specifically, in a case where the number of lenses per row is 272 pieces, a molded product as shown in FIG. 35 has the dimension of: the interval between the lenses at both ends on the first surface of the lens plate PEM1=325.2 mm; the interval between the lenses at both ends on the second surface of the lens plate PEF1=325.2 mm; the distance between both edges of the lens plate FRY1=333 mm; the lens pitch on the first surface of the lens plate PCM1=1.2 mm; and the lens pitch of the second surface on the lens plate PCF1=1.2 mm. However, if the mold for forming a product has the same dimension as the product to be molded, a desired product dimension cannot be obtained due to molding conditions in the injection molding such as a stretching rate of the resin 800 and the like. The stretching rate of the resin 800 can be obtained by manufacturing the lens plate as a trial at predetermined molding conditions. With the stretching rate of the resin 800 taken into consideration, the dimension of the metal mold capable of absorbing the difference of shrinking between the upper surface and the lower surface becomes as follows: the interval between the lenses at both ends on the first surface of the lens plate PEM=326.8585 mm; the interval between the lenses at both ends on the second surface of the lens plate PEF=326.826 mm; the distance between both edges of the lens plate FRY=334.665 mm; the lens pitch of the first surface of the lens plate PCM=1.20612 mm; and the lens pitch of the second surface of the lens plate PCF=1.206 mm.

The influence on the optical performance caused by the difference of the stretching ratio between the first surface and the second surface of the lens plate can be ignored. In a case where the number of lenses per row between both ends of the lens plate 21 is N=272, a formula PCM=PCF+0.00012 can be obtained from the relationship PCM=PCF+0.03/(N−1) as described above. Terminal lenses are lenses which expose images of the LED elements located at the outermost of the LED array. A central lens is a lens located at a position away by a distance PEM/2 from one of the terminal lenses, where the distance between one of the terminal lenses and the other of the terminal lenses is PEM.

Figure 36:
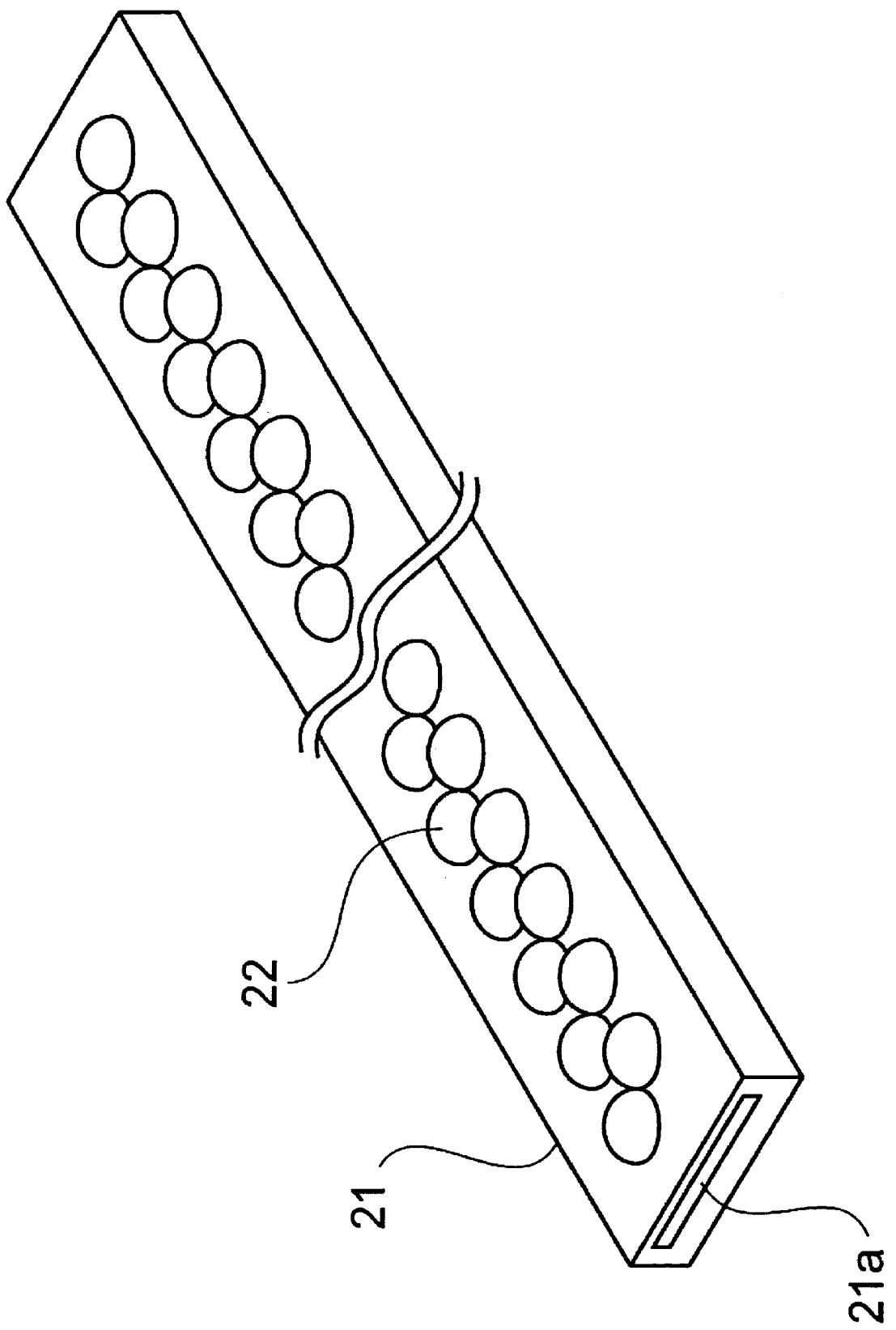
FIG. 36 is a perspective view of the lens plate of the lens array of this invention.

The molded lens 11 will be specifically described with reference to FIG. 36. FIG. 36 is a perspective view of the lens plate 21.

The micro lenses 22 are integrally formed on one surface of the lens plate 21 made into a plate-like part. There exists a trace of gate 21a at one of the end portions of the lens plate 21 in the arrangement direction of the micro lenses 22. The trace of gate 21a is a trace of the gate protruding from the lens plate 21 and cut off by a cutting tool or a laser after the lens plate 21 is molded and cooled and is released from the lens plate 21 in the lens array manufacturing steps. The lens plate 21 is molded by an injection molding machine using a cycloolefin optical resin sold under the trade name ZEONEX E48R by ZEON CORPORATION. Because only one gate is arranged on the mold 600, the mold 600 can prevent the occurrence of a trace of thread-like thin line that would emerge at a portion in which two or more flow fronts 800a merge into one within the mold. Thus, the micro lenses 22 are integrally formed on the lens plate 21 with high-precision. The refraction rate and the shape of all the micro lenses 22 can be uniformly formed. As for the injection molding, a general injection molding method is used here, but an injection compression molding method and the like may also be employed.

As hereinabove described, the manufacturing method of the lens array according to the fourth embodiment can prevent the occurrence of the weld line 800b, and achieves to mold all the micro lenses 22 with high-precision even where the lens array is long in the arrangement direction of the micro lenses 22.

Fifth Embodiment

In the fifth embodiment, a reading apparatus for reading a document Q will be described. The reading apparatus according to the fifth embodiment uses the lens array used in the exposure device in the image forming apparatus according to the third embodiment.

Figure 37:
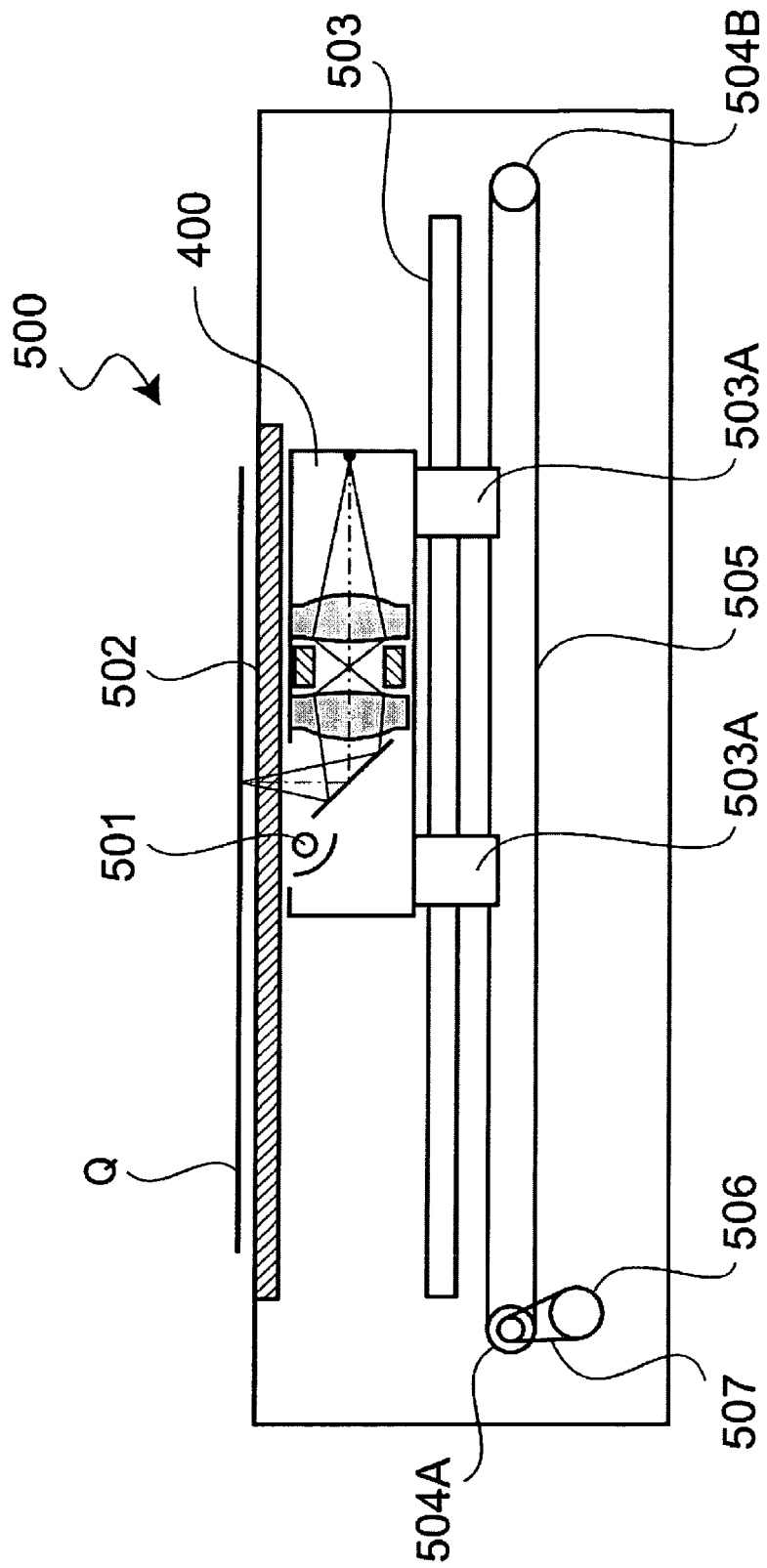
FIG. 37 is a figure showing a reading apparatus of this invention.
Figure 38:
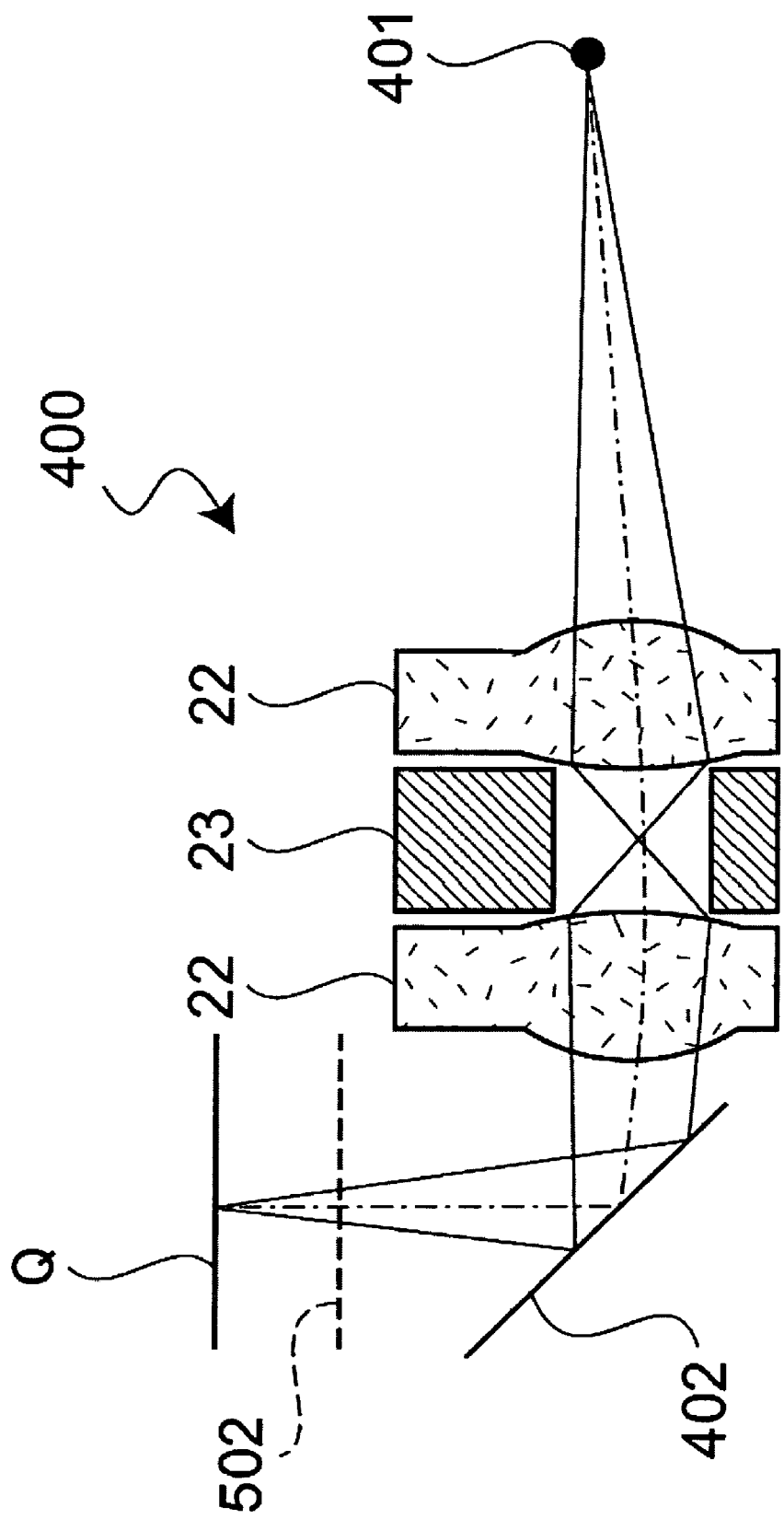
FIG. 38 is a figure showing the reading head arranged on the reading apparatus of this invention.

A reading apparatus 500 is a scanner for reading a printed image printed on the document Q and generating electric data. FIG. 37 shows a block diagram showing the reading apparatus 500. FIG. 38 shows a block diagram showing a reading head 400. The reading apparatus 500 consists of a reading head 400 and constituent members for operating the reading head 400. The constituent members for operating the reading head 400 will be described first. Thereafter, the reading head 400 will be described. The constituent members for operating the reading head 400 of the reading apparatus 500 will be specifically described with reference to FIG. 37. The constituent members for operating the reading head 400 consists of a light source 501, a document table 502, a rail 503, a pulley 504, a driving belt 505, a motor 506, and a transmitting belt 507. Each constituent member in the reading apparatus 500 will be hereinafter described. The light source 501 is a illuminating light source emitting an illuminating light to the document Q, and is arranged in proximity to the reading head 400 so that the illuminating light is reflected by the surface of the document Q and the reflected light enters into the reading head 400. For example, a rare gas fluorescent lamp may be used as the light source 501. The illuminating light source is not limited to lamps, and for example, a white LED (Light Emitting Diode), a semiconductor laser, and the like may be used. The document table 502 is a table for supporting the document Q from which the electric data is to be generated, and is arranged above the reading head 400. Specifically, the document table 502 is arranged to pass the illuminating light emitted from the light source 501 and to pass the reflected light reflected by the document Q placed on the document table 502, so that the reflected light enters into the reading head 400. The document table 502 as described above is made of glass and the like that can sufficiently pass visible lights. However, the document table 502 is not limited to the glass. For example, a plastic and the like may be used for the document table 502 that has a refraction index for passing the visible light necessary for reading the document Q and has heat and light resistance preventing deterioration caused by ultraviolet rays included in the light source 501, heat radiated form the light source 501, and the like.

The rail 503 is a constituent member for operating the reading head 400 of the reading apparatus 500, and is arranged under the reading head 400 to mount the reading head 400 for scanning the document Q. Specifically, the driving belt 505, described later, connected to multiple rail supporting tables 503A are driven, so that the reading head 400 moves on the rail 503 and scans the printed image printed on the document Q. The pulley 504 consists of a pair of pulleys 504A and 504B, and is arranged on both ends of the endless driving belt 505, described later, to give a predetermined tension to the driving belt 505. The pulley 504A and the pulley 504B are made of a material having a high friction resistance. The motor 506, described later, rotates the pulley 504A to rotate the driving belt 505. The driving belt 505 is a conveyance means to move the reading unit 400 on the rail 503, and is made of the endless belt. The motor 506 is arranged adjacent to the pulley 504A, and is connected to the pulley 504A via the transmission belt 507. The motor 506 rotates based on the control of a control unit, not shown, to drive the pulley 504A to rotate.

Next, the constituent members of the reading head 400 of the reading apparatus 500 will be hereinafter specifically described with reference to FIGS. 37 and 38. The reading head 400 in the reading apparatus 500 reads the printed image printed on the document Q. The reading head 400 has a mirror 402, a pair of micro lenses 22, a lens array including a shielding unit 23 inserted between the micro lenses 22, and a line sensor 401. Each constituent member of the reading head 400 will be hereinafter described. The illuminating light reflected by the surface of the document Q passes the document table 502. The mirror 402 is a reflection member, and reflects the reflected light form the document Q, so that the optical axis of the reflected light turns, for example, at an off-axis angle of 90 degrees, and enters into the micro lens 22. The mirror 402 is made by evaporating aluminum and the like as a reflection film onto a planar shape substrate made of glass, metal, heat-resistant plastic and the like. It should be noted that it is not necessary to evaporate the reflection film onto the substrate if the substrate has a sufficient reflection rate in the range of visible light. The mirror 402 is not limited to the planar shape.

For example, the mirror 402 may be made into a toroidal shape to correct astigmatism caused by the off-axis angle.

The lens array consists of the pair of micro lenses 22 and the shielding unit 23 inserted between the micro lenses 22, which are the constituent members of the reading head 400 of the reading apparatus 500. The reflection light generated at the surface of the document Q by the illuminating light of the light source 501 forms an optical image on the line sensor 401, as described later, through the lens array. The lens array according to the fifth embodiment is the same as the lens array according to the third and the fourth embodiments. The line sensor 401 is a sensor arranged at a position of the optical plane of the lens array. Multiple light receiving elements such as CCD and the like evenly spaced at an interval PR in line are used as the line sensor 401. The resolution of the line sensor 401 is 600 dpi, and 600 pieces of the light receiving elements are arranged per 1 inch, i.e., approximately 25.4 mm. Thus, the interval PR of the light receiving elements is 0.0423 mm. The line sensor 401 reads the printed image printed on the document Q, and generates the electric data by converting the optical image formed by the reflection light from the surface of the document Q into the electric signal.

Figure 39:
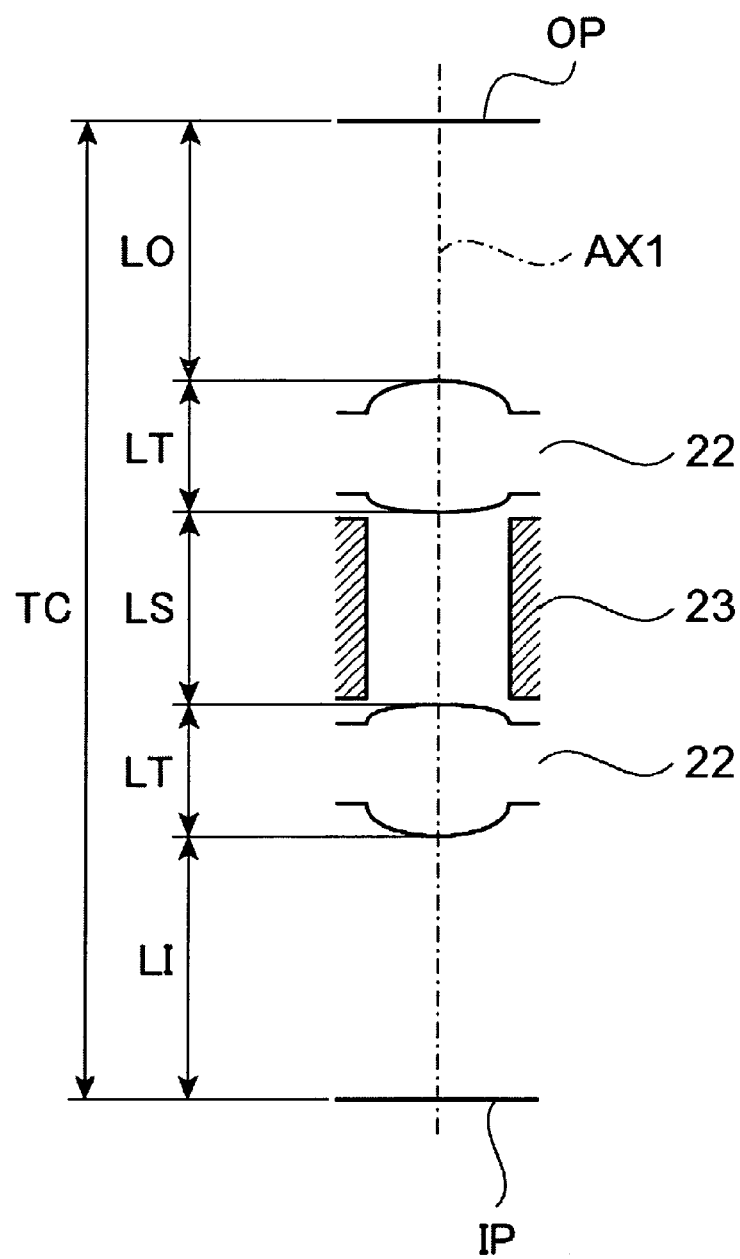
FIG. 39 is a schematic diagram showing the optical system of the reading head of this invention.

The optical system of the reading head 400 in the reading apparatus 500 will be hereinafter specifically described. FIG. 39 shows a schematic diagram showing the optical system of the reading head 400. The illuminating light from the light source 501 is reflected by the surface of the document Q, and becomes the reflection light. The reflection light enters into one of the pair of micro lenses 22 arranged at a position away by the distance LO from the surface of the document Q as the object plane. The micro lens 22 has the lens thickness LT and has a collimator lens effect. The reflection light having entered into the micro lens 22 is collimated by the micro lens 22 and becomes a collimated light. The shielding unit 23 having the length LS sufficiently removes stray lights from the collimated light. The other of the pair of micro lenses 22 arranged on the opposite side has the thickness LT and has a condenser lens effect. The micro lens 22 converges the collimated light, from which the stray lights have been sufficiently removed, on the line sensor 401 arranged on the optical plane at a position away by the distance LI. The total length TC is the total sum of the distance LO, the lens thickness LT, the distance LS, the lens thickness LT, and the distance LI, as described above. The pair of micro lenses 22 consists of the collimator lens and the condenser lens, which are identical to each other and arranged to face to each other on either side of the shielding unit 23. Thus, the pair of micro lenses 22 has the optical magnification of one. The mirror 402, not shown, is arranged within the moving distance LO. The reflection light from the object plane on the document Q converges on the optical plane on the line sensor 401 and forms the optical image thereon while the aberration is sufficiently suppressed, because the micro lens 22 is the aspherical lens and the shielding unit 23 can sufficiently remove the stray lights.

The operation of the reading apparatus 500 will be hereinafter described. The reading apparatus 500 according to the fifth embodiment of this invention was used under the conditions where the dot interval PD is PD=0.0423 mm and the resolution of the line sensor 401 is 600 dpi, and the reading apparatus 500 generated the electric data of good quality that faithfully reproduces the image on the document Q without causing any reading errors and the like.

The reading apparatus 500 according to the fifth embodiment is described as the scanner for converting the printed image printed on the document Q into the electric data. However, the reading apparatus 500 may be applied to a sensor or a switch converting an optical signal into an electric signal, an input and output apparatus using the sensor or the switch converting the optical signal into the electric signal, a biometric authentication apparatus, a communication apparatus, and a dimensional measurement apparatus.

In the fifth embodiment, the reading apparatus 500 read the printed data on the document Q and generated the electric data of good quality that faithfully reproduces the printed data on the document Q without causing reading errors and the like.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An exposure device comprising:
   a light emitting unit having a plurality of light emitting elements; and
   a lens array having at least one pair of lenses having a first lens and a second lens, the lens array having a shielding unit for shielding a light from any one of the at least one pair of lenses;
   wherein a formula EC<EP/2 is satisfied, where EP denotes an interval between two adjacent light emitting elements of the plurality of light emitting elements and where EC denotes an off-set between a central axis of the first lens and a central axis of the second lens.

2. The exposure device according to claim 1, wherein the lens array comprises a plurality of pair of lenses formed into:
   a first lens group having a plurality of the first lenses integrally formed; and
   a second lens group having a plurality of the second lenses integrally formed,
   wherein the first lens group and the second lens group sandwich the shielding unit.

3. The exposure device according to claim 1, wherein the first lens and the second lens are formed through a resin molding.

4. The exposure device according to claim 1, wherein a formula EC>0 is satisfied.

5. An image forming apparatus comprising the exposure device according to claim 1.

6. A reading apparatus comprising:
   a light receiving unit having a plurality of light receiving elements; and
   a lens array having at least one pair of lenses including a first lens and a second lens, the lens array having a shielding unit for shielding a light from any one of the at least one pair of lenses;
   wherein a formula EC<RP/2 is satisfied, where RP denotes an interval between two adjacent light receiving elements of the plurality of light receiving elements and where EC denotes an off-set between a central axis of the first lens and a central axis of the second lens.

7. The reading apparatus according to claim 6, wherein the lens array has a plurality of pair of lenses formed into:
   a first lens group having a plurality of the first lenses integrally formed; and
   a second lens group having a plurality of the second lenses integrally formed, wherein the first lens group and the second lens group sandwich the shielding unit.

8. The reading apparatus according to claim 6, wherein the first lens and the second lens are formed through a resin molding.

9. The reading apparatus according to claim 6, wherein a formula EC>0 is satisfied.

10. In combination:
a light unit having a plurality of light elements; and
a lens array comprising:
   a shielding member having a plurality of apertures;
   a plurality of lens aggregation members each having a plurality of lenses integrally formed,
   wherein the plurality of lenses are arranged on the respective lens aggregation member substantially in a line extending in a direction substantially perpendicular to optical axes of the plurality of lenses,
   wherein each lens aggregation member has a first surface and a second surface, and a position of the first surface and a position of the second surface are substantially the same with respect to an arrangement direction in which the plurality of lenses are arranged,
   wherein a stretching rate or a shrinking rate is different between the first surface and the second surface of the lens aggregation member;
   wherein the plurality of lens aggregation members are arranged so that optical axes of the plurality of lenses on one of the plurality of aggregation members are in line with corresponding optical axes of the plurality of lenses on another of the plurality of aggregation members;
   wherein the shielding member is for shielding a light from any one of the plurality of lenses, and is arranged to allow each of the optical axes of the plurality of lenses to pass through a corresponding one of the plurality of apertures, so that a same-size erect image is formed; and
   wherein a formula EC<EP/2 is satisfied, where EP denotes an interval between two adjacent light elements of the plurality of light elements and where EC denotes an off-set between a central axis of a first lens of the plurality of lenses on the first surface of a respective aggregation member, and a central axis of a corresponding second lens of the plurality of lenses on the second surface of the respective aggregation member.

11. The combination according to claim 10, wherein the lens aggregation members are manufactured using a mold comprising:
a plurality of first curved surfaces for forming a shape of the first surface of the lens aggregation member, the plurality of first curved surfaces being arranged substantially in a line extending in a longitudinal direction of the mold; and
a plurality of second curved surfaces for forming a shape of the second surface of the lens aggregation member, the plurality of second curved surfaces being arranged substantially in the line extending in the longitudinal direction of the mold,
wherein an arrangement interval between each of the plurality of first curved surfaces is different from an arrangement interval between each of the plurality of second curved surfaces.

12. The combination according to claim 11, wherein the mold comprises a movable side and a fixed side,
and wherein in a manufacturing process of the lens aggregation-members, the lens aggregation members are first released from the movable side and is thereafter released from the fixed side,
and wherein the first curved surfaces are formed on the movable side, and the second curved surfaces are formed on the fixed side,
and wherein the arrangement interval between each of the first curved surfaces is larger than the arrangement interval between each of the second curved surfaces.

13. The combination according to claim 10, wherein the lens aggregation members are formed through an injection molding.

14. An exposure device comprising the combination according to claim 10.

15. An LED head comprising the combination according to claim 10.

16. An image forming apparatus comprising the combination according to claim 10.

17. A reading apparatus comprising the combination according to claim 10.

18. A manufacturing method for a lens array including a lens aggregation member having a plurality of lenses integrally formed, wherein the lens array is manufactured using a mold comprising:
a plurality of first curved surfaces for forming a plurality of first lenses on a first surface of the lens aggregation member; and
a plurality of second curved surfaces for forming a plurality of second lenses on a second surface of the lens aggregation member,
wherein an arrangement interval between each of the plurality of first curved surfaces is different from an arrangement interval between each of the plurality of second curved surfaces; and
wherein the mold forms the lens array so that a formula EC<EP/2 is satisfied, where EP denotes an interval between two adjacent light elements of a light unit and where EC denotes an off-set between a central axis of a respective one of the first lens, and a central axis of a corresponding respective one of the second lens.

19. The manufacturing method for the lens array according to claim 18,
wherein the mold comprises a movable side and a fixed side,
and wherein in a manufacturing process of the lens aggregation member, the lens aggregation member is first released from the movable side and is thereafter released from the fixed side,
and wherein the first curved surfaces are formed on the movable side, and the second curved surfaces are formed on the fixed side,
and wherein the arrangement interval between each of the first curved surfaces is larger than the arrangement interval between each of the second curved surfaces.

20. A lens array comprising:
at least one lens aggregation member having a plurality of lenses which are integrally formed;
wherein the plurality of lenses are arranged on the at least one lens aggregation member substantially in a line extending in a direction substantially perpendicular to optical axes of the plurality of lenses;
and wherein a shape of an inlet for a material is formed at either one of both end portions of the lens aggregation member in an arrangement direction in which the plurality of lenses are arranged.

21. The lens array according to claim 20, wherein the at least one lens aggregation member comprises:
- a plurality of lens aggregation members arranged so that optical axes of the plurality of lenses on one of the plurality of aggregation members are in line with corresponding optical axes of the plurality of lenses on another of the plurality of aggregation members; and
- a shielding member having a plurality of apertures,
- wherein the shielding member is arranged to allow each of the optical axes of the plurality of lenses to pass through a corresponding one of the plurality of apertures, so that a same-size erect image is formed.

22. The lens array according to claim 20, wherein the lens array is manufactured using a mold comprising:
- a plurality of curved surfaces for forming a shape of the lenses of the lens array, the plurality of curved surfaces being arranged substantially in a line extending in a longitudinal direction of the mold,
- wherein the inlet for the material is arranged at either one of both end portions of the lens aggregation member in an arrangement direction in which the curves surfaces are arranged.

23. A manufacturing method for a lens array, wherein the lens array is manufactured using a mold comprising:
- a plurality of curved surfaces arranged substantially in a line extending in a longitudinal direction of the mold; and
- an inlet through which a material is injected into the mold, the inlet being formed at either one of both end portions of the mold in the longitudinal direction of the mold.

\* \* \* \* \*